US006470496B1

(12) United States Patent
Kato et al.

(10) Patent No.: US 6,470,496 B1
(45) Date of Patent: Oct. 22, 2002

(54) CONTROL PROGRAM DOWNLOADING METHOD FOR REPLACING CONTROL PROGRAM IN DIGITAL BROADCAST RECEIVING APPARATUS WITH NEW CONTROL PROGRAM SENT FROM DIGITAL BROADCAST TRANSMITTING APPARATUS

(75) Inventors: Naoe Kato, Toyota (JP); Keishi Sugimoto, Okazaki (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/366,017

(22) Filed: Aug. 2, 1999

(30) Foreign Application Priority Data

Aug. 3, 1998 (JP) .......................................... 10-218802
Mar. 26, 1999 (JP) .......................................... 11-084807

(51) Int. Cl.[7] .......................... G06F 9/445; G06F 9/44; H04N 7/20
(52) U.S. Cl. ........................ 717/173; 717/168; 717/174; 717/178; 725/63
(58) Field of Search ........................ 717/11, 174, 168, 717/173, 178; 709/220–222; 710/8–14; 713/1; 348/14.12, 14.13; 455/3.01, 39, 91; 725/63, 132, 140, 152

(56) References Cited

U.S. PATENT DOCUMENTS

| 4,788,637 A | * | 11/1988 | Tamaru ...................... 709/221 |
| 5,003,591 A | * | 3/1991 | Kauffman et al. .......... 380/232 |
| 5,734,589 A | * | 3/1998 | Kostreski et al. ........... 345/716 |
| 5,768,539 A | * | 6/1998 | Metz et al. .................. 709/249 |
| 5,768,597 A | * | 6/1998 | Simm ......................... 717/174 |
| 5,778,234 A | * | 7/1998 | Hecht et al. ................ 717/173 |
| 5,787,288 A | * | 7/1998 | Nagata et al. .............. 717/173 |
| 6,201,536 B1 | * | 3/2001 | Hendricks et al. .......... 345/716 |
| 6,230,319 B1 | * | 5/2001 | Britt, Jr. et al. ............ 717/173 |
| 6,266,810 B1 | * | 7/2001 | Tanaka et al. .............. 717/173 |
| 6,269,421 B1 | * | 7/2001 | Nishimura .................. 711/103 |
| 6,298,480 B1 | * | 10/2001 | Beuk et al. ................. 717/173 |
| 6,343,379 B1 | * | 1/2002 | Ozawa et al. ................. 725/63 |

FOREIGN PATENT DOCUMENTS

| EP | 658858 | 6/1995 | |
| EP | 0732850 A1 | * 9/1996 | ............ H04N/7/16 |

(List continued on next page.)

OTHER PUBLICATIONS

Puri et al.; "MPEG–4: an object–based multimedia coding standard supporting mobile applications". Mobile networks and application, Jan. 1998, vol. 3, Iss. 1, p. 5–32.*
Smith, N.; "Satellite data broadcasting an end to the world–wide–wait?". IEE Seminar on Data Systems for Digital Broadcasting (Ref. No. 1998/467), Jun. 1998, p. 6/1–6/11.*

*Primary Examiner*—Thomas Black
*Assistant Examiner*—Kelvin Booker
(74) *Attorney, Agent, or Firm*—Price and Gess

(57) ABSTRACT

To provide a control program downloading method that is used by a digital broadcast receiving apparatus equipped with a storing device which stores an update program and a non-update program that compose a control program. Under control of the update program, a new update program is received and written over data stored in a part of an area in the storing device where the non-update program has been stored. At the same time, a part of a new non-update program is received and written over data stored in another part of the area in the storing device where the non-update program has been stored. Once the new update program has been completely written into the storing device, under control of the new update program, the reception and writing of the part of the new non-update program is continued.

45 Claims, 35 Drawing Sheets

FOREIGN PATENT DOCUMENTS

| | | | | | |
|---|---|---|---|---|---|
| EP | 2324426 A | * | 10/1998 | ............ | H04B/1/06 |
| JP | 405158703 A | * | 6/1993 | ............ | G06F/9/445 |
| JP | 406004294 A | * | 1/1994 | ............ | G06F/9/445 |
| JP | 406214894 A | * | 8/1994 | ............ | G06F/12/16 |
| JP | 7212487 | | 8/1995 | | |
| JP | 408195952 A | * | 7/1996 | ............ | H04N/7/20 |
| JP | 2000151440 A | * | 10/1998 | ............ | H04B/1/16 |
| JP | 11027594 A | * | 1/1999 | ............ | H04N/5/44 |
| JP | 411004451 A | * | 1/1999 | ............ | H04N/7/32 |
| JP | 11224197 A | * | 8/1999 | ............ | G06F/9/445 |
| JP | 2000152101 A | * | 5/2000 | ............ | H04N/5/44 |

* cited by examiner

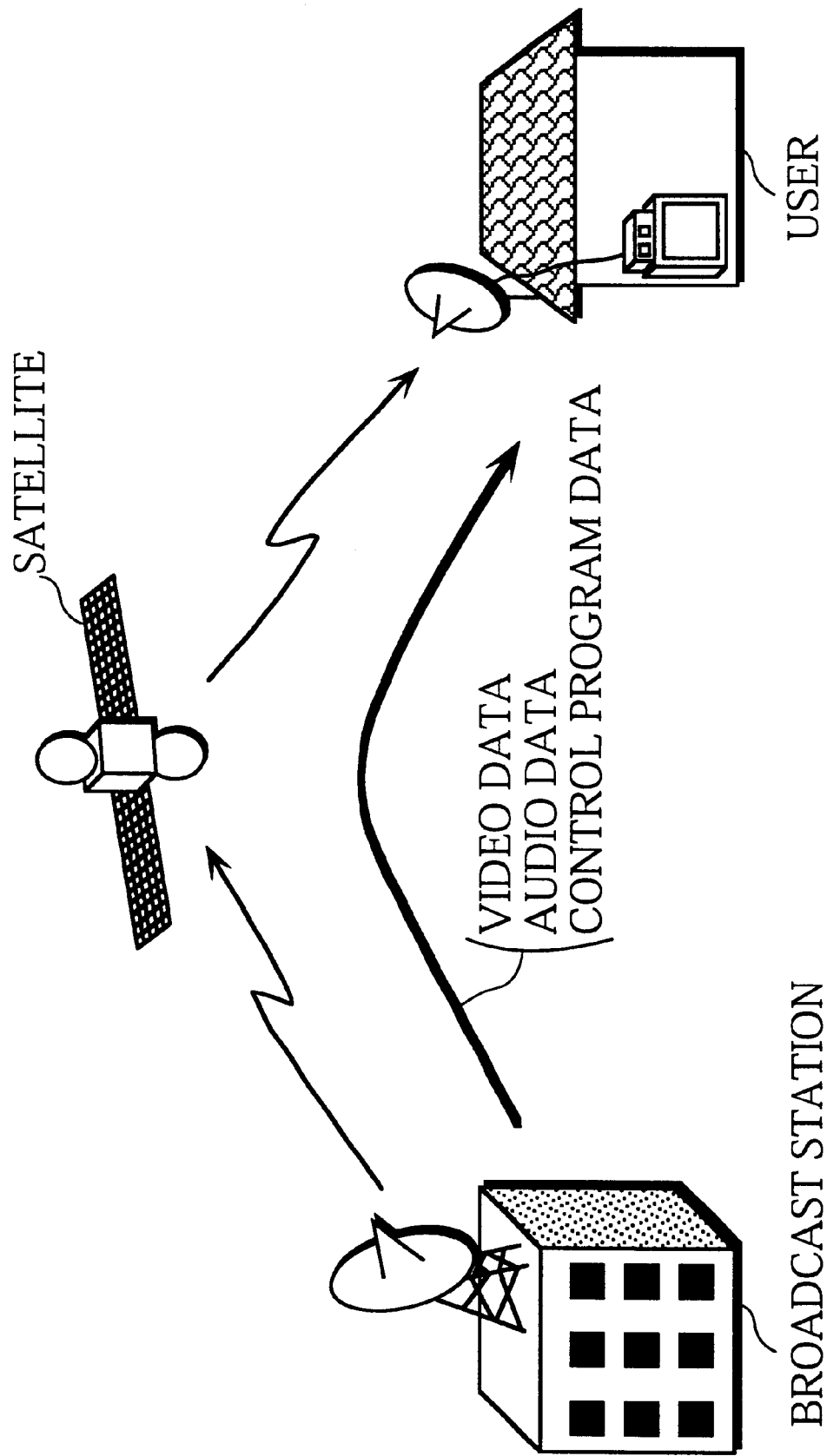

MEMORY MAP OF
FLASH MEMORY

MEMORY MAP OF
DRAM

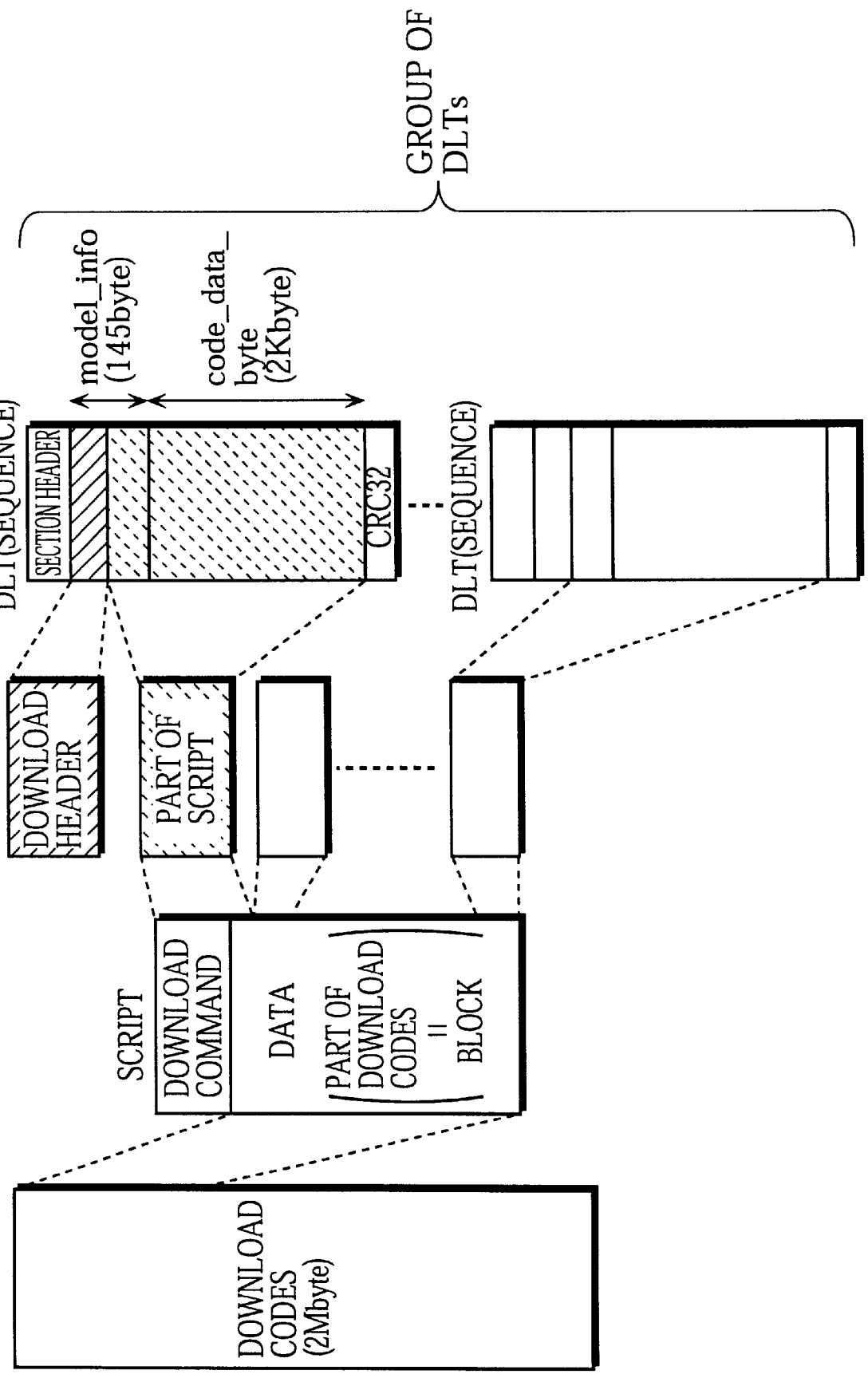

FIG. 11

| HEADER | CONTENTS |
|---|---|
| begin_version | OLDEST SOFTWARE VERSION WHICH IS SUBJECTED TO DOWNLOAD |
| end_version | LATEST SOFTWARE VERSION WHICH IS SUBJECTED TO DOWNLOAD |
| new_version | NEW SOFTWARE VERSION TO BE SET AFTER DOWNLOAD |
| exmodel_id | IDENTIFIER FOR LIMITING MODELS SUBJECTED TO DOWNLOAD |
| exmodel_map | BITMAP FOR LIMITING APPARATUS TYPES SUBJECTED TO DOWNLOAD |
| current_id | IDENTIFIER SHOWING TYPE OF PRESENT PROGRAM WHICH DLT BELONGS TO |
| sub_id | current_id OF PROGRAM THAT CAN BE DOWNLOADED CONCURRENTLY WITH PRESENT PROGRAM |
| start_id | current_id OF PROGRAM TO BE FIRST DOWNLOADED |
| start_subid | current_id OF PROGRAM WHICH CAN BE DOWNLOADED CONCURRENTLY WITH PROGRAM IDENTIFIED BY start_id |
| next_id | current_id OF PROGRAM TO BE DOWNLOADED AFTER PRESENT PROGRAM |
| next_subid | current_id OF PROGRAM WHICH CAN BE DOWNLOADED CONCURRENTLY WITH PROGRAM IDENTIFIED BY next_id |
| grp_no | GROUP NUMBER OF DLT |
| last_grpno | LAST GROUP NUMBER OF DLT |
| seq_no | SEQUENCE NUMBER OF DLT |
| last_seqno | LAST SEQUENCE NUMBER OF DLT |
| dlt_total | TOTAL NUMBER OF VALID DLTs IN ONE CYCLE |
| attr_flag | SET OF FLAGS SHOWING ATTRIBUTE OF DLT |
| offset | NUMBER OF BYTES BETWEEN END OF DOWNLOAD HEADER AND BEGINNING OF SCRIPT |

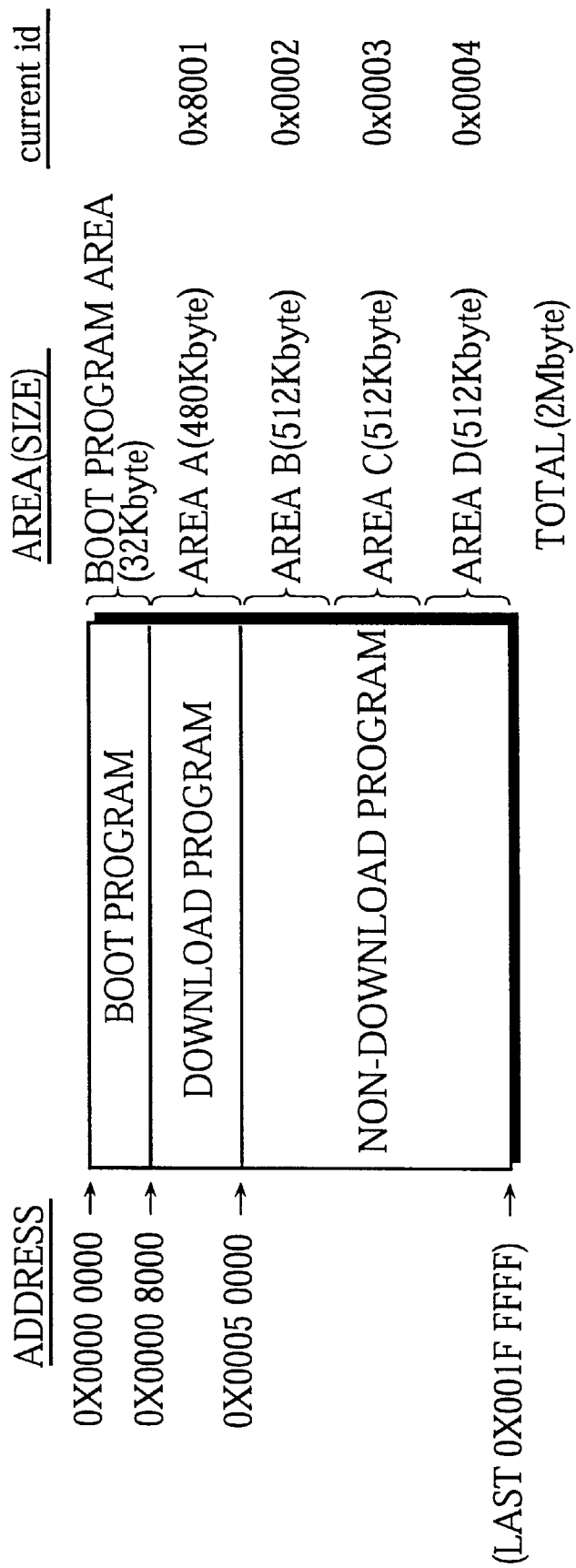

FIG. 34

| HEADER | CONTENTS |
|---|---|
| begin_version | OLDEST SOFTWARE VERSION WHICH IS SUBJECTED TO DOWNLOAD |
| end_version | LATEST SOFTWARE VERSION WHICH IS SUBJECTED TO DOWNLOAD |
| new_version | NEW SOFTWARE VERSION TO BE SET AFTER DOWNLOAD |
| exmodel_id | IDENTIFIER FOR LIMITING MODELS SUBJECTED TO DOWNLOAD |
| exmodel_map | BITMAP FOR LIMITING APPARATUS TYPES SUBJECTED TO DOWNLOAD |
| current_id | IDENTIFIER SHOWING TYPE OF PRESENT PROGRAM WHICH DLT BELONGS TO |
| sub_id | current_id OF PROGRAM THAT CAN BE DOWNLOADED CONCURRENTLY WITH PRESENT PROGRAM |
| start_id | current_id OF PROGRAM TO BE FIRST DOWNLOADED |
| start_subid | current_id OF PROGRAM WHICH CAN BE DOWNLOADED CONCURRENTLY WITH PROGRAM IDENTIFIED BY start_id |
| next_id | current_id OF PROGRAM TO BE DOWNLOADED AFTER PRESENT PROGRAM |
| next_subid | current_id OF PROGRAM WHICH CAN BE DOWNLOADED CONCURRENTLY WITH PROGRAM IDENTIFIED BY next_id |
| grp_no | GROUP NUMBER OF DLT |
| last_grpno | LAST GROUP NUMBER OF DLT |
| seq_no | SEQUENCE NUMBER OF DLT |
| last_seqno | LAST SEQUENCE NUMBER OF DLT |
| dlt_total | TOTAL NUMBER OF VALID DLTs IN ONE CYCLE |
| attr_flag | SET OF FLAGS SHOWING ATTRIBUTE OF DLT |
| offset | NUMBER OF BYTES BETWEEN END OF DOWNLOAD HEADER AND BEGINNING OF SCRIPT |
| cmp_type | TYPE OF COMPRESSION METHOD |
| hd_size | NUMBER OF BYTES OF DOWNLOAD HEADER |
| exp_area | NUMBER OF BYTES OF AREA TO BE SECURED FOR DECOMPRESSING COMPRESSED SCRIPT |
| one_block | NUMBER OF DLTs OF ONE DLT RECEPTION BLOCK |
| raw_scrpt | NUMBER OF BYTES OF PRECOMPRESSED SCRIPT |
| cmp_scrpt | NUMBER OF BYTES OF COMPRESSED SCRIPT |

CONTROL PROGRAM DOWNLOADING METHOD FOR REPLACING CONTROL PROGRAM IN DIGITAL BROADCAST RECEIVING APPARATUS WITH NEW CONTROL PROGRAM SENT FROM DIGITAL BROADCAST TRANSMITTING APPARATUS

This application is based on application Ser. Nos. 10-218802 and 11-084807 filed in Japan, the contents of which are hereby incorporated by reference.

BACKGROUND OF THE INVENTION

1. Field of the Invention

The present invention relates to a digital broadcast receiving apparatus and a digital broadcast transmitting apparatus, and in particular relates to a technique for replacing a control program currently used in the digital broadcast receiving apparatus with a new control program sent from the digital broadcast transmitting apparatus.

2. Description of the Prior Art

Nowadays, video, audio, and other various types of data are broadcasted through digital broadcasting that uses MPEG (Moving Picture Experts Group) transport streams or the like.

FIG. 1 is a diagrammatic sketch of a digital broadcast transmitting apparatus under MPEG standard.

This transmitting apparatus includes a plurality of encoders 601 that each digitize video and audio of a different one of a plurality of broadcast programs and encode and compress the digitized video and audio to produce video and audio streams, a data generator 602 for generating a data stream from service information such as program specific information and program information, a multiplexer 603 for performing time division multiplexing on the data stream and video and audio streams of the plurality of broadcast programs to create multiplexed transport stream packets, and a modulator 604 for digitally modulating the transport stream packets to generate a transmittable modulated wave.

That is to say, video streams and audio streams generated by the plurality of encoders 601 and a data stream generated by the data generator 602 are multiplexed in time division by the multiplexer 603 to produce MPEG2 multiplexed transport stream packets, which are then digitally modulated by the modulator 604 to create a modulated wave.

FIG. 1 shows three sets of the above units that generate a modulated wave. Three modulators 604 generate modulated waves of different frequencies and output them onto a transmission line (e.g. radio wave or cable). In digital satellite broadcasting, since as many modulated waves as transponders equipped in a satellite (not illustrated) can be simultaneously transmitted, the modulated waves generated by the three modulators 604 are concurrently broadcasted to a plurality of digital broadcast receiving apparatuses via transponders corresponding to the respective three modulators 604.

FIG. 2 is a diagrammatic sketch of a digital broadcast receiving apparatus under MPEG standard.

This receiving apparatus includes a tuner 901 for selectively receiving a modulated wave including a channel designated by a user among the modulated waves transmitted via the transmission line, a demodulator 902 for digitally demodulating the received modulated wave to acquire multiplexed transport stream packets, a demultiplexer 903 for separating the multiplexed transport stream packets into a data stream and video and audio streams of a plurality of broadcast programs, a transport decoder (hereinafter "TD") 904 for extracting a necessary stream, an audio decoder 905 for decompressing and decoding an extracted audio stream and converting the audio stream into analog form to generate audio signals, video decoder 906 for decompressing and decoding an extracted video stream to generate video information, a video decoder memory 907 used by the video decoder 906 as a work area, a CPU 908 for controlling each component of the receiving apparatus, a flash memory 909 for storing a control program of the CPU 908, a DRAM (dynamic RAM) 910 for storing service information and display information included in the data stream, an EEPROM (electrically erasable and programmable ROM) 911 for storing information which needs to be retained while the power of the receiving apparatus is off, a display generator 912 for merging the video information and the service information to generate video signals, and a CPU bus 913 for connecting each component of the receiving apparatus for data transfer. Here, the CPU bus 913 is connected to the tuner 901, demodulator 902, TD 904, CPU 908, flash memory 909, DRAM 910, EEPROM 911, and display generator 912, and is used for control of the CPU 908 or data transfer such as DMA (direct memory access) transfer.

In addition to the above components of the receiving apparatus, the figure also shows a speaker 914 for converting the audio signals generated by the audio decoder 905 into sounds and a monitor 915 for generating images from the video signals created by the display generator 912.

The overall operation of the digital broadcast receiving apparatus is as follows. The modulated wave received by the tuner 901 is demodulated by the demodulator 902 to acquire multiplexed transport stream packets, which are then separated by the demultiplexer 903 into different streams from which a necessary stream is extracted by the TD 904. An extracted audio stream is converted into audio signals by the audio decoder 905 and further converted into sounds via the speaker 914. An extracted video stream is converted into video information by the video decoder 906 and merged with service information by the display generator 912, and as a result images are displayed on the monitor 915. Here, service information included in an extracted data stream is stored in the DRAM 910 and only the information designated by the user is transferred to the display generator 912 via the TD 904 to be merged with the video information.

The unit of data transfer of transport stream packets from the digital broadcast transmitting apparatus to the digital broadcast receiving apparatus is referred to as "packet", with information being transmitted in units of packets irrespective of the type of the information. The size of each packet is typically 188 bytes.

The structure of data such as the service information stored in the DRAM 910 is called "section structure", with a set of section structured data being called "table".

FIG. 3 shows a section structure table.

This table contains table_id, table_id_extension, and section_length.

Table_id and table_id_extension are used by the TD 904 to extract a desired table.

Table_id is an identifier indicating a type of the table, whereas table_id_extension is an external identifier showing the type indicated by the table ID in more details.

Section_length shows a total data size (number of bytes) of section made up of data_bytes which are each 8 bits (1 byte) long.

When services provided by a broadcast station change, it becomes necessary to rewrite a control program which is currently used in the digital broadcast receiving apparatus. There are various methods for replacing the currently used control program with a new control program. One of such methods is that the digital broadcast receiving apparatus receives the new control program from the broadcast station and replaces the current control program with the new control program. Although this method is relatively convenient for the user as it is easily performed within a short time, hardware and software for rewriting the control program needs to be equipped in the digital broadcast receiving apparatus.

FIG. 4 shows the form of transmitting a control program in digital satellite broadcasting. In the figure, the control program is sent from a broadcast station to a digital broadcast receiving apparatus of the user via a satellite together with video data and audio data.

The following is a description of replacing a control program currently used in the digital broadcast receiving apparatus with a new control program sent from the digital broadcast transmitting apparatus.

A digital broadcast receiving apparatus that has a control program download function usually stores a control program in a rewritable flash memory.

FIG. 5A shows a memory map of the flash memory 909 that stores a control program.

The control program stored in the flash memory 909 includes a reception program, a download program, an OS, and a device driver. In addition to this control program, the flash memory 909 also stores a boot program.

A control program holds data of around several megabytes and is typically transmitted in units of packets. Accordingly, when downloading a new control program, the digital broadcast receiving apparatus cannot rewrite the currently used control program until the whole new control program is received and processed. Hence, to store received packets of the new control program, the digital broadcast receiving apparatus has to be equipped with a memory with a minimum capacity equal to the data size of the whole new control program, apart from the flash memory 909 that stores the current control program. In the digital broadcast receiving apparatus of the present example, received data of the new control program is stored in the DRAM 910.

FIG. 5B shows a memory map of the DRAM 910 that stores the new control program.

The structure of the new control program stored in the DRAM 910 is the same as the control program in the flash memory 909. The DRAM 910 is used as a work area of the CPU 908 when it is not being used for download of the new control program.

The digital broadcast transmitting apparatus has the data generator 602 generate a data stream from the new control program which is to be sent, has the modulator 604 generate a modulated wave using the data stream in the same way as the above mentioned service information, and outputs the modulated wave onto the transmission line.

The digital broadcast receiving apparatus receives the modulated wave including the data stream generated from the new control program via the tuner 901, under the control of the CPU 908 that executes the control program stored in the flash memory 909. Once the data stream has been extracted by the TD 904 and stored in the DRAM 910 according to the section structure, data of the new control program is extracted and stored in an empty area of the DRAM 910. When the whole new control program is stored in the DRAM 910, the new control program is written over the control program stored in the flash memory 909.

As for data format of the transmitted new control program, a download control table (DCT) and download table (DLT) that conform to ARIB (Association of Radio Industries and Businesses) STD-B16 are normally used, though it is also possible for each broadcast station to use a unique format. The DCT and the DLT are both section structure tables.

FIG. 6 shows the format of a DCT.

The DCT includes table_id, section_length, transport_stream_id, DL_PID (download packed ID), model_info_length (model information length), and sets of model_info (model information).

Table_id shows "0xC0" as a table ID of the DCT.

Transport_stream_id is an identifier of a transport stream and specifies a frequency of a modulated wave which is to be received by the tuner 901.

DL_PID is an identifier of a packet which is to be extracted by the TD 904.

Model_info_length shows a total data size of the sets of model_info in bytes.

Each set of model_info includes maker_id identifying a manufacturer of a digital broadcast receiving apparatus, model_id identifying a model of the receiving apparatus, and version_id identifying a software version of the receiving apparatus.

FIG. 7 shows the format of a DLT.

The DLT includes table_id, section_length, maker_id, model_id, version_id, and code_data_bytes. In the DCT, data from table_id to immediately before a model information field is called a section header.

Table_id shows "0xC1" as a table ID of the DLT.

Section_length is "0x89C" without exception.

Maker_id, model_id, and version_id are the same as the DCT.

Code_data_bytes represent the main body of the software and are 8 bits×2048 (2 Kbytes) long.

For details on the DCT and DLT, see ARIB, *CS Digital Broadcast Standard Shared Receiver: ARIB STANDARD*, ARB STD-B16 the 1.0th edition, pp 12~16.

DCTs are multiplexed into every modulated wave received by the digital broadcast receiving apparatus.

The digital broadcast receiving apparatus receives any of the modulated waves sent from the digital broadcast transmitting apparatus and has the TD 904 filter DCTs multiplexed in the received modulated wave, under the control of the CPU 908 that executes the download program stored in the flash memory 909. The filtered DCTs are buffered in the DRAM 910 and the CPU 908 judges whether there is appropriate DLTS, based on maker_id, model_id, and version_id shown in each DCT.

On judging that there is appropriate DLTs, the CPU 908 instructs the display generator 912 to display on the monitor 915 a message for notifying the user that the new control program can be downloaded.

FIG. 8 is a flowchart showing a conventional control program rewriting method.

(1) When the user gets the message and requests the download of the new control program, the tuner 901 receives a modulated wave identified by transport_stream_id in a DCT with which it has been judged that appropriate DLTs exist (S91).

(2) The received modulated wave is demodulated by the demodulator 902, separated by the demultiplexer 903 into different streams, and filtered by the TD 904. As a result, an appropriate DLT is obtained and stored in the DRAM 910 (S92).

(3) The CPU 908 stores code_data_bytes included in the DLT stored in the DRAM 910 into an empty area of the DRAM 910 (S93).

(4) It is judged whether the whole data of the new control program has been stored in the DRAM 910. If not, steps S92~S93 are repeated until the whole data is stored (S94).

(5) Once the new control program has completely been stored, the CPU 908 writes the new control program over the control program in the flash memory 909 (S95).

(6) When the download of the new control program has finished, the new control program is booted (S96).

Thus, in the conventional control program downloading method the rewriting of the control program in the flash memory 909 does not begin until the transmitted new control program is completely stored in the DRAM 910.

In this conventional technique, a main RAM with a capacity at least equal to the size of the control program must be equipped in the digital broadcast receiving apparatus for rewriting the control program. On the other hand, there is an alternative method whereby the flash memory is made dual while the capacity of the main RAM is limited to no more than necessary for processing other than the control program download, where one memory area is used for storing the current control program and the other for storing the new control program received from the broadcast station.

However, since neither the main RAM with a capacity for a whole control program nor the dual flash memory is necessary for processing other than the control program download, it is not desirable to bring up the price of the receiving apparatus by including such components that are unnecessary during normal control.

Also, to limit the capacity of the main RAM, there is a division downloading method of dividing the new control program into smaller parts than the capacity of the main RAM and replacing the current control program with the new control program in units of parts.

However, a control program usually includes a program for controlling rewriting of the control program, so that partially rewriting the control program causes inability to control the rewriting processing per se and thus the control program cannot be rewritten in divided units. Therefore, the capacity of the main RAM needs to be at least no less than the data size of the control program.

In the case of one-way transmission of a control program from a broadcast station as in digital satellite broadcasting, the control program is sent in cycles. To download a specific program from its beginning, the user may have to wait a whole cycle of control program transmission in the worst case. For instance, if a repeat cycle of a control program in a digital satellite broadcast station is of the order of 8.5 minutes, the processing time may be prolonged by as much as 8.5 minutes, that causes real inconvenience on the part of the user.

SUMMARY OF THE INVENTION

The present invention aims to provide a control program transmitting method, control program downloading method, computer-readable storing medium storing a control program transmission program, computer-readable storing medium storing a control program, control program transmitting apparatus, and control program downloading apparatus that can limit the necessary memory capacity and reduce the cycle wait time when a program receiving apparatus, such as a digital broadcast receiving apparatus, rewrites a control program.

The above stated object can be fulfilled by a control program transmitting method for transmitting a control program of a program receiving apparatus, the control program transmitting method including: an acquiring step for acquiring the control program made up of an update program to be used in the program receiving apparatus for download of the control program and a non-update program to be used in the program receiving apparatus for processing other than the download of the control program; a dividing step for dividing each of the update program and the non-update program into divisions which are each accompanied by a serial number; an identifier appending step for appending a first identifier and a second identifier respectively to each division of the update program and each division of the non-update program; and a transmitting step for repeatedly transmitting, in sequence, every division to which any of the first identifier and the second identifier is appended.

The above object can also be fulfilled by a control program downloading method that is used by a program receiving apparatus equipped with a storing device which stores in advance a control program made up of an update program used for download of a new control program and a non-update program used for processing other than the download of the new control program, the new control program being made up of a new update program and a new non-update program, the control program downloading method including: a first controlling step for executing the update program stored in the storing device to receive the new update program and write the received new update program over the non-update program stored in a first area in the storing device; and a second controlling step for executing, once the first controlling step has finished writing the new update program into the storing device, the new update program to receive the new non-update program and write the received new non-update program over data stored in a second area in the storing device aside from an area where the new update program that is currently being used is stored, wherein the new update program is divided into divisions which are each accompanied by a first identifier and a serial number, and is received in units of divisions, wherein the new non-update program is divided into divisions which are each accompanied by a second identifier and a serial number, and is received in units of divisions, wherein in the first controlling step, if the first identifier is appended to a received division of the new control program, the received division is judged as belonging to the new update program and a location where the received division is to be written is specified within the first area based on a serial number appended to the received division, and wherein in the second controlling step, if the second identifier is appended to a received division of the new control program, the received division is judged as belonging to the new non-update program and a location where the received division is to be written is specified within the second area based on a serial number appended to the received division.

With the above construction, only after the received new update program is written over the non-update program prestored in an area in the storing device and then copied from the area to an area where the update program is prestored, the new non-update program is written over the new update program in the area from which the new update program was copied. Accordingly, even when a malfunction such as power failure occurs while, for instance, the new update program is being copied, it can be ensured that at least one of the prestored update program and the new update program exists in the storing device in complete form.

Therefore, the program receiving apparatus can securely rewrite the control program without being equipped with a memory specifically used for rewriting the control program.

Also, the program receiving apparatus refers to a serial number of each division to specify an address in which the division is to be written into the storing device, so that the download processing can be promptly conducted regardless of the transmission sequence of each division.

Which is to say, the download processing can be started from any division, with it being possible to reduce the cycle wait time.

The above object can also be fulfilled by a control program transmitting method for transmitting a control program of a digital broadcast receiving apparatus, the control program transmitting method including: an acquiring step for acquiring the control program made up of an update program to be used in the digital broadcast receiving apparatus for download of the control program and a non-update program to be used in the digital broadcast receiving apparatus for processing other than the download of the control program; a separating step for separating the non-update program into a first non-update program whose data size is no smaller than the update program and a second non-update program other than the first non-update program; a dividing step for dividing each of the update program, the first non-update program, and the second non-update program into divisions which are each accompanied by a serial number; an identifier appending step for appending a first identifier to each division of the update program, a second identifier to each division of the first non-update program, and a third identifier to each division of the second non-update program; and a transmitting step for repeatedly transmitting, in sequence, every division to which any of the first identifier, the second identifier, and the third identifier is appended.

The above object can also be fulfilled by a control program transmitting method for transmitting a control program of a digital broadcast receiving apparatus, the control program transmitting method including: a control program acquiring step for acquiring the control program which is made up of an update program to be used in the digital broadcast receiving apparatus for download of the control program and a non-update program to be used in the digital broadcast receiving apparatus for processing other than the download of the control program; a data size acquiring step for acquiring a data size obtained by subtracting a size of an area prepared in the digital broadcast receiving apparatus for an increase of codes associated with download of the non-update program, from a data size of the update program; a separating step for separating the non-update program into a first non-update program whose data size is no smaller than the data size acquired in the data size acquiring step and a second non-update program other than the first non-update program; a dividing step for dividing each of the update program, the first non-update program, and the second non-update program into divisions which are each accompanied by a serial number; an identifier appending step for appending a first identifier to each division of the update program, a second identifier to each division of the first non-update program, and a third identifier to each division of the second non-update program; and a transmitting step for repeatedly transmitting, in sequence, every division to which any of the first identifier, the second identifier, and the third identifier is appended.

The above object can also be fulfilled by a control program downloading method that is used by a digital broadcast receiving apparatus equipped with a storing device which stores in advance a control program made up of an update program used for download of a new control program and a non-update program used for processing other than the download of the new control program, the new control program being made up of a new update program and a new non-update program, the control program downloading method including: a judging step for repeatedly judging whether writing of the new update program has been completed, having a first controlling step operate until completion of the writing of the new update program, and having a second controlling step operate after the completion of the writing of the new update program; the first controlling step for executing the update program stored in the storing device to receive the new update program and write the received new update program over data stored in a first area in the storing device that is a part of an area where the non-update program has been stored, and, at the same time, receive a first non-update program which is a part of the new non-update program and write the received first non-update program over data stored in a second area, aside from the first area, that is a part of the area where the non-update program has been stored; and the second controlling step for executing the new update program written in the storing device to take over reception and writing of the first non-update program and , at the same time, receive a second non-update program which is a part of the new non-update program other than the first non-update program and write the received second non-update program over data stored in a third area in the storing device aside from the second area and an area where the new update program which is currently being used is stored.

With the above construction, while the new update program is being written into the first area, the first non-update program can be written into the second area. Accordingly, the digital broadcast receiving apparatus does not need to be equipped with a memory specifically used for rewriting the control program, and the time taken for the download processing can be shortened.

Here, when it is judged in the judging step that the writing of the new update program has been completed, the second controlling step may copy the new update program written in the first area to an area in the storing device where the update program has been stored, and execute the copied new update program.

With this construction, only after the new update program written in the first area is copied to an area in the storing device where the update program has been prestored, the second non-update program is written into the first area. Accordingly, even when a malfunction such as power failure occurs while, for example, the new update program is being copied, it can be ensured that at least one of the prestored update program and the new update program exists in the storing device in complete form.

As a result, the control program can be safely rewritten without affecting the control operation of the digital broadcast receiving apparatus.

Here, the new update program may be divided into divisions which are each accompanied by a first identifier and a serial number, and be received in units of divisions, wherein the first non-update program is divided into divisions which are each accompanied by a second identifier and a serial number, and is received in units of divisions, wherein the second non-update program is divided into divisions which are each accompanied by a third identifier and a serial number, and is received in units of divisions, wherein in the first controlling step, if the first identifier is appended to a received division of the new control program, the received division is judged as belonging to the new update program and a location where the received division is to be written is specified within the first area based on a serial number appended to the received division, while if the second identifier is appended to the received division, the received division is judged as belonging to the first non-update program and a location where the received division is to be written is specified within the second area based on a serial number appended to the received division, and wherein in the second controlling step, if the third identifier is appended to a received division of the new control program, the received division is judged as belonging to the second non-update program and a location where the received division is to be written is specified within the third area based on a serial number appended to the received division.

With this construction, the digital broadcast receiving apparatus refers to a serial number of each division to specify an address in the storing device in which the division is to be written. Since the download processing does not depend on the transmission sequence of each division, the reception of the new control program can be started from any division, with it being possible to save the cycle wait time.

The above object can also be fulfilled by a control program transmitting method for transmitting a control program of a digital broadcast receiving apparatus, the control program transmitting method including: an acquiring step for acquiring the control program which is made up of an update program to be used in the digital broadcast receiving apparatus for download of the control program and a non-update program to be used in the digital broadcast receiving apparatus for processing other than the download of the control program; a separating step for separating a first portion from the non-update program, combining the first portion with the update program to form a first control program whose data size is approximately 1/M of the control program, separating a second portion whose data size is equal to the first control program from the non-update program aside from the first portion, setting the second portion as a second control program, and dividing the non-update program aside from the first portion and the second portion by approximately (M−2) into third to Mth control programs, where M is an even number no less than 4; a dividing step for dividing each of the first control program, the second control program, and the third to Mth control programs into divisions of similar size; an identifier appending step for appending a first identifier and a second identifier respectively to each division of the first control program and each division of the second control program, evenly sorting the third to Mth control programs into a first program group and a second program group, and appending a third identifier and a fourth identifier respectively to each division of the first program group and each division of the second program group; and a transmitting step for repeatedly transmitting, when every division with any of the first identifier and the third identifier is grouped as a first set and every division with any of the second identifier and the fourth identifier is grouped as a second set, the first set and the second set alternately in units of divisions.

With this construction, the new control program is repeatedly transmitted according to the above sequence, so that the cycle wait time can be saved and the download processing can be accelerated.

The above object can also be fulfilled by a control program transmitting method for transmitting a control program of a digital broadcast receiving apparatus, the control program transmitting method including: an acquiring step for acquiring the control program made up of subprograms of different types; a dividing step for dividing each of the subprograms into divisions; an appending step for appending, to each of the divisions, a current identifier specifying a type of a subprogram which the division belongs to, priority information showing a priority subprogram which is given priority for being downloaded, and concurrency information showing a concurrency subprogram which can be downloaded concurrently with the priority subprogram; and a transmitting step for repeatedly transmitting, in sequence, every division to which the current identifier, the priority information, and the concurrency information is appended.

The above object can also be fulfilled by a control program downloading method that is used by a digital broadcast receiving apparatus to download a transmitted control program of the digital broadcast receiving apparatus, the control program being made up of subprograms of different types which are each divided into divisions and are repeatedly transmitted in a predetermined sequence in units of divisions, each of the divisions being accompanied by a current identifier specifying a type of a subprogram that the division belongs to, the control program downloading method including: a receiving step for receiving the subprograms in units of divisions; a judging step for judging, with reference to a current identifier appended to a received division, whether the received division belongs to a priority subprogram which is given priority for being downloaded, a concurrency subprogram which can be downloaded concurrently with the priority subprogram, or a subprogram which is neither the priority subprogram nor the concurrency subprogram; and a downloading step for downloading the received division which is judged as belonging to any of the priority subprogram and the concurrency subprogram.

With the above construction, the concurrency program can be downloaded without waiting for the download of the priority program to be completed. Accordingly, the download processing time can be reduced to a relatively short time.

The above object can also be fulfilled by a computer-readable storing medium storing a control program of a digital broadcast receiving apparatus, the control program being characterized in that: the control program is made up of subprograms of different types which are each divided into divisions; and each of the divisions is accompanied by a current identifier specifying a type of a subprogram which the division belongs to, priority information showing a priority subprogram that is given priority for being downloaded, and concurrency information showing a concurrency subprogram that can be downloaded concurrently with the priority subprogram.

With this construction, each division of the new control program is stored in the storing medium together with its current identifier, priority information, and concurrency information.

Accordingly, the digital broadcast receiving apparatus that receives this storing medium can download the concurrency subprogram concurrently with the priority subprogram, so that the download processing can be completed within a relatively short time.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 4 shows the control program transmission form in digital satellite broadcasting;

FIG. 10 is a diagrammatic sketch of generating DLTs from download codes;

FIG. 11 shows an example of the contents of a download header;

FIG. 26 shows a memory map of the control program storing unit 152;

FIG. 34 shows an example of the contents of a download header; and

DESCRIPTION OF THE PREFERRED EMBODIMENT(S)

The following is a description of the embodiments of the present invention with reference to the figures.

First Embodiment

Based on the fact that a large part of a control program is not used while the receiver is rewriting the control program, in the first embodiment of the present invention the transmitter sends a new download program and a new non-download program separately that compose a new control program, and the receiver uses a memory area storing a current non-download program as a work area for storing the new download program. By doing so, the increase of the memory capacity associated with additional program update functions can be limited.

Further, considering that the memory area which is the work area for storing the new download program is not fully used if the non-download program is larger than the download program, the transmitter divides the new non-download program into separate new non-download programs, and the receiver replaces a non-download program stored in an area which is not used as the work area with a new non-download program corresponding to the non-download program, without waiting for the rewriting of the download program to be completed. By doing so, the time taken for rewriting the control program can be saved.

<Program Transmitting Apparatus>

Figure 1:
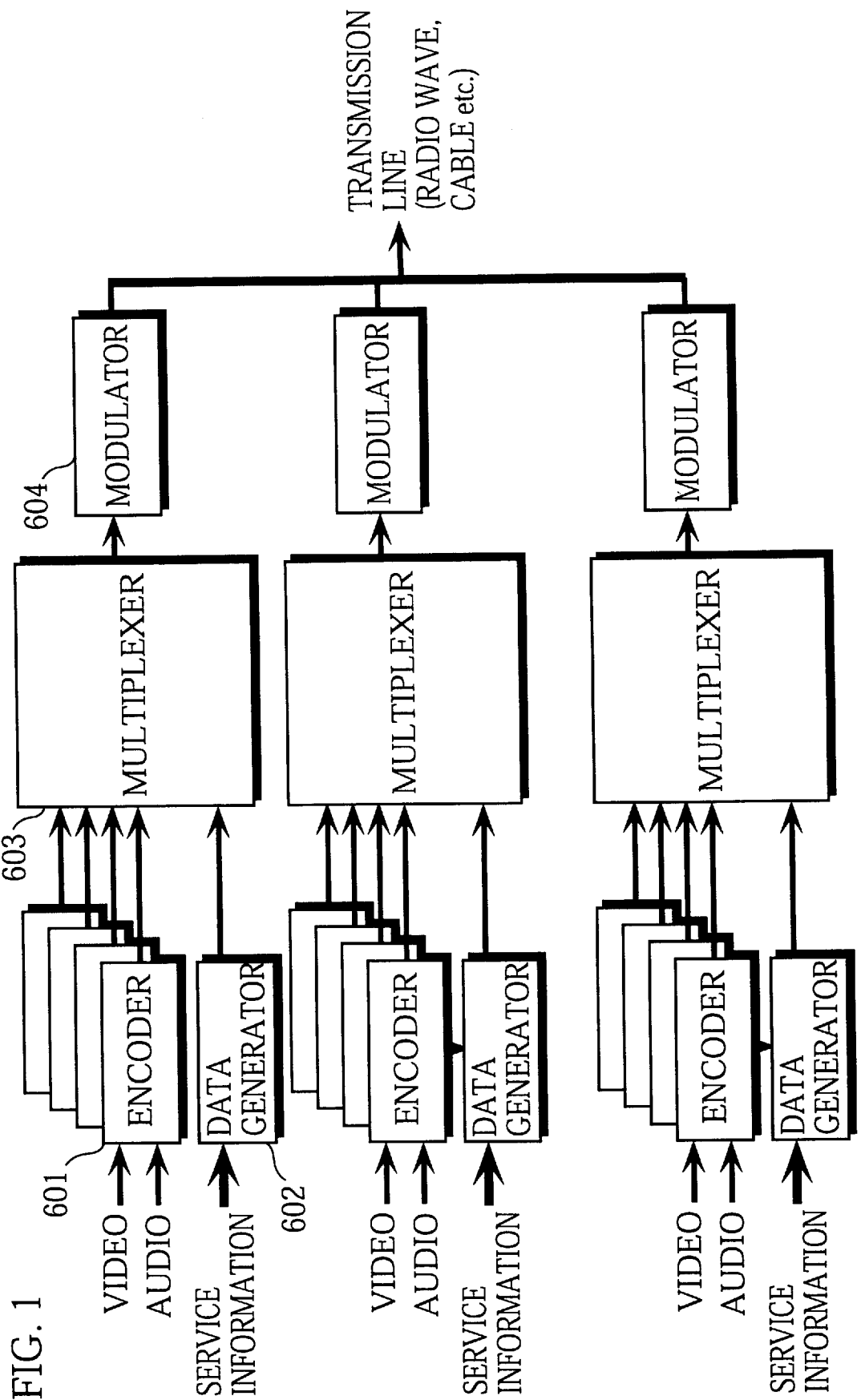
FIG. 1 is a diagrammatic sketch of an MPEG2 digital broadcast transmitting apparatus.
Figure 2:
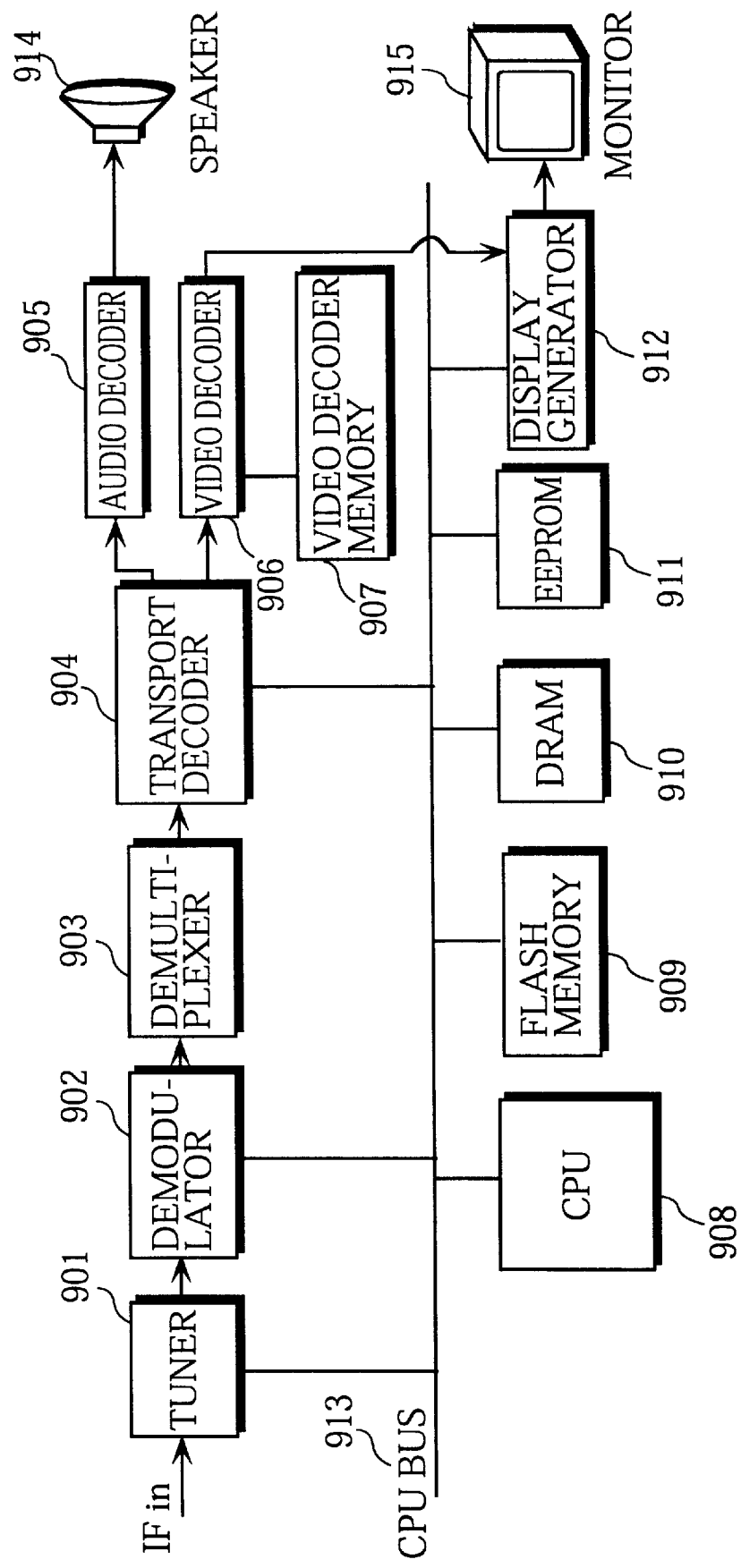
FIG. 2 is a diagrammatic sketch of an MPEG2 digital broadcast receiving apparatus.
Figure 3:
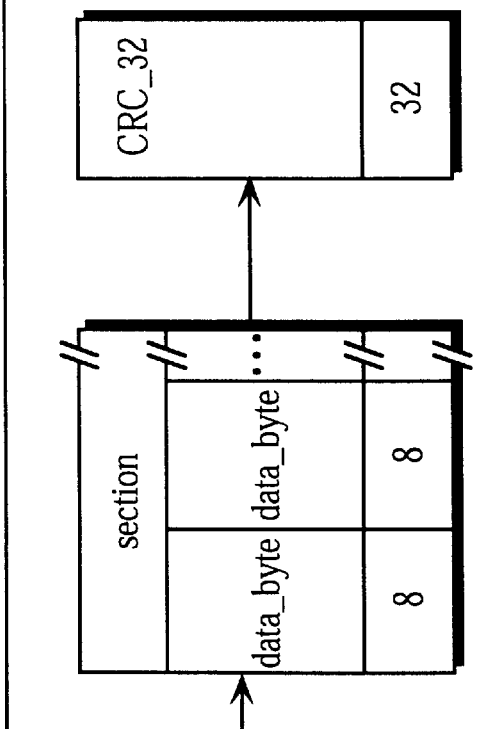
FIG. 3 shows a section structure table.
Figure 5A:
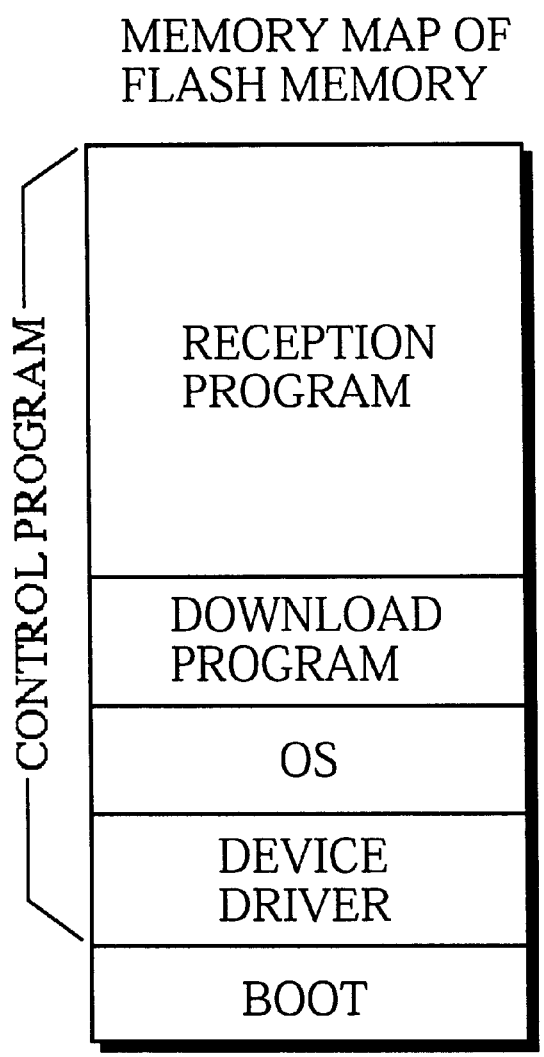
FIG. 5A shows a memory map of a flash memory 909 that stores a control program.
Figure 5B:
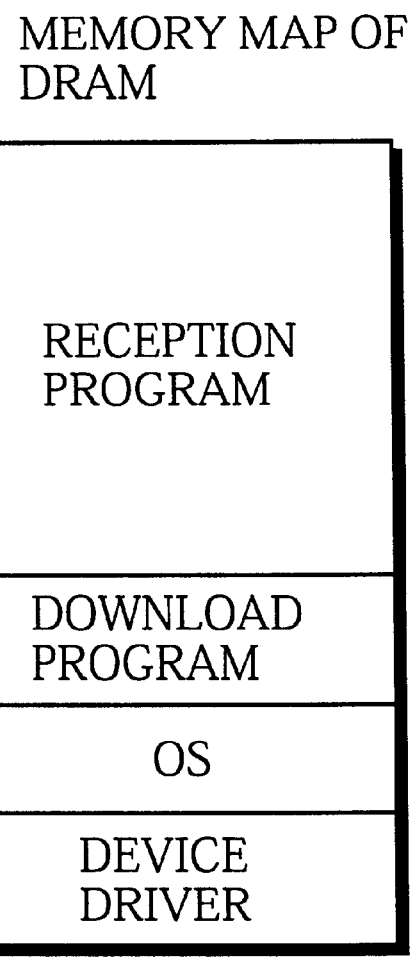
FIG. 5B shows a memory map of a DRAM 910 that stores a control program.
Figure 6:
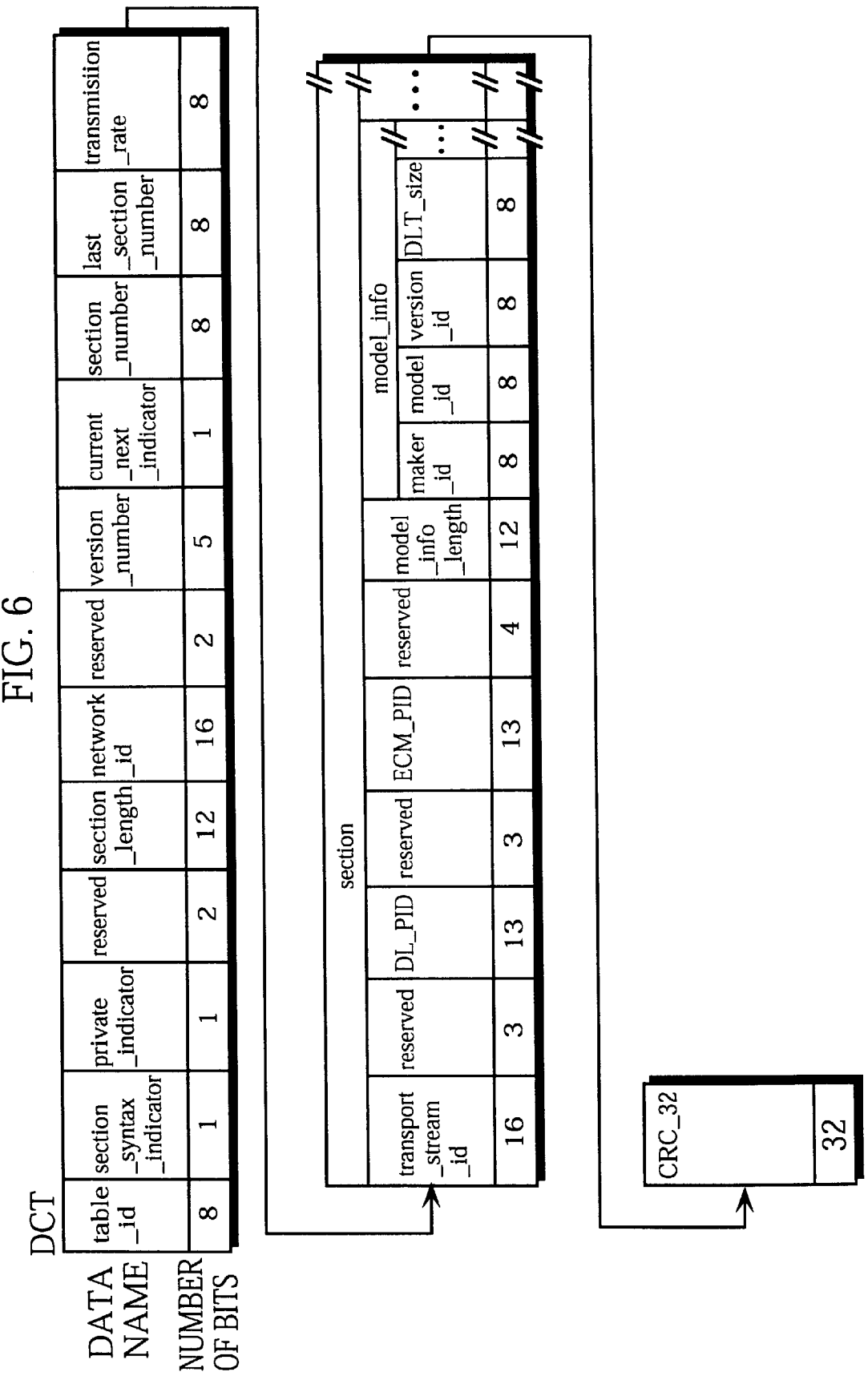
FIG. 6 shows the DCT format.
Figure 7:
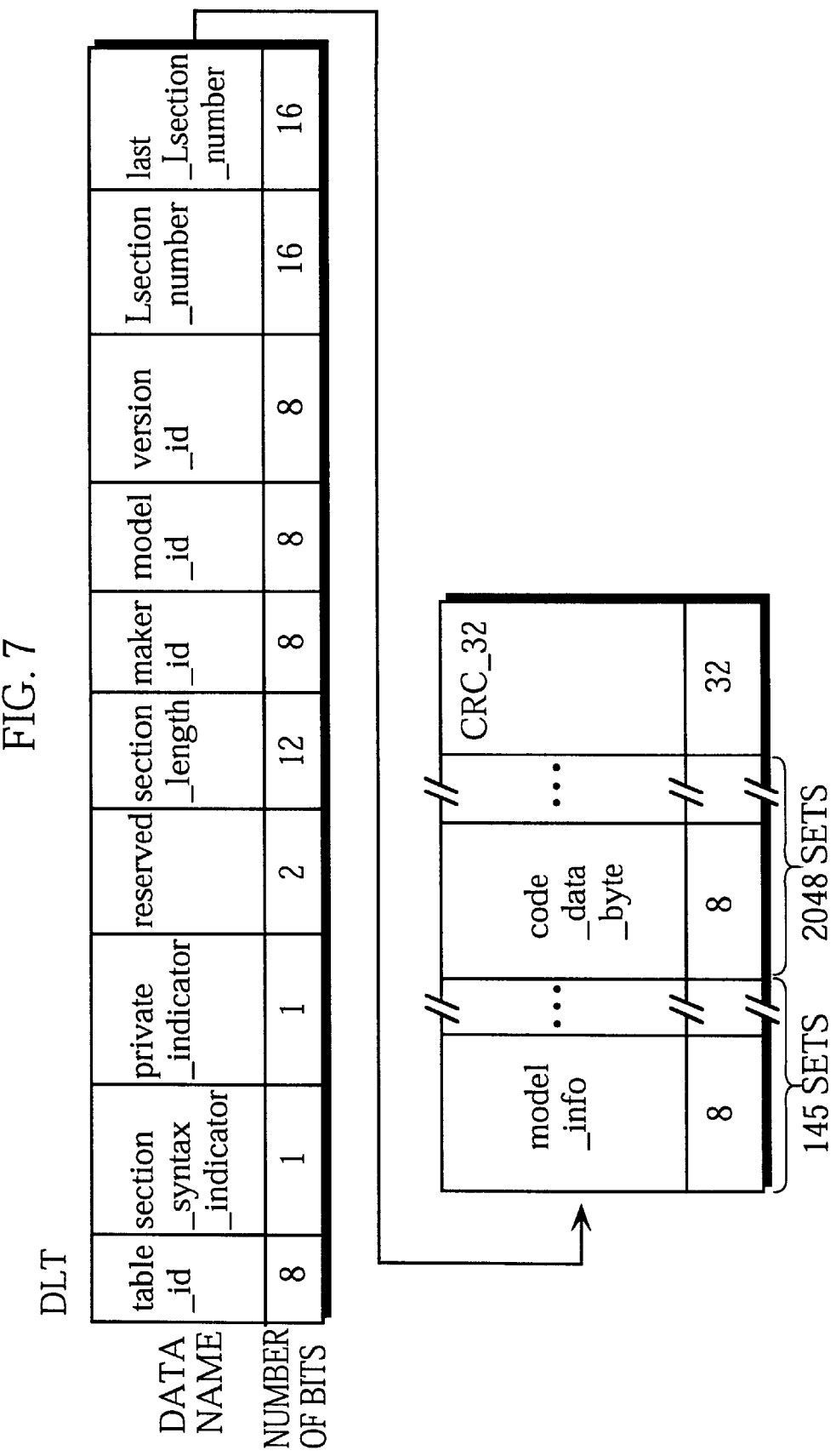
FIG. 7 shows the DLT format.
Figure 8:
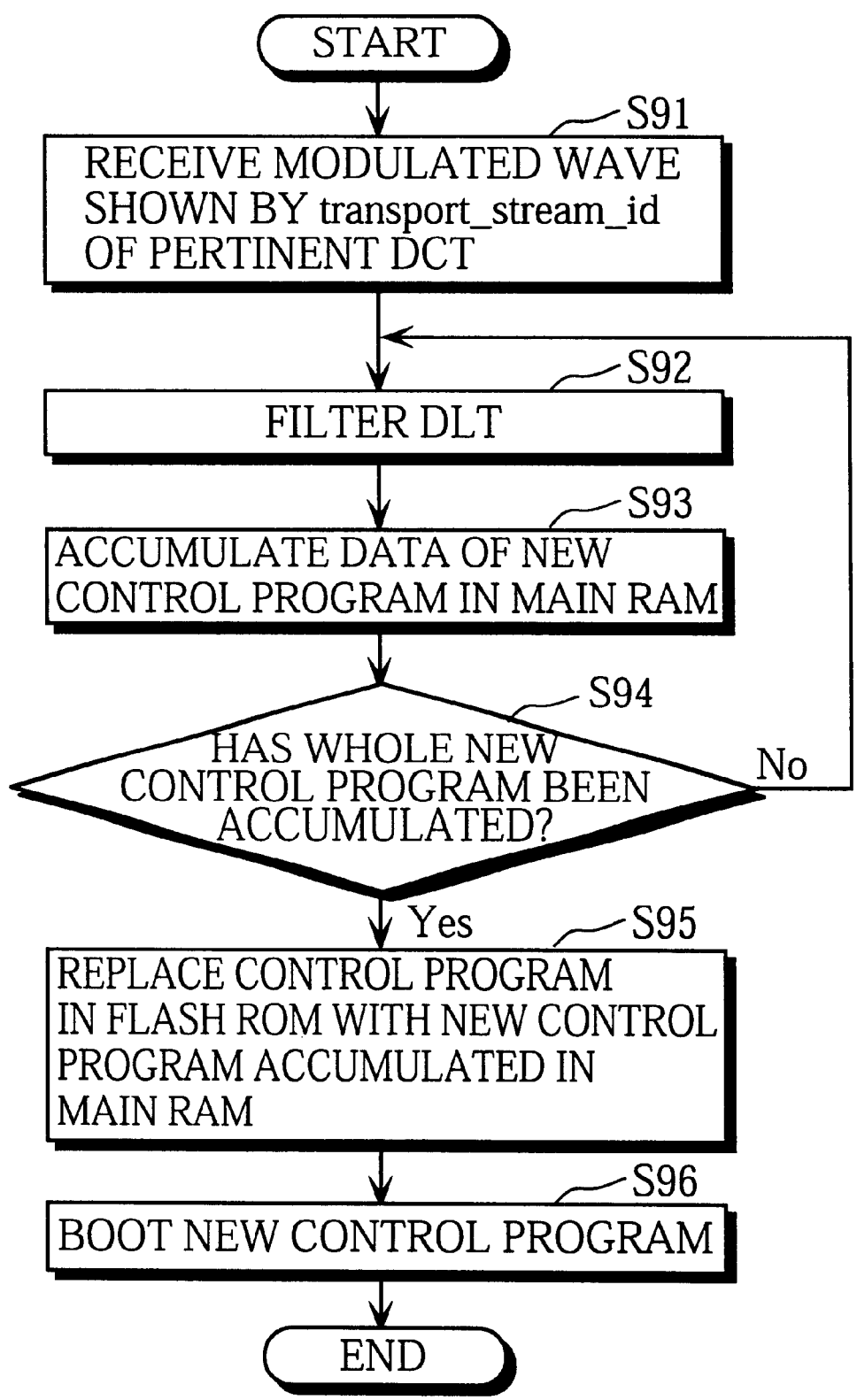
FIG. 8 is a flowchart showing a conventional method of rewriting a control program.
Figure 9:
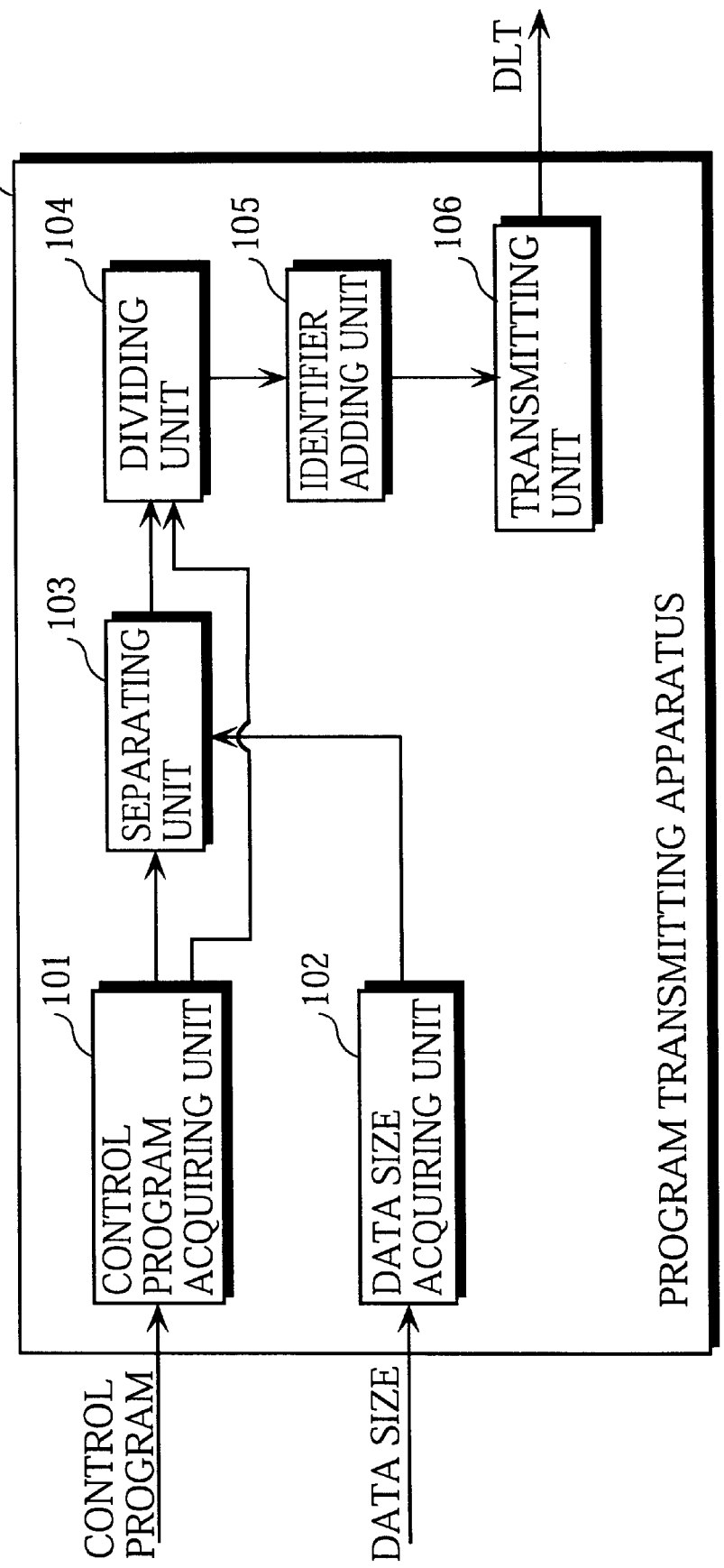
FIG. 9 shows the general configuration of a program transmitting apparatus 100 of the first embodiment of the present invention.

FIG. 9 shows the general configuration of a program transmitting apparatus 100 of the first embodiment of the present invention.

This program transmitting apparatus 100 includes a control program acquiring unit 101, a data size acquiring unit 102, a separating unit 103, a dividing unit 104, an identifier adding unit 105, and a transmitting unit 106.

The control program acquiring unit 101 acquires a new control program made up of a new download program and a new non-download program. A download program referred to here is a part of a control program used for control of download processing by a program receiving apparatus which will receive the control program, whereas a non-download program is the other part of the control program which is not used by the program receiving apparatus for the control of the download processing.

The data size acquiring unit 102 acquires a data size obtained by subtracting a data size of an area prepared in the program receiving apparatus for an increase of codes associated with download of the new non-download program, from a data size of the new download program.

The separating unit 103 separates the new non-download program into a first non-download program whose data size is equal to the data size acquired by the data size acquiring unit 102 and a second non-download program other than the first non-download program. Here, the data size of the first non-download program may be equivalent to the data size of the new download program, as long as the data size of the first non-download program is no less than the acquired data size. If there is no such area in the program receiving apparatus that has been prepared for the code increase, the data size acquiring unit 102 can be omitted.

The dividing unit 104 divides each of the new download program, the first non-download program, and the second non-download program into a plurality of divisions to which serial numbers for each of the programs (download program, first non-download program, and second non-download program) are appended. More specifically, first each program is divided into blocks of the same size to which download commands are respectively appended to generate scripts. Then each of these scripts is further divided into DLTs in each of which a download header is included in a model information field and a code data byte filed. Lastly serial group numbers are given to DLT groups generated from respective scripts, and serial sequence numbers are given to DLTs (sequences) generated from a script.

A download command mentioned here is to indicate the program receiving apparatus how to process a script. According to this download command, the program receiving apparatus executes download processing for the script. The download command is mainly made up of memory manipulation instructions that typically designate a source address and a destination address as operands. A copy command, for example, designates a copy destination address, a copy source address, and a copy size as operands. For other types of commands, they are not related to the main features of the present invention, so that their explanation has been omitted.

A script is made up of a block and a download command as described above. This block is the minimum unit of data transferred to the flash memory or else in the program receiving apparatus.

A download header is DLT identification information or the like that is necessary for download processing. By placing such necessary information in the beginning of a DLT, the processing of the program receiving apparatus on receiving the DLT is facilitated.

The identifier adding unit 105 appends a first identifier to each DLT of the groups generated from the new download program, and appends a second identifier to each DLT of the groups generated from the first and second non-download programs. Alternatively, the identifier adding unit 105 may append a third identifier to each DLT of the groups generated from the new download program, a fourth identifier to each DLT of the groups generated from the first non-download program, and a fifth identifier to each DLT of the groups generated from the second non-download program. The first to fifth identifiers each include a current ID which will be used by the program receiving apparatus to specify a program type for a DLT. In this embodiment, a download ID for designating a download sequence in the program receiving apparatus is added to each DLT, too.

The transmitting unit 106 repeatedly sends the generated DLTs with respective identifiers in a predetermined order.

Thus, program codes which are to be downloaded (hereinafter "download codes") are transmitted from the program transmitting apparatus 100 together with necessary information, in units of DLTs.

In the DLT format, a model information field (fixed to 145 bytes) and a code data byte field (fixed to 2 Kbytes) follow the section header (see "Download Transmission Standards" in ARIB STD-B16 chapter 4 for more details). For efficient download, in the present embodiment the both fields which are 2193 bytes long in total are used for download codes.

FIG. 10 shows how DLTs are created from download codes.

The generation of DLTs is performed by the dividing unit 104 and identifier adding unit 105 as follows.

(1) First, in consideration of a capacity of a reception memory and a sector structure of a flash memory in the program receiving apparatus, download codes (2 Mbytes in this embodiment) are divided into blocks (each being 128 Kbytes long in this embodiment).

(2) A download command is appended to each block to create a script.

(3) The script is then is divided into parts. The parts are written respectively into DLTs, with a download header being included in the model information field of each of the DLTs. Each of the DLTs generated as a result includes a section header, a download header (assigned to a part of the model information field), a part of the script (assigned to the remaining part of the model information field and the code data byte field), and a CRC32, in this order.

FIG. 11 shows an example of the contents of a download header. In the following description, a simple expression "program" indicates any of a download program and a non-download program.

Note that every DLT is given a download header of the same format.

In the figure, begin_version and end_version respectively specify the oldest and the latest of software versions which are subjected to download. Only when a software version of the program receiving apparatus is within the range from begin_version to end_version, the program receiving apparatus judges that the DLT is to be downloaded.

New_version specifies a new software version to be set after download. Once the download of the new control program has finished, the software version of the program receiving apparatus is changed to the version shown by new_version.

Exmodel_id is used for expanding model_id of the DLT and limits models which are subjected to download. Only if exmodel_id and an extension model ID of the program receiving apparatus match, the program receiving apparatus judges that the DLT is to be downloaded.

Exmodel_map is a bitmap for limiting apparatus types that are subjected to download. If a bit corresponding to the type of the program receiving apparatus is on, the program receiving apparatus judges that the DLT is to be downloaded.

Current_id is an identifier showing a type of a present program which the DLT belongs to.

Sub_id shows current_id of a program which can be downloaded concurrently with the present program.

Start_id shows current_id of a program which is to be initially downloaded.

Start_subid shows current_id of a program which can be downloaded concurrently with the program shown by start_id.

Next_id shows current_id of a program which is to be downloaded after the present program. In this embodiment, next_id of a program to be downloaded last is set at "0xffff".

Next_subid shows current_id of a program which can be downloaded concurrently with the program shown by next_id.

The most significant bit (MSB) of each of the above identifiers is used for distinguishing a download program from a non-download program. If the MSB of a 2-byte identifier is "1", a download program is indicated, while if the MSB is "0", a non-download program is indicated.

Grp_no is a group number of a group which the DLT belongs to. Here, serial group numbers starting from 0 have been given to DLT groups that have identical current_id.

Last_grpno is a group number of the last DLT group among DLT groups that have the same current_id as the DLT and is used to judge whether all DLT groups with the same current_id as the DLT have been downloaded. The number of groups for one program is no more than 32 in the present example, so that last_grpno<32 and $0 \leq \text{grp\_no} \leq \text{last\_grpno}$.

Seq_no is a sequence number of the DLT. Here, serial sequence numbers starting from 0 have been given to DLTs that have identical current_id and grp_no.

Last_seqno is a sequence number of the last sequence (DLT) among DLTs that have the same current_id and grp_id as the DLT and is used to judge whether all DLTs with the same current_id and grp_id as the DLT have been downloaded. The number of sequences for one group is no more than 256 in this example, so that last_seqno<256 and $0 \leq \text{seq\_no} \leq \text{last\_seqno}$.

Dlt_total shows the total number of valid DLTs in one cycle and is used for computing the progress during reception of DLTs.

Attr_flag is a set of flags showing an attribute of the DLT, where a type of processing is determined depending on a value of each bit. Suppose bit0 is used for judging whether CRC (cyclic redundancy check) is to be executed. If CRC is to be executed (bit0 showing "1"), a 6-bit CRC is added to 26-bit data.

Offset shows the number of bytes between the end of the download header and the beginning of the written script.

The generation of DLTs by the dividing unit 104 and identifier adding unit 105 is performed separately for the download program, the first non-download program, and the second non-download program.

The hierarchical structure of DLTs generated in the above way is as follows.

Since each program made up of download codes is larger than a DLT, it is impossible to write all of the download codes within one DLT. Accordingly, DLTs generated from the download and non-download programs are hierarchically structured.

Figure 12:
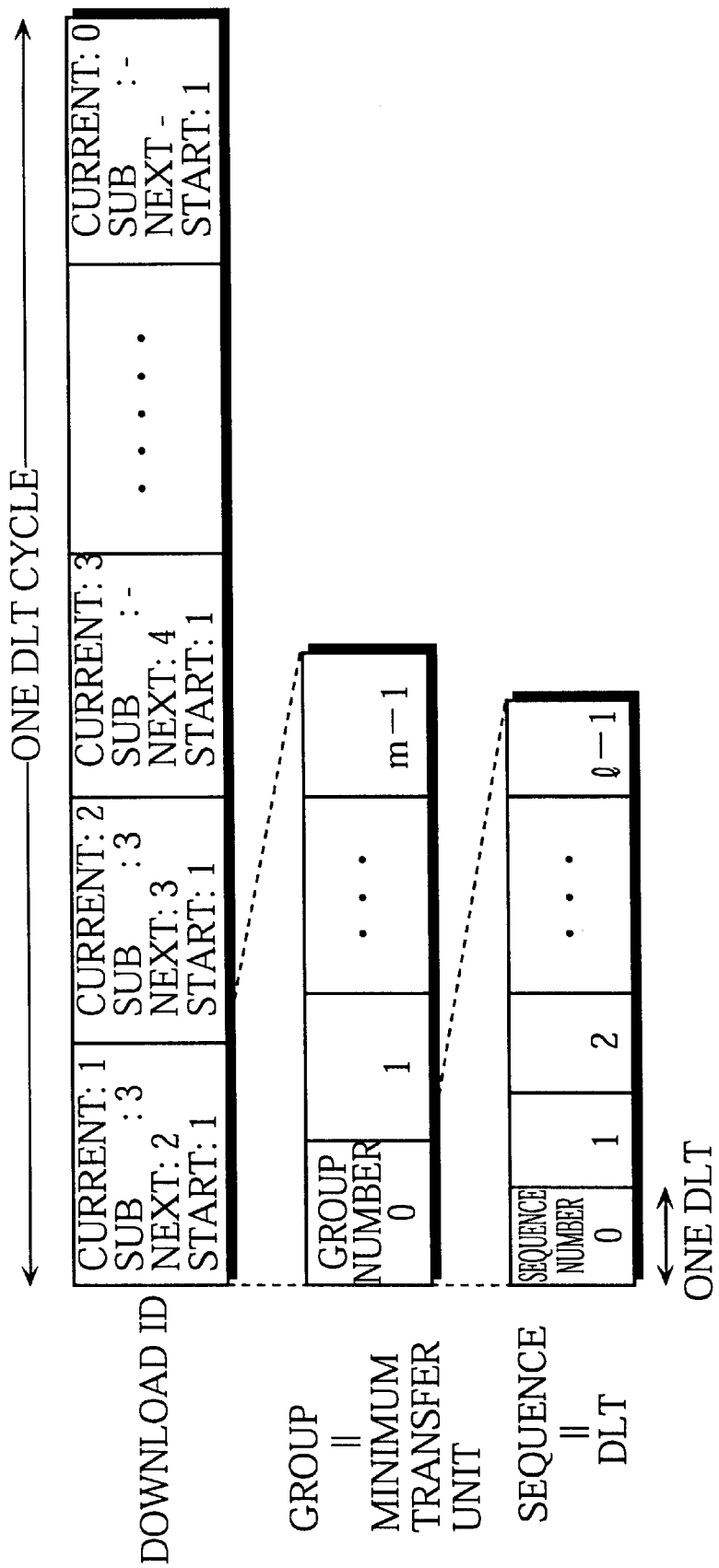
FIG. 12 shows the general hierarchical structure of DLTs generated by a dividing unit 104 and identifier adding unit 105.

FIG. 12 shows the general hierarchical structure of such DLTs generated by the dividing unit 104 and identifier adding unit 105.

As illustrated, one cycle of DLTs which are repeatedly transmitted is specified by download IDs. The number of groups that have the same download ID is 32 at the maximum, with serial group numbers being assigned to such groups. Further, the number of sequences that have the same group number is 256 at the maximum, with serial sequence numbers being assigned to such sequences.

A download ID is used for designating a download sequence in the program receiving apparatus and is made up of current_id, sub_id, next_id, start_id, next_subid, and start_subid. Among these, next_subid and start_subid are used for realizing prompt download processing. Next_subid of a present DLT is the same as sub_id in a DLT whose current_id is identical to next_id of the present DLT. Similarly, start_subid of the present DLT is the same as sub_id in a DLT whose current_id is identical to start_id of the present DLT. For the sake of convenience, therefore, the following explanation mainly uses current_id, sub_id, next_id, and start_id, instead of next_subid and start_subid.

Current_id is an identifier corresponding to a present program which is any of the download program, the first non-download program, and the second non-download program, indicating that DLTs with the same current_id have been generated from the same program.

Sub_id shows current_id of a program which can be downloaded during download of the present program in the program receiving apparatus.

Next_id shows current_id of a program that is to be downloaded following the present program in the program receiving apparatus.

Start_id shows current_id of a program that is to be initially downloaded in the program receiving apparatus.

In this embodiment, a first download ID is made up of "current_id=1, sub_id=3, next_id=2, start_id=1", a second download ID is made up of "current_id=2, sub_id=3, next_id=3, start_id=1", and a third download ID is made up of "current_id=3, sub_id=null (0xffff), next_13id=null (0xffff), start_id=1" (it is assumed in the present explanation that there is no download IDs following the third download ID, although this is not the case in FIG. 12 which shows more download IDs). With these combinations, it is specified that the download program is to be initially downloaded during which the second non-download program can be also downloaded, and the completion of downloading the download program is followed by download of the first non-download program during which the second non-download program can also be downloaded.

As for the predetermined order according to which the transmitting unit 106 transmits DLTS over and over again, one example is first transmitting all DLTs of the download program, then some of DLTS of the first non-download program, then all DLTs of the second non-download program, and lastly the rest of the DLTs of the first non-download program. As a result of sending DLTs according to such an order, the time taken for the download processing in the program receiving apparatus can be lessened.

Thus, the program transmitting apparatus 100 of the first embodiment of the present invention divides each of the new download program and the new non-download program that compose the new control program into DLTs to which identifiers are appended and repeatedly sends DLTs of the new download program and new non-download program.

Here, the program transmitting apparatus 100 may separate the non-download program into the first non-download program that cannot be downloaded until the download of the new download program ends and the second non-download program that can be downloaded before the download of the new download program ends, divide each of the first and second non-download programs into DLTs to which identifiers are appended, and repeatedly send DLTs of the new download program, first non-download program, and second non-download program in the predetermined order.

<Program Receiving Apparatus>

Figure 13:
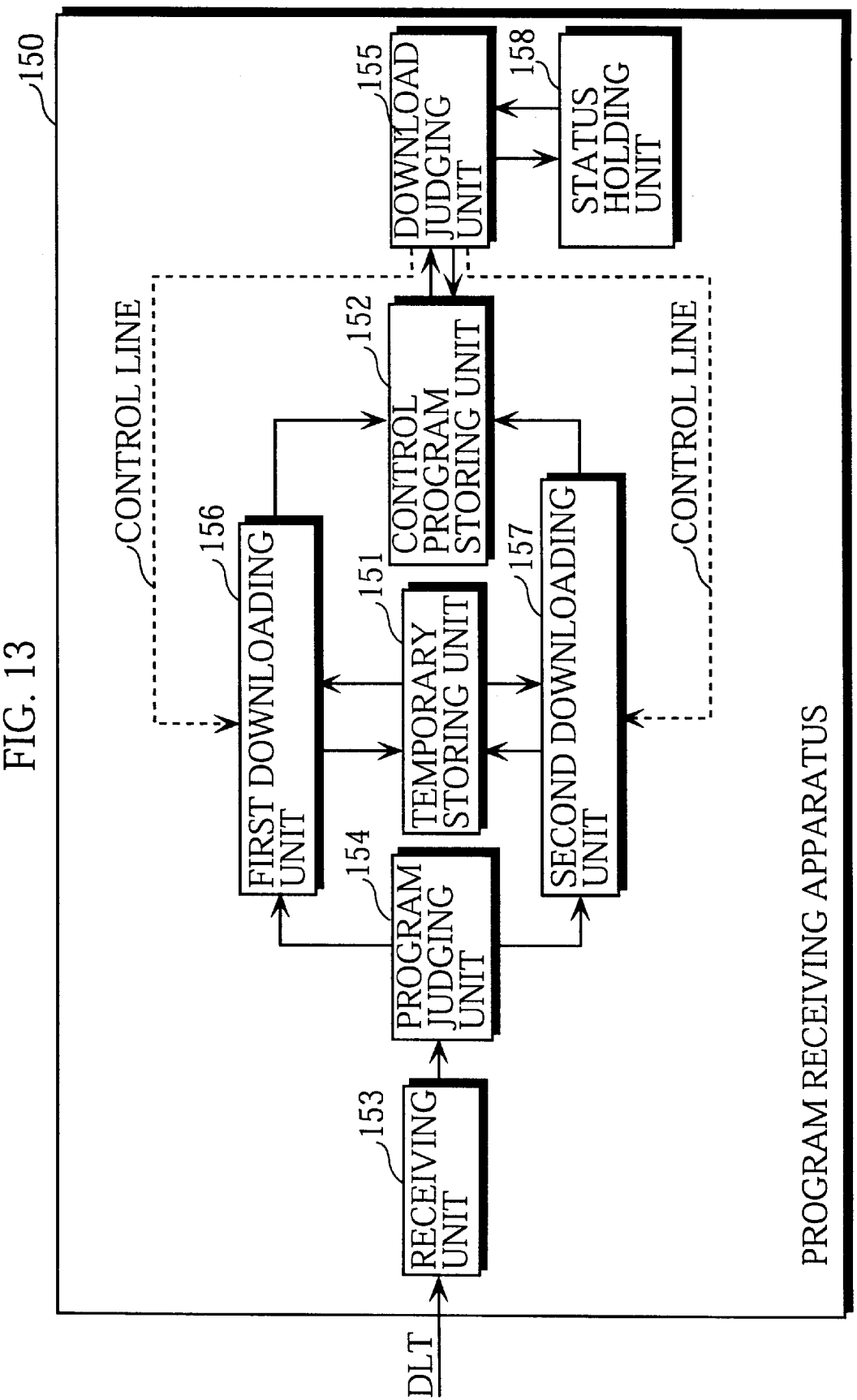
FIG. 13 shows the general configuration of a program receiving apparatus 150 of the first embodiment of the present invention.

FIG. 13 shows the general configuration of a program receiving apparatus of the first embodiment of the present invention.

This program receiving apparatus 150 includes a temporary storing unit 151, a control program storing unit 152, a receiving unit 153, a program judging unit 154, a download judging unit 155, a first downloading unit 156, a second downloading unit 157, and a status holding unit 158.

The temporary storing unit 151 is a general-purpose memory such as a DRAM and is used as a reception buffer. DLTs of each script are sequentially stored in this temporary storing unit 151.

The control program storing unit 152 is a nonvolatile rewritable memory such as a flash memory and prestores a current control program that is made up of a download program for controlling download processing and a non-download program for controlling processing other than the download processing.

The receiving unit 153 includes a tuner, a demodulator, and a demultiplexer and receives a new control program from the program transmitting apparatus 100 in units of DLTs to which the first and second identifiers or the third to fifth identifiers have been appended.

The program judging unit 154 is a TD or the like. The program judging unit 154 judges whether a received DLT of the new control program belongs to a new download program or a new non-download program, depending on which of the first and second identifiers is appended to the DLT. The program judging unit 154 may instead judge whether the received DLT belongs to the new download program, a first non-download program, or a second non-download program, depending on which of the third, fourth, and fifth identifiers is appended to the DLT.

The download judging unit 155 is implemented, for example, via a download program executed by a CPU and judges whether download of the new download program has been completed.

The first downloading unit 156 is implemented, for example, via the current download program executed by the CPU. Until the download judging unit 155 judges that the new download program has been completely downloaded, in accordance with the current download program stored in the control program storing unit 152, the first downloading unit 156 sequentially stores DLTs which belong to the new download program into the temporary storing unit 151 to form at least one script and transfers each of the scripts from the temporary storing unit 151 to an area (hereinafter "first area") in the control program storing unit 152 where a current first non-download program of the current non-download program has been stored, thereby writing the new download program over a part of the current non-download program.

At the same time, the first downloading unit 156 may sequentially store DLTs belonging to the new second non-download program into the temporary storing unit 151 to form at least one script, and transfer each of the scripts from the temporary storing unit 151 to an area (hereinafter "second area") in the control program storing unit 152 where a current second non-download program of the current non-download program has been stored, thereby writing a part of the new non-download program over a part of the current non-download program.

The second downloading unit 157 is implemented, for example, via a boot program and the new download program executed by the CPU. When the download judging unit 155 judges that the new download program has been completely downloaded, the second downloading unit 157 copies the new download program written in the first area to an area (hereinafter "third area") where the current download program has been stored, thereby writing the new download program over the current download program. The second downloading unit 157 then commences the control of the new download program written in the third area. The above procedure is executed by the boot program activated by a reboot instruction. Here, it is also possible to commence the control of the new download program in the first area without copying it to the third area.

Next, under the control of the new download program, the second downloading unit 157 sequentially stores DLTs belonging to the new non-download program into the temporary storing unit 151 to form at least one script and transfers each of the scripts from the temporary storing unit 151 to an area (hereinafter "unused area") in the control program storing unit 152 other than the area where the new download program which is being used is stored. By doing so, the second downloading unit 157 writes a part of the new non-download program over a part of the current control program which is not being used for the present control.

Also, if the first downloading unit 156 was writing the part of the new second non-download program (new second non-download program) over the part of the current non-download program (current second non-download program), the second downloading unit 157 takes over that download processing of the first downloading unit 156 under the control of the new download program. Simultaneously, the second downloading unit 157 sequentially stores DLTs belonging to the new first non-download program into the temporary storing unit 151 to form at least one script and transfers each of the scripts from the temporary storing unit 151 to an unused area (to the first area if the new download program was copied from the first area to the third area, or to the third area if the new download program was activated in the first area without being copied to the third area), thereby writing a part of the new non-download program over a part of the control program which is not being used for the present control.

The status holding unit 158 is a rewritable memory, such as an EEPROM, that can hold its storage contents even when power is off. The status holding unit 158 holds a status value that shows one out of: status 1 from the start of downloading the new control program until the complete transfer of the new download program to the control program storing unit 152; status 2 from the complete transfer of the new download program to the control program storing unit 152 until the start of the control of the new download program; status 3 from the start of the control of the new download program until the completion of downloading the new control program; and normal status where download processing is not being performed. Here, status values representing statuses 1~3 are respectively "1", "2", and "3", while a status value representing normal status is "0".

The status holding unit 158 also holds an execution ID, a concurrency ID, an update flag, new program copy information, transmission information, and a management table.

The execution ID shows current_id of a program that should be downloaded at present.

The concurrency ID shows current_id of a program which can be downloaded concurrently with the program specified by the execution ID.

When the download processing begins, start_id and start_subid of a given DLT are stored in the status holding unit 158 respectively as the execution ID and the concurrency ID, and DLTs of a program specified by any of the execution ID and the concurrency ID are subjected to reception. Once a program specified by the execution ID has completely been processed, the execution ID and the concurrency ID in the status holding unit 158 are replaced respectively with next_id and next_subid of a DLT of that program. If next_id of the DLT is "0xffff", then it is judged that there are no more programs to be received.

The update flag is a flag showing whether the current control program is being updated. In this embodiment, the flag shows "1" during the update. Otherwise, the flag shows "0".

The new program copy information includes new program presence information showing whether the new download program has been completely written in a non-download program area (area where the current non-download program was stored) in the control program storing unit 152, and information showing a copy destination address, copy source address, and copy size of the new download program. In the present example, the new program presence information shows "1" if the whole new download program has been written in the non-download program area. Otherwise, the new program presence information shows "0". Also, the copy source address shows the start address at which the new download program is written in the non-download program area, the copy destination address shows the start address of a download program area (area where the current download program has been stored), and the copy size shows the data size of the new download program.

The transmission information is necessary for switching the tuner according to a frequency and a polarization plane when receiving download codes.

The management table is used to manage whether download codes of each group have been transferred to the control program storing unit 152. Also, when in each program a group is first transferred, a download header of that group is registered in the management table.

Thus, the program receiving apparatus 150 of the first embodiment of the present invention is equipped with storage means, such as a flash memory, that has the download program area and the non-download program area. With this structure, the program receiving apparatus 150 receives the new control program in units of DLTs and refers to identifiers accompanying the received DLTs to write the new download program into a part of the non-download program area. When the new download program has been fully written, the new download program is transferred from the non-download program area to the download program area for updating the current download program, and then the new non-download program is written into the non-download program area.

Here, the non-download program area may further be divided into a first non-download program area and a second non-download program area, wherein the new second non-download program is written into the second non-download program area while the new download program is written into the first non-download program area.

<Program Code Downloading Method>

Program codes can be grouped under a boot program, a download program, or a non-download program.

In general, the boot program is initially used when activating the CPU and cannot be rewritten by download. The boot program is also used in this embodiment when conditions for starting download processing are met, when the download program is updated, and when the download processing is completed.

The download program is made up of libraries and drivers which are necessary for download processing.

The non-download program is made up of libraries, such as a font library, and drivers which are not related to the download processing.

Figure 14:
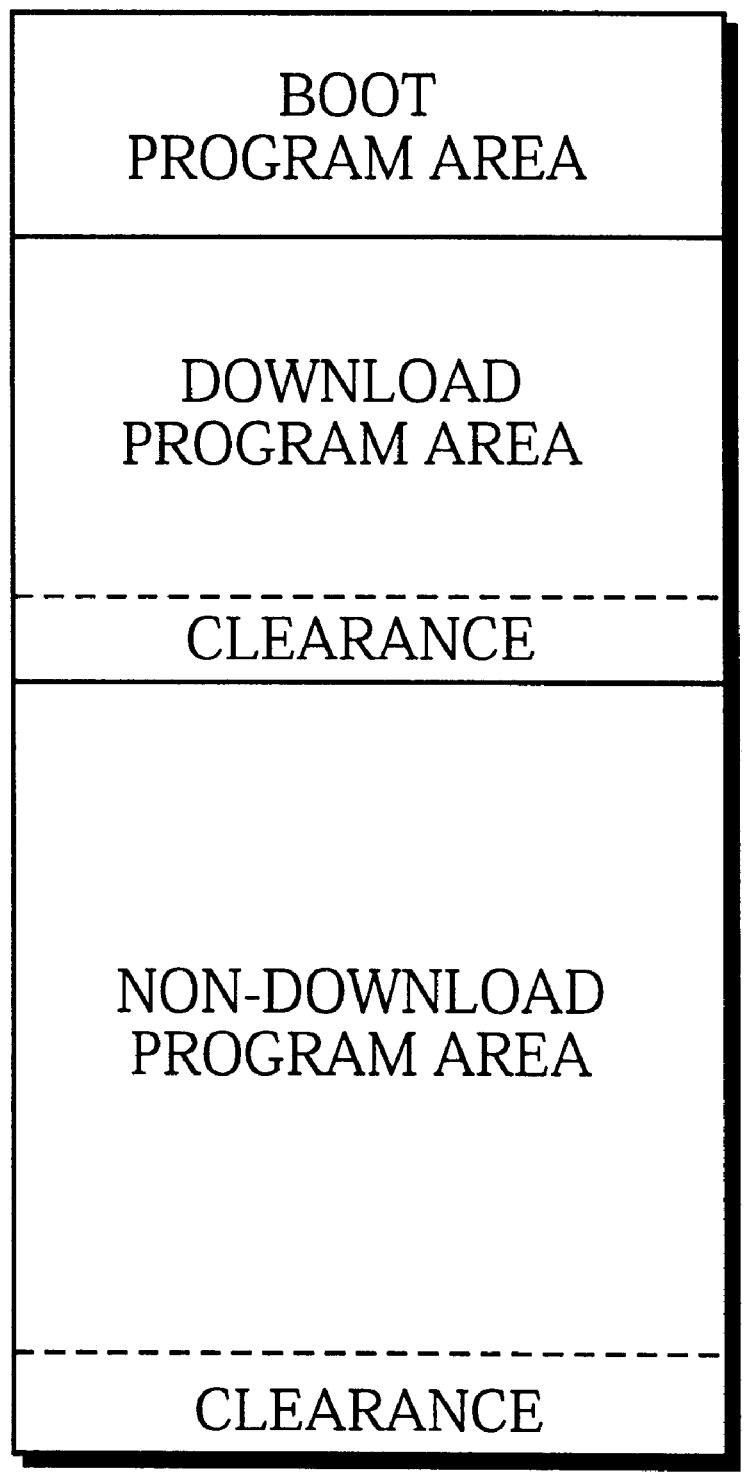
FIG. 14 shows the storage contents of a control program storing unit 152 that stores a current control program.

FIG. 14 shows the storage state of the control program storing unit 152 that stores the current control program.

As shown in the figure, the control program storing unit 152 is divided into a boot program area, a download program area, and a non-download program area, with a clearance (unassigned area) being given to each of the download program area and the non-download program area as the memory capacity allows, in preparation for increases of the data size of each program after update. Given that patching is performed in units of modules, each program area may further be divided into module areas corresponding to the modules with a clearance being given to each module area, in preparation for increases of the data size of each module after update.

Figure 15A:
FIG. 15A shows the state of a temporary storing unit 151 during non-download.
Figure 15B:
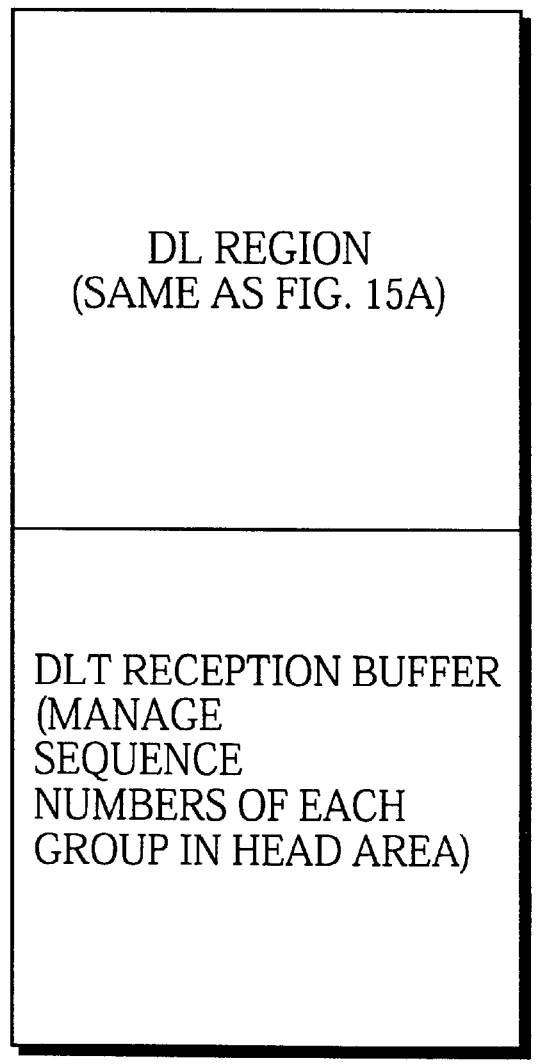
FIG. 15B shows the state of the temporary storing unit 151 during download.

FIG. 15A shows the state of the temporary storing unit 151 when download is not being performed, whereas FIG. 15B shows the state of the temporary storing unit 151 when the download is being performed.

Figure 16:
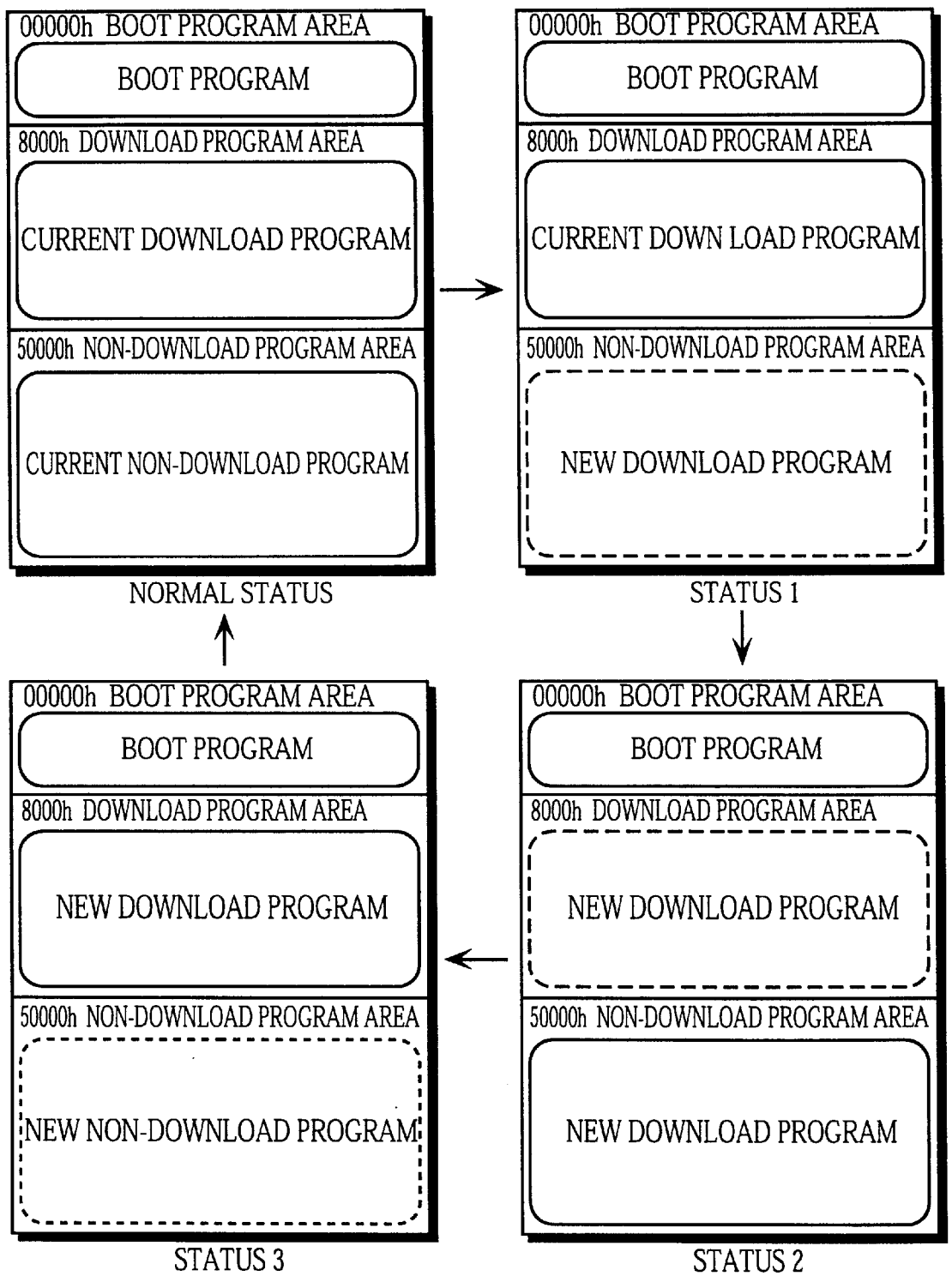
FIG. 16 shows changes of the storage contents of the control program storing unit 152 during download.

FIG. 16 shows changes of the storage contents of the control program storing unit 152 during the download processing.

Figure 17:
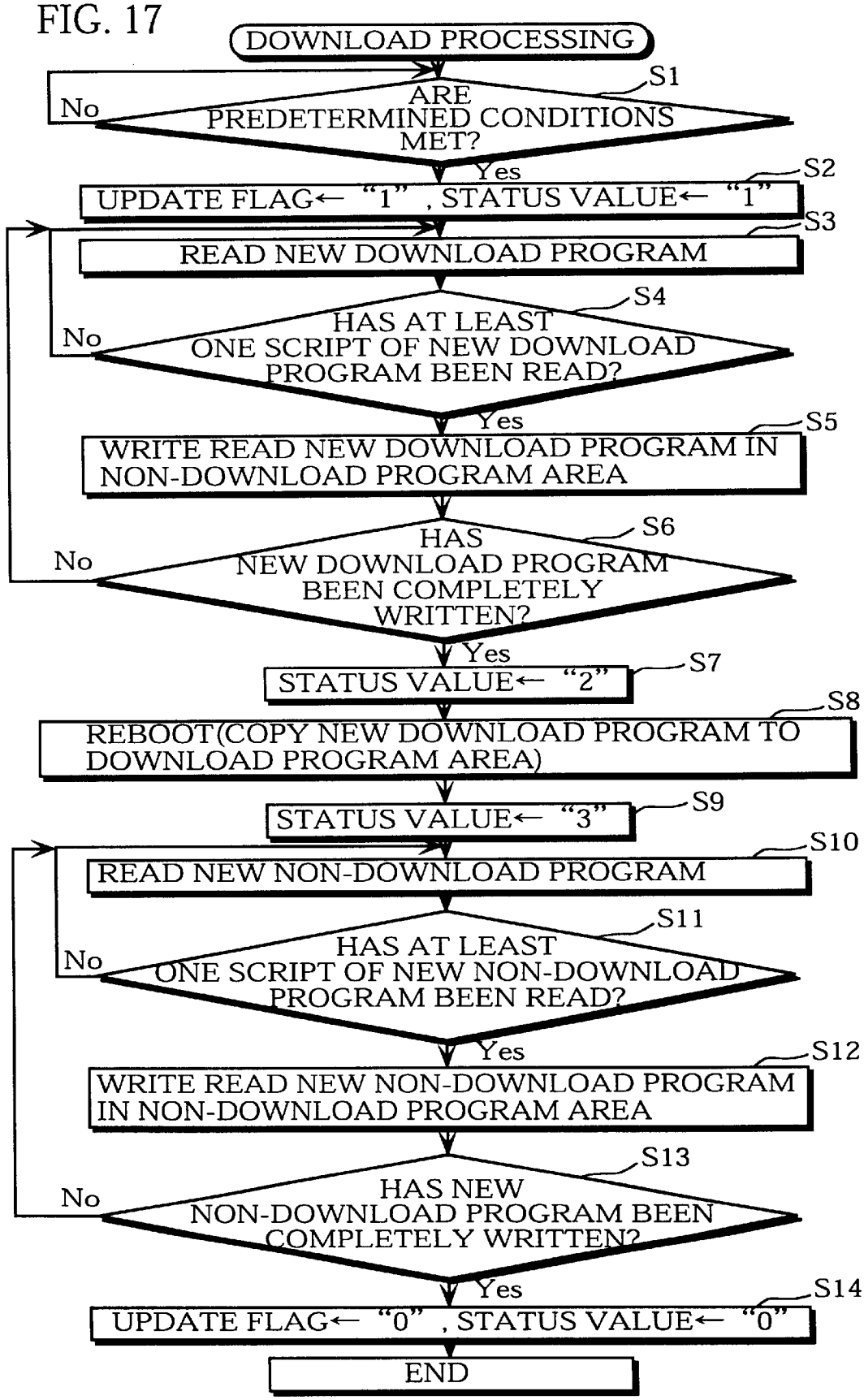
FIG. 17 is a flowchart showing the overall download processing.

FIG. 17 is a flowchart showing the download processing.

The download processing is described below with reference to FIGS. 15~17.

(1) The status value held in the status holding unit 158 shows "0" under normal status (top left of FIG. 16). Once predetermined conditions for starting the download are met, the download processing is commenced (S1).

(2) Once the download processing has started, the update flag held in the status holding unit 158 is set at "1", and the status value is changed to "1" indicating status 1 (top right of FIG. 16) (S2).

(3) Data of a new download program is read into the temporary storing unit 151 (S3).

(4) Step S3 is repeated until at least one script of the new download program is read (S4).

(5) When at least one script of the new download program has been read, the read new download program is written from the temporary storing unit 151 into the non-download program area in the control program storing unit 152 in units of scripts (S5).

(6) Steps S3~S5 are repeated until the new download program is completely written in the non-download program area in the control program storing unit 152 (S6).

(7) Once the new download program has been completely written, the status value is changed to "2" indicating status 2 (bottom right of FIG. 16) (S7).

(8) Reboot is executed. Here, according to the boot program the new download program written in the non-download program area in steps S3~S6 is copied to the download program area (S8).

(9) The status value is changed to "3" indicating status 3 (bottom left of FIG. 16) (S9).

(10) Data of a new non-download program is read into the temporary storing unit 151 (S10).

(11) Step S10 is repeated until at least one script of the new non-download program is read (S11).

(12) Once at least one script of the new non-download program has been read, the read new non-download program is written from the temporary storing unit 151 into the non-download program area in the control program storing unit 152 in units of scripts (S12).

(13) Step S10~S12 are repeated until the new non-download program is completely written in the non-download program area in the control program storing unit 152 (S13).

(14) When the new non-download program has been fully written, the update flag in the status holding unit 158 is changed to "0" indicating that update is not being performed, and the status value is changed to "0" indicating normal status (top left of FIG. 16) (S14).

Note here that an area (shown in the lower half of FIG. 15B, the area being hereafter called "buffer region") in the temporary storing unit 151 where the new download program is stored in step S3 and the new non-download program is stored in step S10 is a region (non-DL region in FIG. 15A) which is used by the non-download program at normal status. In doing so, the region storing the non-download program which does not operate during the download can be effectively used. Also, a management table is included at the head of the buffer region to manage the reception state of sequences for each group.

Also, in step S4 or S11, the condition for repeating step S3 or S10 may not be that at least one script of the program is read but that the buffer region becomes full.

The number of scripts simultaneously transferred from the temporary storing unit 151 to the control program storing unit 152 in step S5 or S12 depends on the capacity of the buffer region. If the capacity of the buffer region is 512 Kbytes and the data size of a script is 128 Kbytes, then at most 4 scripts can be written into the control program storing unit 152 at one time.

Also, the reception may not necessarily be started from the new download program. For example, it is possible in step S3 to commence reading a part of the new non-download program corresponding to the non-download area aside from the area into which the new download program is written in step S5.

Figure 18:
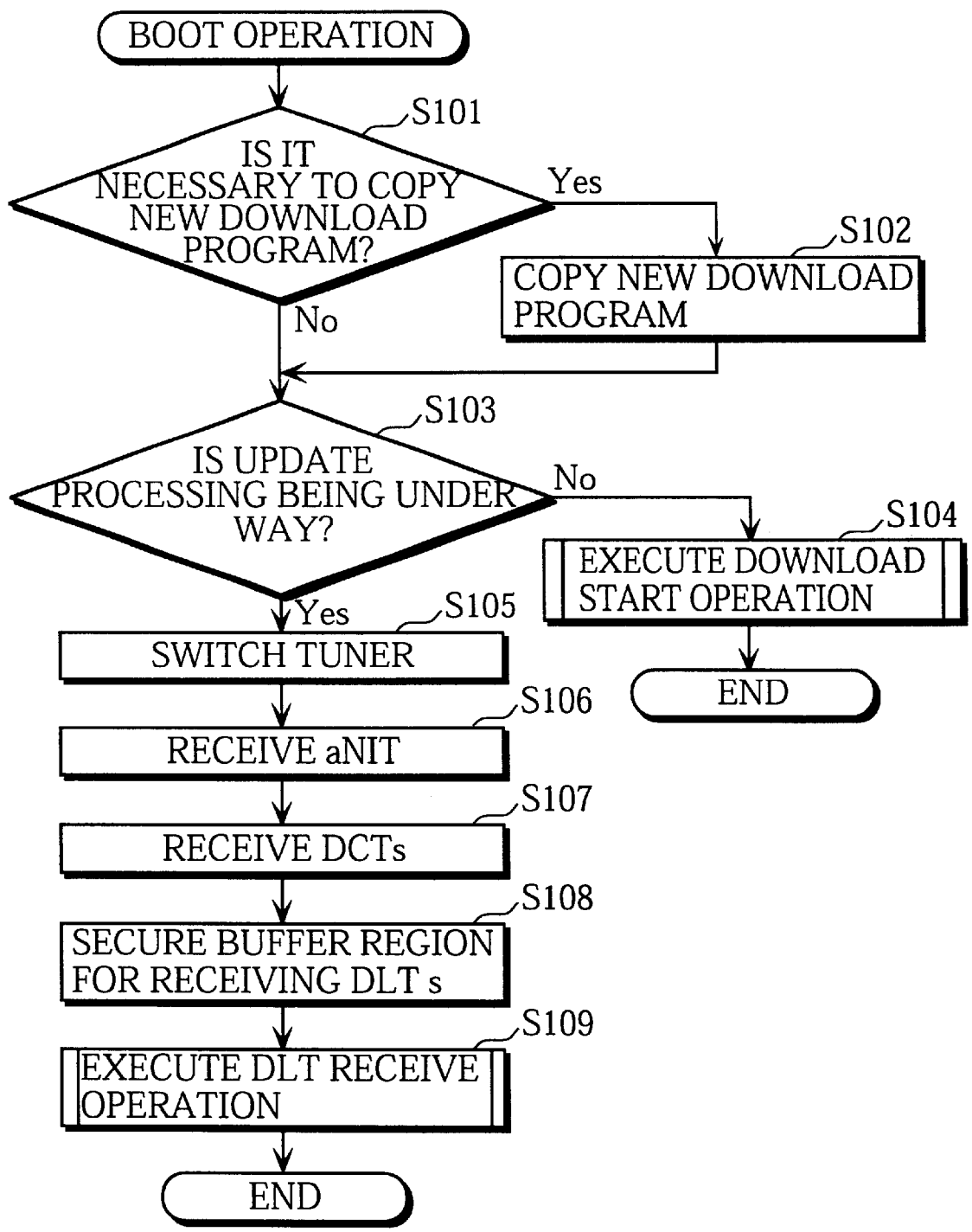
FIG. 18 is a flowchart showing the boot operation by a boot program.

FIG. 18 is a flowchart showing the boot operation by the boot program.

This boot operation is executed as follows.

(1) With reference to the new program presence information held in the status holding unit 158, judge whether step S8 in FIG. 17 has to be performed, that is, whether the new download program written in the non-download program area needs to be copied to the download program area (S101).

(2) When the new download program needs to be copied, execute step S8 according to the copy destination address, copy source address, and copy size included in the new program copy information in the status holding unit 158 (S102).

(3) With reference to the update flag in the status holding unit 158, judge whether update processing is under way (S103).

Figure 19:
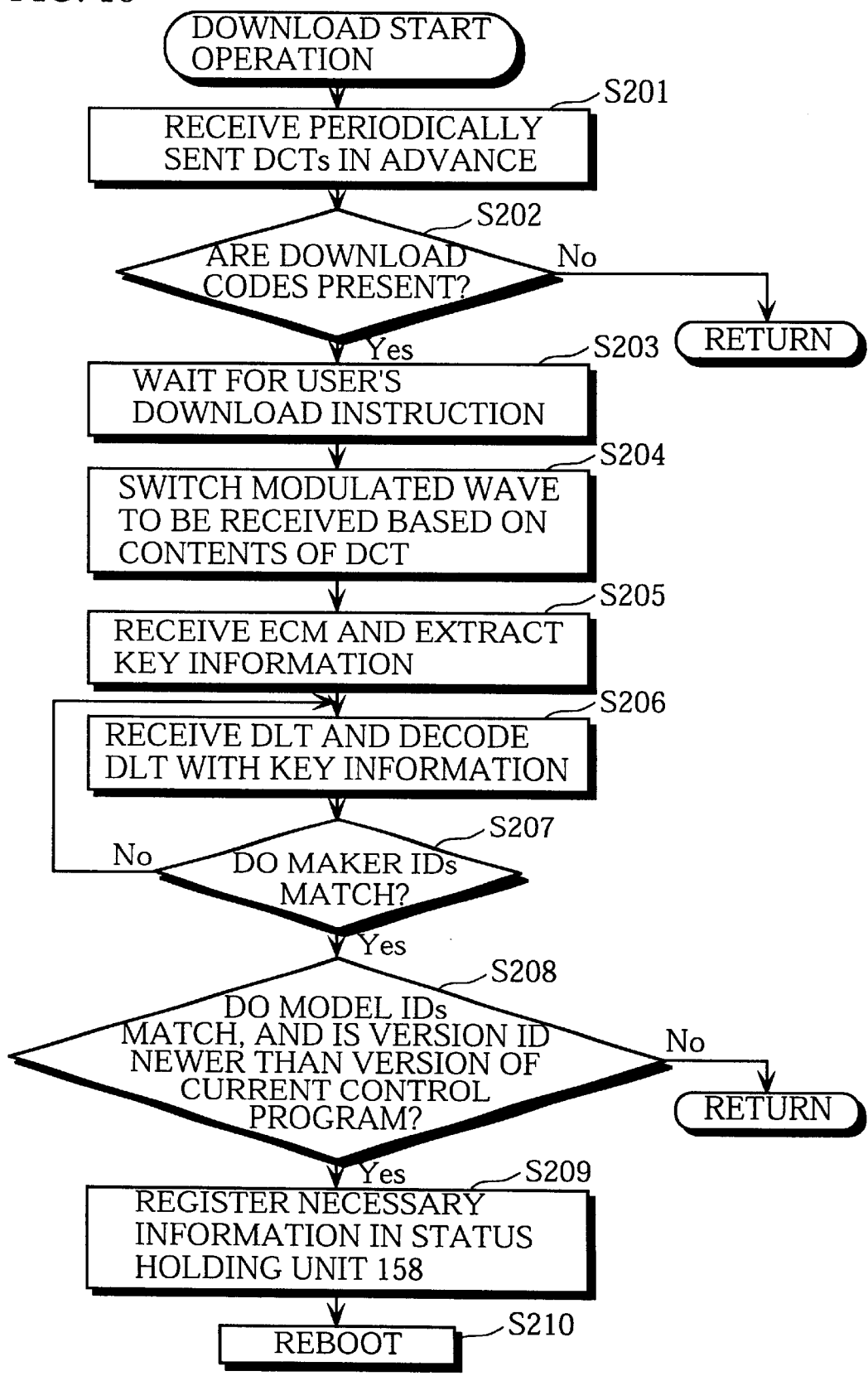
FIG. 19 is a flowchart showing the download start operation.

(4) If the update processing is not being performed, it means that the program receiving apparatus 150 is in normal status. At this point the download start operation shown in FIG. 19 is executed (S104).

(5) If the update processing is under way, on the other hand, switch the tuner based on the transmission information held in the status holding unit 158 (S105).

(6) Receive a NIT to confirm whether the program receiving apparatus 150 is linked to a proper network (S106).

(7) Receive DCTs to confirm whether download codes which are to be downloaded next are present based on maker_id, model_id, and version_id of each of the received DCTs (S107).

(8) Secure the buffer region for receiving DLTs (lower half of FIG. 15B) (S108).

Figure 20:
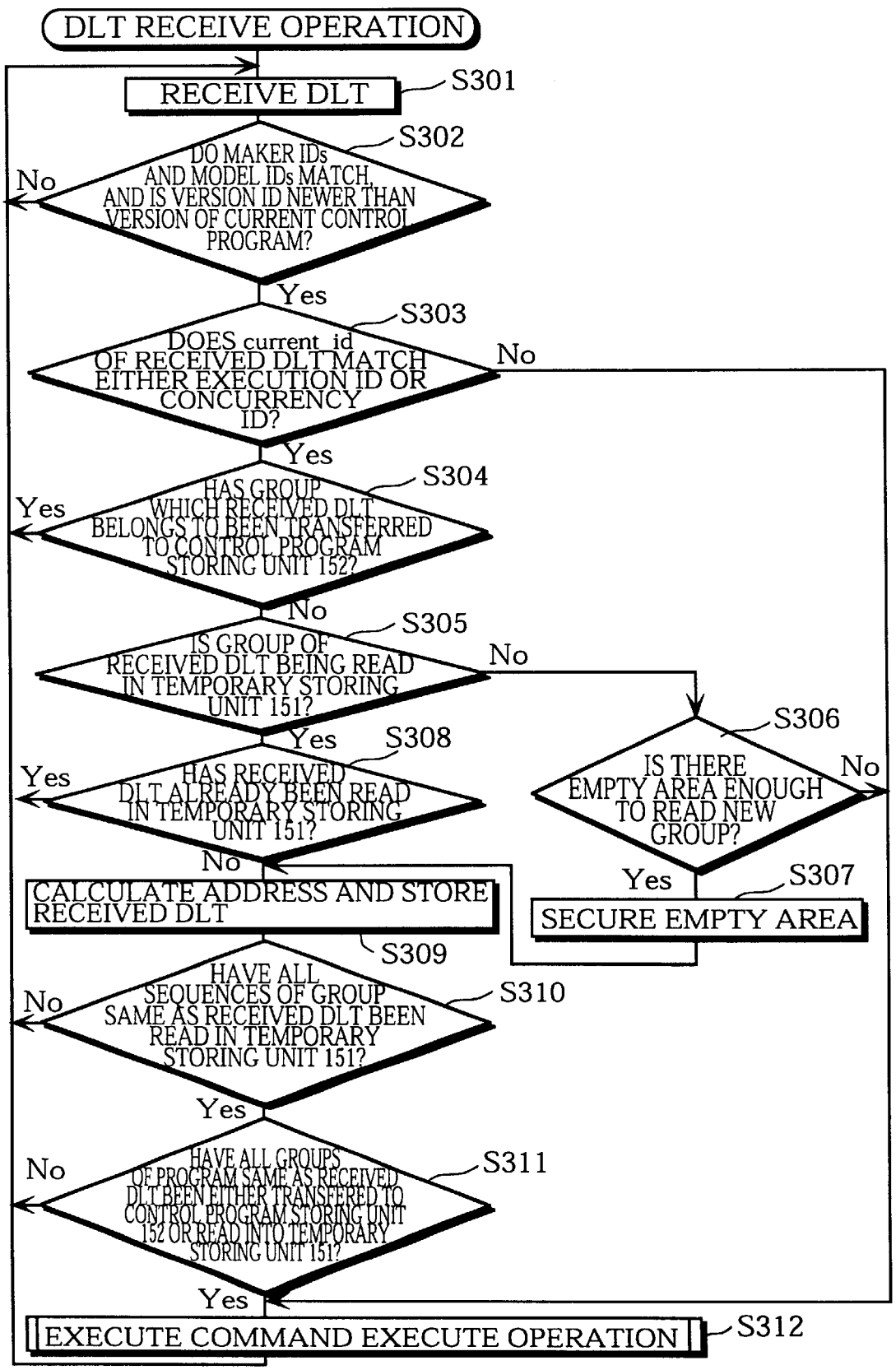
FIG. 20 is a flowchart showing the DLT receive operation.

(9) Execute the DLT receive operation shown in FIG. 20 (S109).

FIG. 19 is a flowchart showing the download start operation.

This download start operation is performed as follows.

(1) Receive DCTs sent at regular time intervals during normal status (S201).

(2) Judge whether download codes to be downloaded are present based on maker_id, model_id, and version_id of each received DCT (S202). If there are no such download codes, the download processing is not possible, so that the download start operation is terminated (RETURN).

(3) If there are download codes to be downloaded, display a message notifying the user of the presence of the download codes on a monitor or the like and wait for an instruction from the user (S203).

(4) On receiving a download instruction from the user, change the modulated wave to be received by the receiving unit 153 to a modulated wave of a frequency specified by transport_stream_id included in a DCT with which it is judged that the download codes exist (S204).

(5) Receive an ECM and extract key information (S205).

(6) Receive a DLT and decode the DLT using the key information (S206).

(7) Repeat step S206 until maker_id in the decoded DLT matches a maker ID of the program receiving apparatus 150 (S207).

(8) When the maker IDs match, judge whether model_id of the decoded DLT matches a model ID of the program receiving apparatus 150 and whether version_id of the decoded DLT is newer than a version of the current control program of the program receiving apparatus 150 (S208). Unless both conditions are met, the download start operation is terminated, judging that the download processing cannot be performed (RETURN).

(9) If both conditions are met, store information necessary for the download processing into the status holding unit 158 and perform initial setting. Specifically, register start_id and start_subid in the DLT into the status holding unit 158 respectively as the execution ID and the concurrency ID, change the update flag to "1" showing that the update is under way, include data on the present frequency and polarization plane into the transmission information, and initialize the management table in the status holding unit 158 (S209).

(10) Execute reboot (S210). As a result, the download processing is performed via the boot program.

FIG. 20 is a flowchart showing the DLT receive operation.

This DLT receive operation is performed as follows.

This operation is conducted in step S109 in FIG. 18 during the update.

(1) Receive a DLT (S301).

(2) Repeat step S301 until maker_id and model_id of the received DLT respectively match the maker ID and model ID of the program receiving apparatus 150 and version_id of the received DLT is newer than the version of the current control program of the program receiving apparatus 150 (S302).

(3) On receiving a DLT that meets the conditions in step S302, judge whether current_id of the received DLT matches any of the execution ID and concurrency ID held in the status holding unit 158 (S303). If current_id does not match any of the execution ID and the concurrency ID, abandon the received DLT and proceed to step S312 to perform the command execute operation shown in FIG. 21 on DLTs read into the temporary storing unit 151 by this point in time.

(4) If current_id matches any of the execution ID and the concurrency ID, judge whether a group which the received DLT belongs to has already been transferred to the control program storing unit 152, based on the management table in the status holding unit 158 (S304). If so, return to step S301 to receive another DLT.

(5) If the group has not yet been transferred to the control program storing unit 152, judge whether the group is being read into the temporary storing unit 151 by referring to the buffer region management table in the temporary storing unit 151 (S305).

(6) If the group is not being read, check whether an empty area sufficient for storing a new group exists in the buffer region in the temporary storing unit 151 (S306). If such an empty area cannot be found, abandon the received DLT and proceed to step S312 to perform the command execute operation on the DLTs read into the temporary storing unit 151 up to this time.

(7) If there is a sufficient empty area in the buffer region, secure that area for reading the new group and proceed to step S309 (S307).

(8) If the group is currently being read in step S305, on the other hand, judge whether the received DLT has been read in the temporary storing unit 151 by referring to the buffer region management table (S308). When the DLT has already been read, abandon the DLT and return to step S301 to receive another DLT.

(9) If the received DLT has not been read in the temporary storing unit 151, calculate an address from a group number and sequence number of the DLT and store the DLT into a location in the temporary storing unit 151 specified by the calculated address (S309). Here, the information used only for the above procedure (e.g. start_id) does not have to be stored in the temporary storing unit 151. Also, since information used for the subsequent procedure (e.g. MSB of current_id) is the same for DLTs of the same group, it is not necessary to store such information for each DLT. Accordingly, such information used for the subsequent procedure is stored only when first processing a DLT in each group, and for succeeding DLTs of the group only download codes of these DLTs are stored.

(10) After reading the received DLT into the temporary storing unit 151, judge whether all DLTs (sequences) which belong to the same group as the received DLT have been read in the temporary storing unit 151 (S310). If not, return to step S301 to receive another DLT.

(11) If all sequences of the group have been read in the temporary storing unit 151, judge whether all groups of a program specified by current_id of the received DLT have been either transferred to the control program storing unit 152 or read into the temporary storing unit 151, with reference to the management table in the status holding unit 158 and the buffer region management table in the temporary storing unit 151 (S311). If any of the groups has been neither transferred nor read, return to step S301 to receive another DLT.

(12) If all of the groups have been either transferred or read in step S311, execute the command execute operation on DLTs which have been read in the temporary storing unit 151 up to this time (S312).

Figure 21:
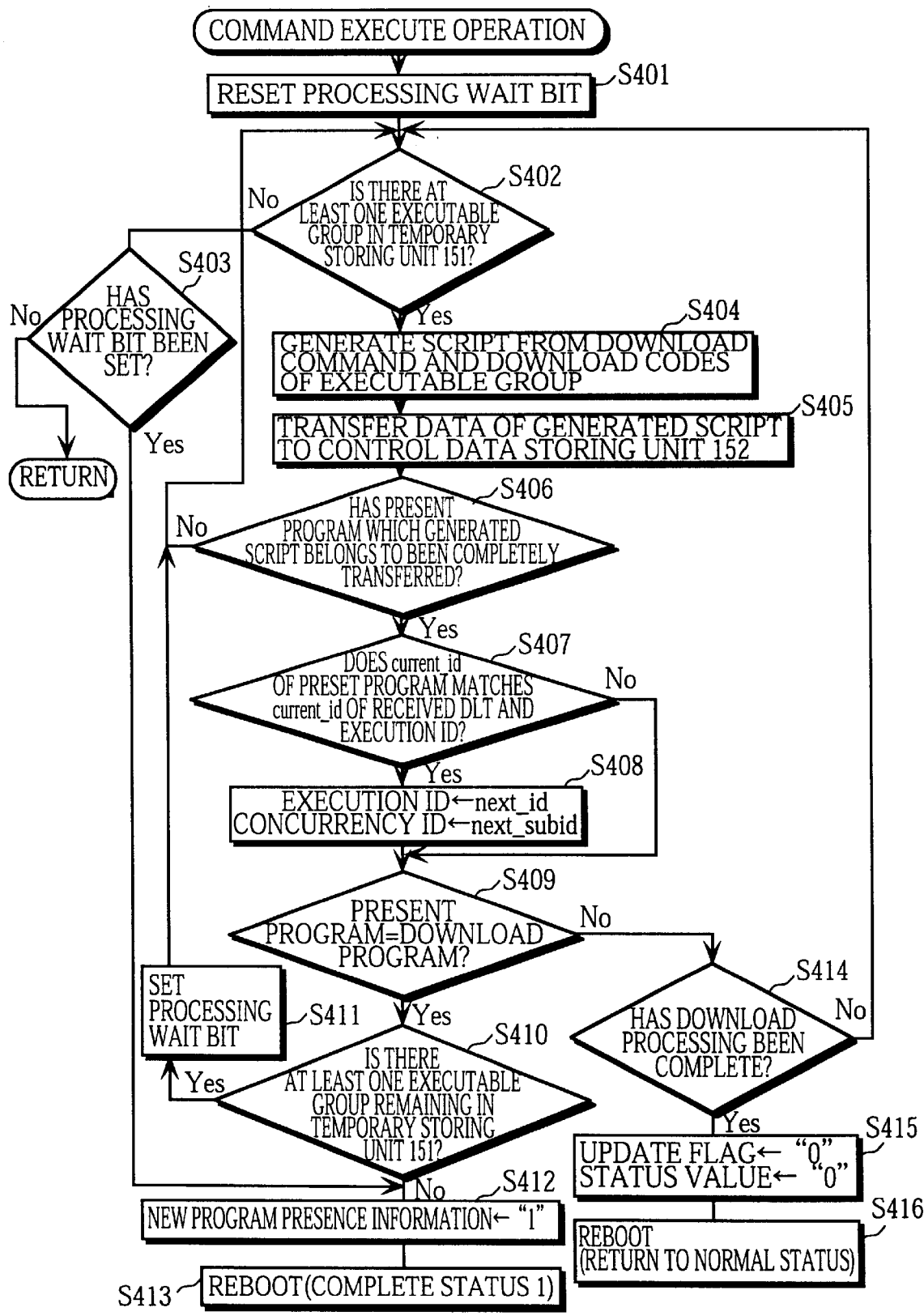
FIG. 21 is a flowchart showing the command execute operation.

FIG. 21 is a flowchart showing the command execute operation.

This command execute operation is performed as follows.

Note that this operation is performed in step S312 in FIG. 20 during the update processing.

(1) Reset a processing wait bit which indicates that the new download program has been completely transferred to the control program storing unit 152 and there is at least one group remaining in the temporary storing unit 151 which has not been transferred (S401). This processing wait bit is held in the status holding unit 158.

(2) Judge whether at least one executable group (group whose sequences have all been stored) exists in the temporary storing unit 151, with reference to the buffer region management table in the temporary storing unit 151 (S402).

(3) If there is no executable group, check whether the processing wait bit has been set (S403). If the processing wait bit has not been set, terminate the command execute operation and return to the DLT receive operation. If the processing wait bit has been set, proceed to step S412 to handle the new download program which has completely been transferred to the control program storing unit 152.

(4) If there is at least one executable group in the temporary storing unit 151 in step S402, consecutively link a download command and download codes included in one of such executable groups to form a script (S404). Alternatively, this procedure may be performed in step S309 in FIG. 20.

(5) According to a copy command in the download command present at the header of the generated script, transfer data of the script to the control program storing unit 152 (S405). If this group is the first group to be transferred in a present program which the group belongs to, register a download header of the group in the management table in the status holding unit 158.

(6) Judge whether data of the present program has been completely transferred to the control program storing unit 152 as a result of transferring the data of the script, with reference to the management table in the status holding unit 158 (S406). If not, return to step S402 to process another executable group remaining in the temporary storing unit 151.

(7) If the present program has been completely transferred in step S406, judge whether current_id specifying the present program matches current_id of the received DLT and the execution : ID held in the status holding unit 158, by referring to the management table in the status holding unit 158 (S407). Unless current_id of the present program matches both of current_id of the received DLT and the execution ID, the information stored in the status holding unit 158 for the download processing will not be renewed (skip step S408).

(8) When the condition in step S407 is met, renew the information necessary for the download processing in the status holding unit 158. Here, next_id and next_subid of the received DLT are set as the execution ID and the concurrency ID (S408).

(9) Judge whether the present program is the new download program, based on the MSB of current_id that specifies the present program (S409).

(10) If the present program is the new download program, check whether at least one executable group remains in the temporary storing unit 151, by referring to the buffer region management table (S410). (11) When there is at least one executable group in the temporary storing unit 151, set the processing wait bit and return to step S402 to process the remaining groups (S411). (12) When there is no executable group in the temporary storing unit 151, set the new program presence information in the status holding unit 158 at "1" indicating that the whole new download program has been written in the non-download program area in the control program storing unit 152, to complete status 1 (S412).

(13) Execute reboot (S413).

(14) If the present program is not the new download program in step S409, judge whether the download processing has been completed (S414). The download processing is judged as being complete when a program corresponding to current_id same as the execution ID in the status holding unit 158 has been completely updated and next_id of the present program shows "0xffff". If the download processing has not been complete, return to step S402 to process remaining executable groups.

(15) If the download processing has been complete, change the update flag in the status holding unit 158 to "0" indicating that the update processing is not being performed, and change the status value in the status holding unit 158 to "0" indicating normal status (top left of FIG. 16) (S415).

(16) Execute reboot (S416).

<Timing of Download Processing>

In the following explanation, the download program area and non-download program area in the control program storing unit 152 are respectively abbreviated to a DL area and a non-DL area, with the capacity of the buffer region in the temporary storing unit 151 being of the order of 512 Kbytes.

First, the timing of download processing that does not use the concurrency ID is exemplified below.

Figure 22:
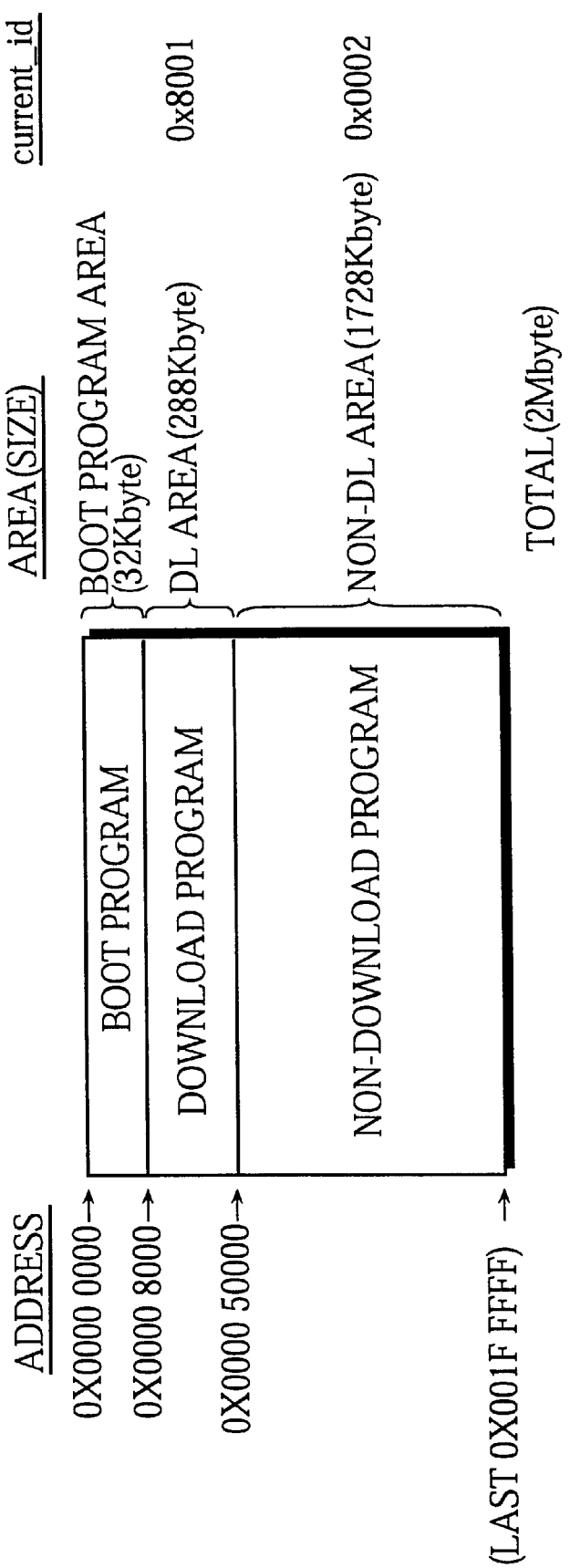
FIG. 22 shows a memory map of the control program storing unit 152.

FIG. 22 shows a memory map of the control program storing unit 152. Here, the boot program is not subjected to download.

As illustrated, the control program storing unit 152 has one DL area that stores a current download program whose current_id is "0x8001", and one non-DL area that stores a current non-download program whose current_id is "0x0002". The size of each area is, for instance, 32 Kbytes for the boot program area, 288 Kbytes for the DL area, and 1728 Kbytes for the non-DL area, i.e. 2 Mbytes in total.

Since a new download program is to be transferred to the non-DL area, a new non-download program cannot be transferred until the new download program replaces the current download program.

FIG. 23 is a timing chart of the download processing in this example.

Here, storage of DLTs in the temporary storing unit 151 and transfer of data of the new control program to the control program storing unit 152 cannot be conducted at the same time.

The DL unit in the figure represents a plurality of DLTs that include the new download program corresponding to the DL area in FIG. 22, while the non-DL unit represents a plurality of DLTs that include the new non-download program corresponding to the non-DL area in FIG. 22.

Also, each of the IDs shown in FIG. 23 is associated with the DL unit or non-DL unit given directly below.

As shown in the figure, the new control program is made up of the DL unit and the non-DL unit that are sequentially sent from the program transmitting apparatus 100 in cycles.

A double-headed arrow with the letter "W" indicates that data of the new control program is being transferred to the control program storing unit 152, while a double-headed arrow without "W" indicates that DLTs are being stored into the temporary storing unit 151.

The start mark "▼" represents the timing of starting the download processing, while the reboot mark "Δ" represents the timing of starting reboot.

The transfer of data of the new control program to the control program storing unit 152 is started when any of the following is true: the buffer region in the temporary storing unit 151 becomes full; the DL unit is switched to the non-DL unit, and vice versa; the storage of the DL unit is completed; and the storage of the non-DL unit is completed.

In this example, after the DL unit is transferred to the non-DL area, the DL unit is copied to the DL area by reboot. Then, after the non-DL unit is transferred to the non-DL area over almost two cycles, reboot is executed to complete the download processing.

Figure 23A:
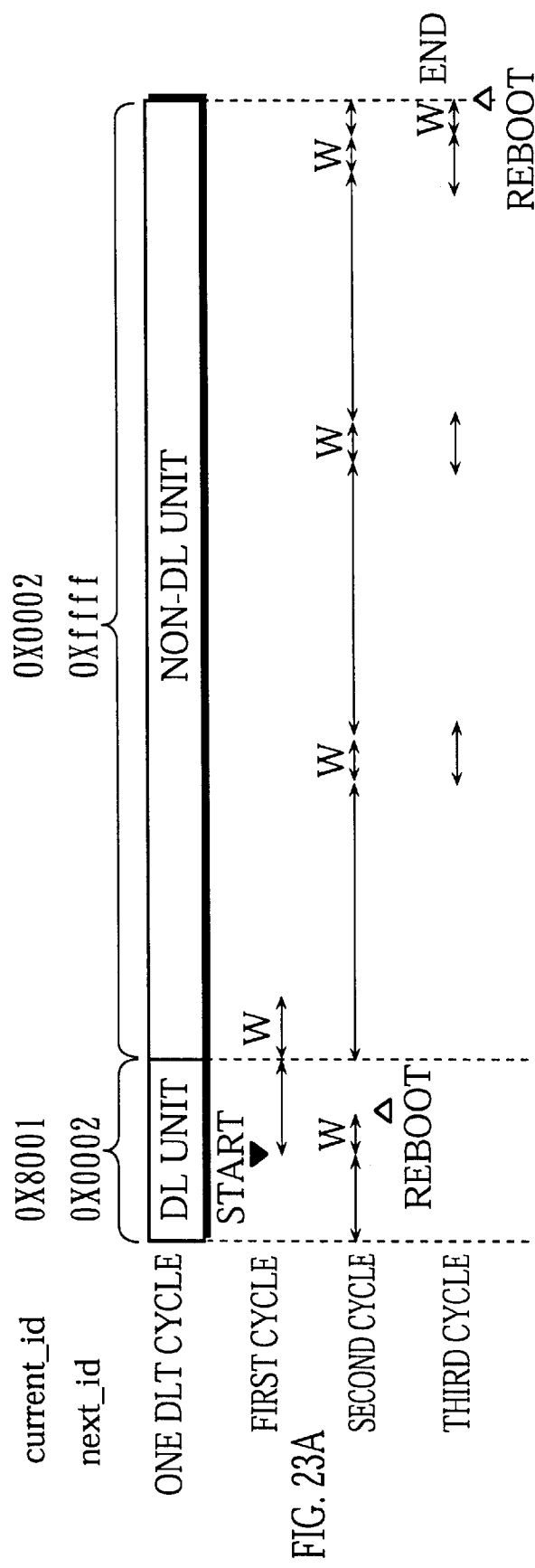
FIG. 23 is a timing chart for download processing.
Figure 23B:
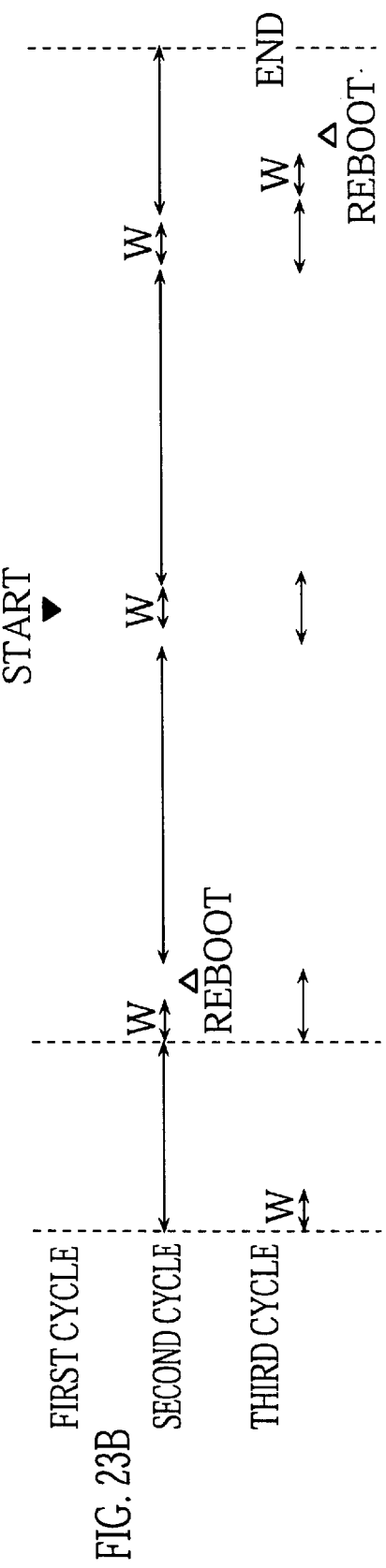

FIG. 23A shows the timing of storage and transfer when the download processing is commenced at some midpoint of the DL unit, whereas FIG. 23B shows the timing of storage and transfer when the download processing is commenced at a midpoint of the non-DL unit.

The download processing in FIG. 23A takes "(a little less than three cycles)+(reboot time)", while the download processing in FIG. 23B takes "(two and half cycles)+(reboot time)".

Since the new non-download program cannot be transferred until the update of the current download program is completed in the above example, time of waiting for storage to be started greatly differs depending on the timing of starting the download processing, which causes unstable processing time.

Next, the timing of download processing that uses the concurrency ID is exemplified below.

Figure 24:
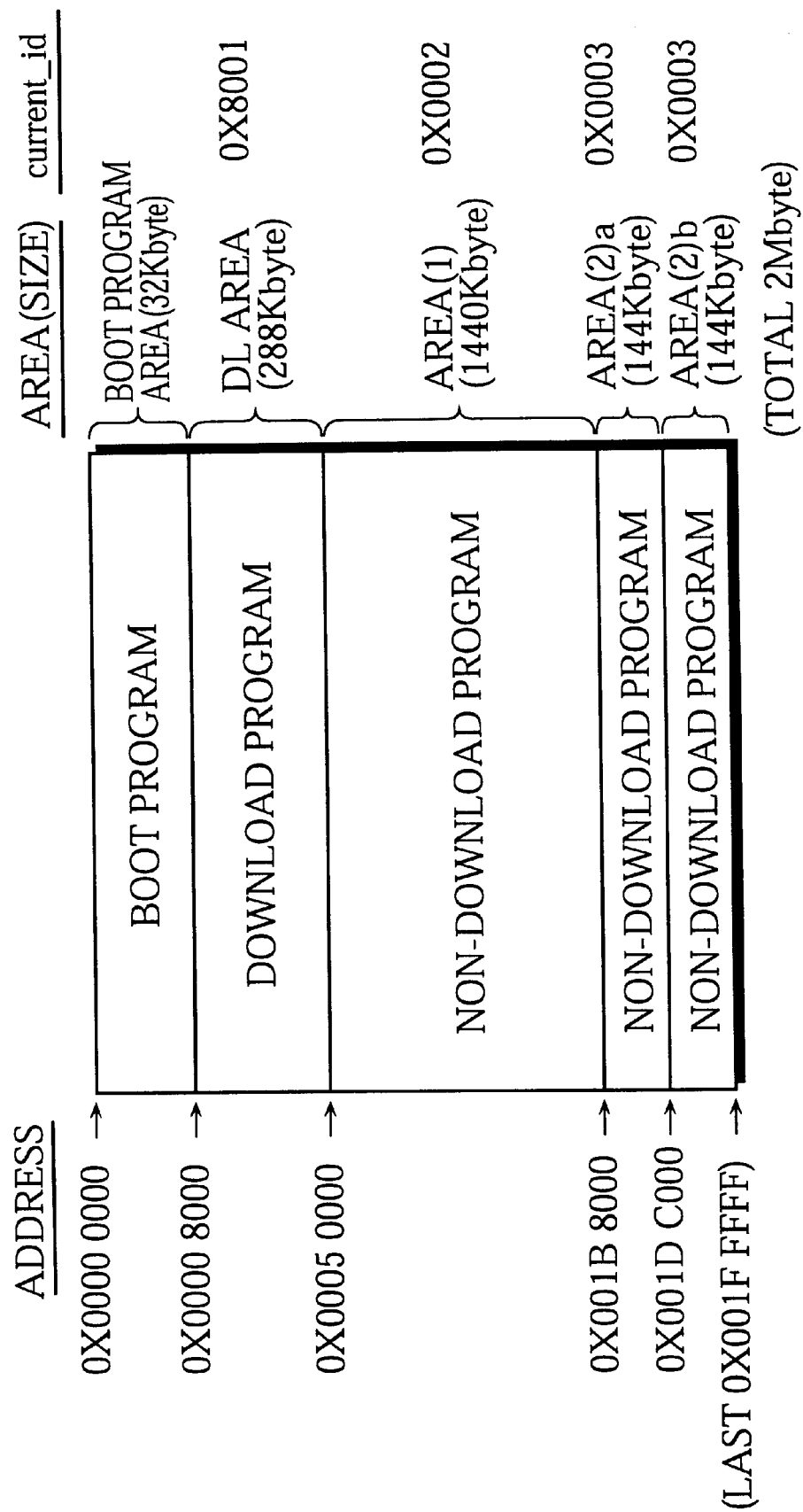
FIG. 24 shows a memory map of the control program storing unit 152.

FIG. 24 shows a memory map of the control program storing unit 152. Here, the boot program is not subjected to download same as above.

As illustrated, the control program storing unit 152 has one DL area that stores a current download program whose current_id is "0x8001".

Meanwhile, a non-DL area has been divided into area (1), area (2)a, and area (2)b. Among them, "(area (2)a)+(area (2)b)" is an area to which a new download program is temporarily transferred. Current non-download programs corresponding to this area have current_id "0x0003". The size of "(area (2)a)+(area (2)b)" is the same as or larger than the DL area. Area (1) is an area to which the new download program is not transferred, and stores a current non-download program whose current_id is "0x0002". The size of each area is, for example, 32 Kbytes for the boot program area, 288 Kbytes for the DL area, 1440 Kbytes for area (1), 144 Kbytes for area (2)a, and 144 Kbytes for area (2)b, the total being 2 Mbytes.

Since the new download program is to be transferred to "(area (2)a)+(area (2)b)", new non-download programs corresponding to "(area (2)a)+(area (2)b)" cannot be transferred until the update of the current download program is completed. Meanwhile, area (1) is not used for transferring the new download program, so that a new non-download program corresponding to area (1) can be transferred anytime without waiting for the update of the current 66 download program to be completed.

FIG. 25 shows the timing of the download processing in this case.

Here, storage of DLTs in the temporary storing unit 151 and transfer of data of the new control program to the control program storing unit 152 cannot be conducted simultaneously, as in FIG. 23. "DL unit" in FIG. 25 represents a plurality of DLTs including the new download program corresponding to the DL area in FIG. 24, while "unit (1)", "unit (2)a", and "unit (2)b" each represent a plurality of DLTs including a new non-download program corresponding to a non-DL area with the same number in FIG. 24.

Each ID shown in the figure corresponds to the DL unit, unit (1), unit (2)a, or unit (2)b given directly below.

This new control program is made up of the DL unit, unit (1), unit (2)a, and unit (2)b that are sequentially sent from the program transmitting apparatus 100 in cycles.

Other marks and descriptions in FIG. 25 are the same as FIG. 23.

Figure 25A:
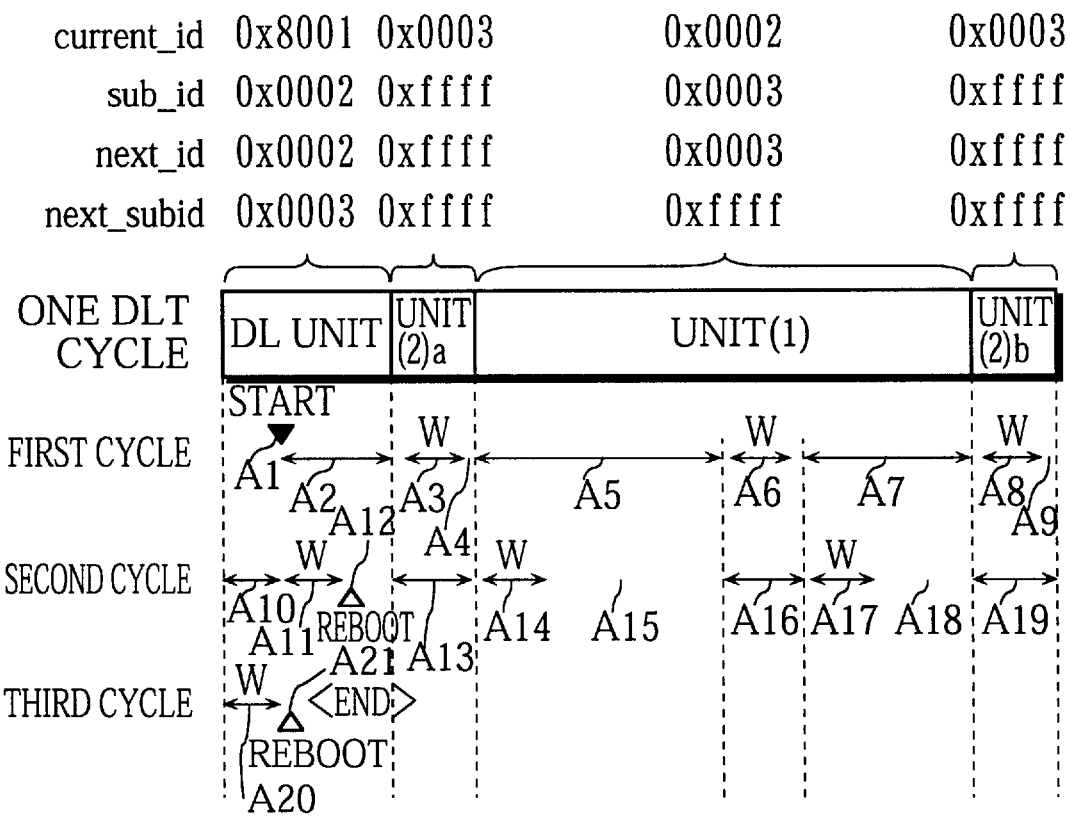
FIG. 25 is a timing chart for download processing.
Figure 25B:
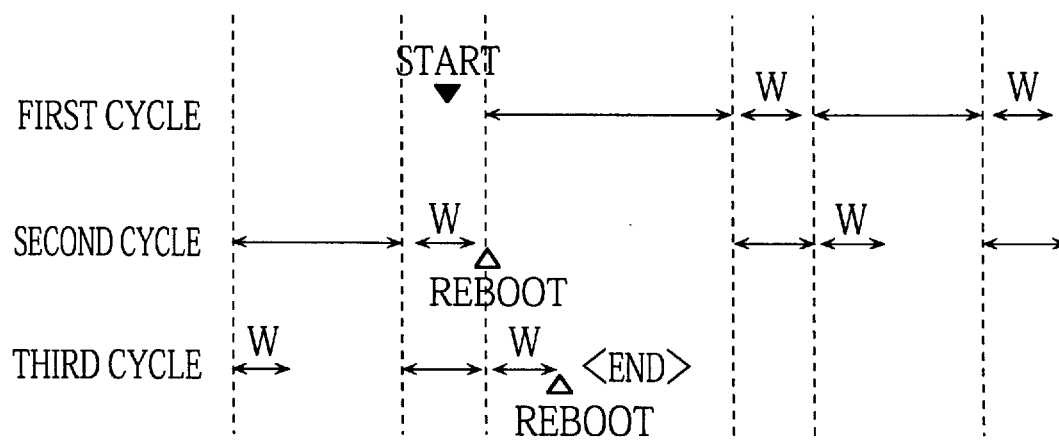

FIG. 25A shows the timing of storage and transfer when the download processing is started at some midpoint of the DL unit, while FIG. 25B shows the timing of storage and transfer when the download processing is started at some midpoint of unit (2)a.

The timing of storage and transfer in FIG. 25A is detailed below.

(1) Reception of DLTs is started in a midway through the DL unit (A1). The execution ID and the concurrency ID are respectively "0x8001" and "0x0002" when the reception begins.

(2) Since current_id of the DL unit is "0x8001" that matches the execution ID, DLTs of the DL unit are sequentially received and stored into the temporary storing unit 151 until the first cycle reaches unit (2)a (A2).

(3) On beginning to receive DLTs of unit (2)a, data of the DL unit stored in the temporary storing unit 151 is transferred to "(area (2)a)+(area (2)b)" in FIG. 24 (A3).

(4) The transfer in (A3) ends midway through unit (2)a. Since current_id of unit (2)a is "0x0003" that matches neither the execution ID nor the concurrency ID, the received DLTs of unit (2)a are not stored into the temporary storing unit 151 (A4)

(5) Then the program receiving apparatus 150 begins to receive DLTs of unit (1). Since current_id of unit (1) is "0x0002" that matches the concurrency ID, DLTs of unit (1) are successively received and stored into the temporary storing unit 151 until the buffer region in the temporary storing unit 151 becomes full (A5).

(6) Once the buffer region has become full, data of unit (1) stored in the temporary storing unit 151 is transferred to area (1) in FIG. 24 (A6).

(7) On completing the transfer, the program receiving apparatus 150 resumes receiving DLTS of unit (1) and sequentially stores the received DLTs into the temporary storing unit 151 until the first cycle reaches unit (2)b (A7).

(8) On beginning to receive DLTs of unit (2)b, data of unit (1) stored in the temporary storing unit 151 in (A7) is transferred to area (1) in FIG. 24 (A8).

(9) The transfer ends midway through unit (2)b. Current_id of unit (2)b is "0x0003" which matches neither the execution ID nor the concurrency ID, so that the received DLTs of unit (2)b are not stored into the temporary storing unit 151 (A9).

(10) Then the program receiving apparatus 150 starts receiving DLTS of the DL unit. Since current_id "0x8001" of the DL unit matches the execution ID, DLTs of the DL unit other than the DLTs stored in (A2) are received and stored into the temporary storing unit 151 (A10).

(11) On storing the remaining DLTs of the DL unit, such stored data of the DL unit is transferred to "(area (2)a)+(area (2)b)" (A11).

(12) On completing the transfer, the execution ID and the concurrency ID are respectively changed to "0x0002" which is next_id of the DL unit and "0x0003" which is next_subid of the DL unit, and then reboot is executed. With this boot operation, the whole data of the DL unit written in "(area (2)a)+(area (2)b)" is copied to area (1) (A12).

(13) The program receiving apparatus 150 next begins to receive DLTs of unit (2)a. Current_id "0x0003" of unit (2)a matches the concurrency ID, so that DLTs of unit (2)a are sequentially received and stored into the temporary storing unit 151 (A13).

(14) When all DLTs of unit (2)a are received and stored in the temporary storing unit 151, such stored data of unit (2)a is transferred to area (2)a (A14).

(5) The transfer is complete midway through unit (1). The DLTs of unit (1) which were previously stored in (A5) are not stored again (A15).

(16) The program receiving apparatus 150 then receives DLTs of unit (1) which were not stored in (A5) and stores the received DLTs into the temporary storing unit 151 (A16).

(17) When the second cycle reaches the DLTs of unit (1) which were stored in (A7), data of unit (1) stored in (A16) is transferred to area (1) (A17).

With completion of this transfer, unit (1) has completely been received and transferred to the control program storing unit 152. Accordingly, the execution ID and the concurrency ID are respectively changed to "0x0003" which is next_id of unit (1) and "0xffff" which is next_subid of unit (1).

(18) The transfer in (A17) ends midway though unit (1). The DLTs of unit (1) which were stored in (A7) are not stored again (A18).

(19) The program receiving apparatus 150 then starts receiving DLTs of unit (2)b. Current_id of unit (2)b is "0x0003" that matches the execution ID, so that DLTs of unit (2)b are sequentially received and stored into the temporary storing unit 151 (A19).

(20) When all DLTs of unit (2)b have been received and stored, data of unit (2)b stored in the temporary storing unit 151 is transferred to area (2)b (A20).

(21) On completing the transfer, reboot is executed to return to normal status (A21).

The timing of storage and transfer in FIG. 25B is similar to FIG. 25A, so that its details are omitted here.

The download processing in FIG. 25A takes "(about two cycles)+(reboot time)", whereas the download processing in FIG. 25B takes "(two cycles)+(transfer time)+(reboot time)".

As described above, in the first embodiment of the present invention a part of the new non-download program can be transferred before the download of the new download program is completed, so that the time of waiting for storage to be started is saved and the processing time can be stabilized at relatively short time.

Second Embodiment

A program transmitting apparatus, a program receiving apparatus, and a program code downloading method of the second embodiment of the present invention are the same as the first embodiment and thus their explanation has been omitted.

The second embodiment is a variant of the first embodiment which performs download processing in a short time using the concurrency ID. In the second embodiment the program transmitting apparatus 100 subdivides each unit (DL and non-DL) and alternately sends them in cycles, with it being possible to save storage wait time in the program receiving apparatus 150 regardless of from which point in a cycle download processing is started.

<Timing of Download Processing>

FIG. 26 shows a memory map of the control program storing unit 152.

As shown in the figure, a DL area and a non-DL area are divided into area A, area B, area C, and area D which are further divided into subareas. In this embodiment, it is assumed that each of the four areas is divided into four subareas of equal size, with sets of DLTs of a new control program that respectively correspond to the four subareas of each of areas A~D being expressed as A-1~A-4, B-1~B-4, C-1~C-4, and D-1~D-4.

Area A is made up of the whole DL area and a part of the non-DL area and is associated with current_id "0x8001". Each of areas B~D is made up of a part of the non-DL area and is respectively associated with current_id "0x0002", current_id "0x0003", and current_id "0x0004". Area D is used to temporarily transfer a new download program, while areas A~C are not used for transferring the new download program. The size of each area is, for example, 32 Kbytes for the boot program area, 480 Kbytes for area A, 512 Kbytes for each of areas B~D, i.e. 2 Mbytes in _total.

Since the new download program is to be transferred to area D, a new non-download program corresponding to area D cannot be transferred until the download of the new download program is Completed. Meanwhile, areas B and C are not used to transfer the new download program, so that new non-download programs corresponding to areas B and C can be transferred anytime without waiting for the download of the new download program to be completed.

Figure 27:
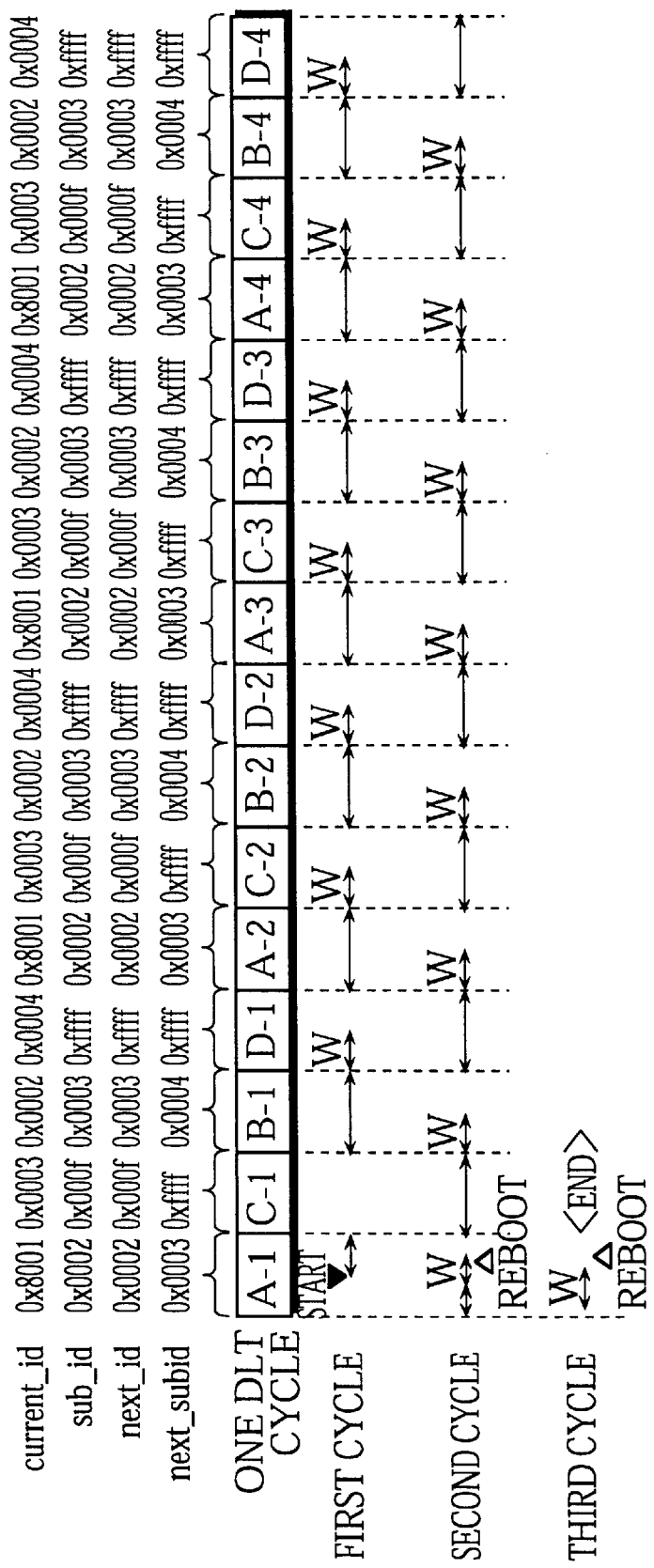
FIG. 27 is a timing chart for download processing.

FIG. 27 shows the timing of the download processing in this case.

Same as the examples above, storage of DLTs in the temporary storing unit 151 and transfer of data of the new control program to the control program storing unit 152 cannot be executed at the same time.

As illustrated, this new control program is made up of A-1, C-1, B-1, D-1, A-2, C-2, B-2, D-2, A-3, C-3, B-3, D-3, A-4, C-4, B-4, and D-4 are sequentially sent from the program transmitting apparatus 100 in cycles.

The marks and descriptions in FIG. 27 conform to FIG. 23.

In the first cycle, A-1~A-4 and B-1~B-4 are transferred respectively to area D and area B and then data of A-1~A-4 is copied from area D to area A by reboot. In the second cycle, C-1~C-4 and D-1~D-4 are respectively transferred to area C and area D and then reboot is executed to complete the download processing.

When the download processing begins at some midpoint in A-1 as in the figure, the download processing takes "(about two cycles)+(reboot time)".

Thus, in the second embodiment each of the DL and non-DL units is subdivided, so that the program receiving apparatus 150 does not have to wait long for storage to be started whenever in a cycle it begins the download processing, with it being possible to stabilize the processing time at relatively short time.

Though the DL and non-DL areas have been divided into four areas in this embodiment, the present invention is not limited to such. The DL and non-DL areas may instead by divided by an even number no less than 4. Also, each of the four areas may be subdivided by a value other than 4.

Let M be an even number no less than 4. The program transmitting apparatus 100 combines the DL unit and a part of the non-DL unit to form a first control program whose data size is around 1/M of the new control program, sets a part of the remaining non-DL unit whose data size is equal to the first control program as a second control program, and divides the rest of the non-DL unit by about (M−2) into third to Mth control programs. Each of the first to Mth control programs are then evenly divided and a first identifier and a second identifier are respectively appended to each division of the first control program and each division of the second control program. Also, the third to Mth programs are evenly sorted under first and second program groups and a third identifier and a fourth identifier are respectively appended to each division of the first program group and each division of the second program group. The programs with any of the first and third identifiers are grouped into a first set, while the programs with any of the second and fourth identifiers are grouped into a second set. Lastly, the program transmitting apparatus 100 repeatedly sends the first set and the second set alternately in units of divisions.

Thus, in addition to transferring a part of the new non-download program without waiting for the update of the download program to be completed as in the first embodiment, in the second embodiment the transmitter divides the new control program into the first set including the DL unit and the second set other than the first set and repeatedly sends the two sets alternately to the receiver in units of divisions whose transmission time is no less than its transfer time. Accordingly, in the first cycle the receiver receives and stores the first set including the DL unit and then transfers the stored first set while receiving the second set which does not include the DL unit, and in the second cycle the receiver receives and stores the second set and then transfers the stored second set while receiving the first set. thus, the receiver can efficiently receive the first and second sets. With this feature, the time of waiting for storage to be started is saved and the download processing is completed within "(about two cycles)+(reboot time)", so that the processing time can be stabilized at relatively short time.

Third Embodiment

A program transmitting apparatus, program receiving apparatus, and program code downloading method of the third embodiment of the present invention are the same as the first embodiment, so that their explanation has been omitted.

The third embodiment is a variant of the first and second embodiments which perform download processing in a short time using the concurrency ID. In this embodiment, the program transmitting apparatus 100 sends dummy DLTs when the buffer region becomes full, in consideration of the capacity of the buffer region which is used by the program receiving apparatus 150 to store received DLTs. During reception of these dummy DLTs, the program receiving apparatus 150 executes a command of, for instance, transferring stored DLTs to the flash memory.

<Timing of Download Processing>

Figure 28:
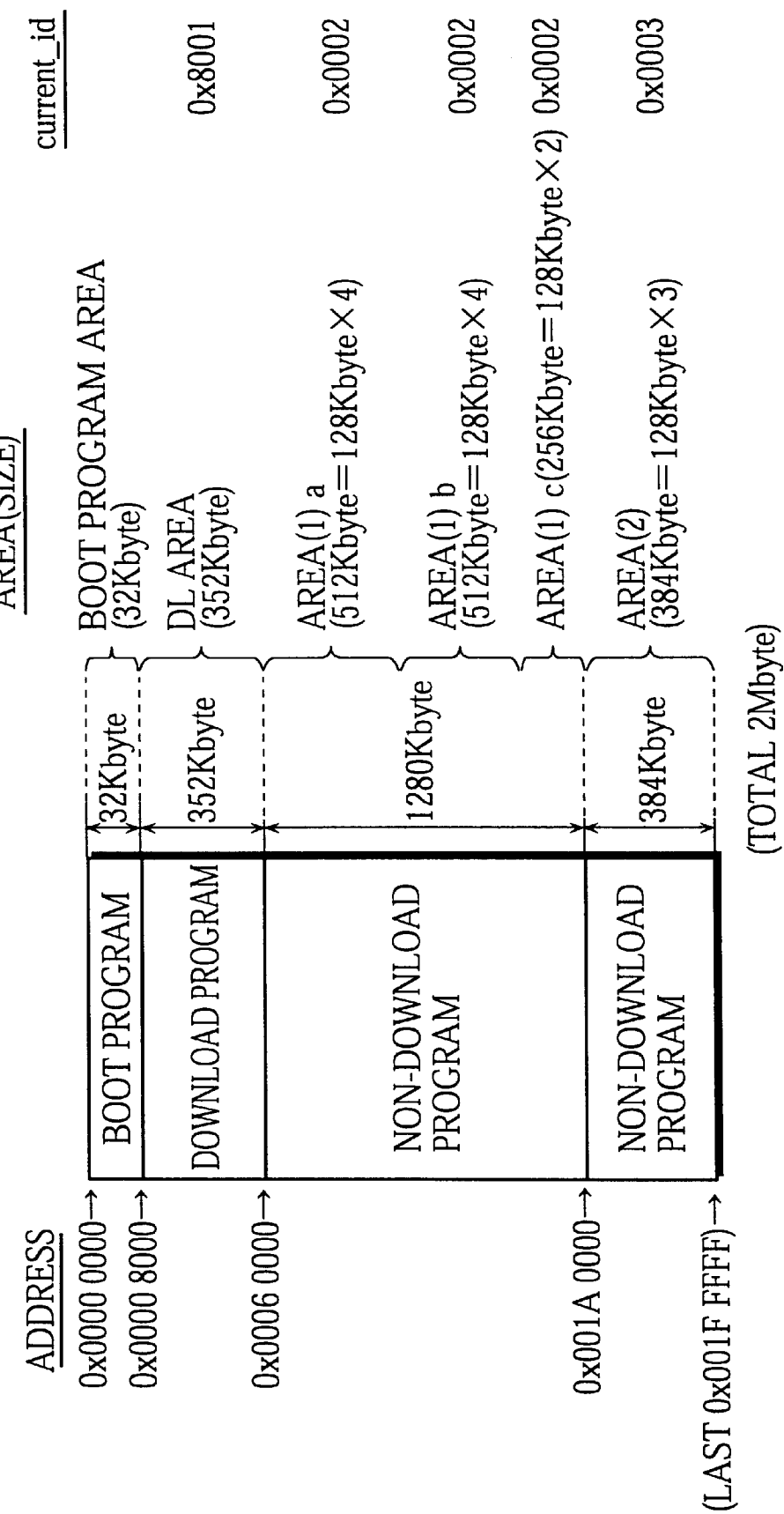
FIG. 28 shows a memory map of the control program storing unit 152.

FIG. 28 shows a memory map of the control program storing unit 152. Here, the boot program is not subjected to download same as above.

As illustrated, the control program storing unit 152 has one DL area that stores a current download program whose current_id is "0x8001".

Meanwhile, a non-DL area has been divided into area (1) and area (2). Area (2) is used for temporarily transferring a new download program and stores a current non-download program with current_id "0x0003". Here, the size of area (2) is no less than the DL area. Area (1) is not used for temporarily transferring the new download program and corresponds to a non-download program with current_id "0x0002". The size of each area is, for example, 32 Kbytes for the boot program area, 352 Kbytes for the DL area, 1280 Kbytes (128 Kbytes×10) for area (1), and 384 Kbytes (128 Kbytes×3) for area (2), i.e. 2 Mbytes in total.

Since the new download program is transferred to area (2), a new non-download program corresponding to area (2) cannot be transferred until the update of the current download program is completed. On the other hand, area (1) is not used for transferring the new download program, so that a new non-download program corresponding to area (1) can be transferred anytime without waiting for the update of the current download program to finish.

Area (1) is further divided into subareas. In the present example, area (1) is divided into three subareas that are area (1)*a*, area (1)*b*, and area (1)*c*. For example, the size of area (1)*a* is 512 Kbytes (128 Kbytes×4), the size of area (1)*b* is 512 Kbytes (128 Kbytes×4), and the size of area (1)*c* is 256 Kbytes (128 Kbytes×2).

Figure 29:
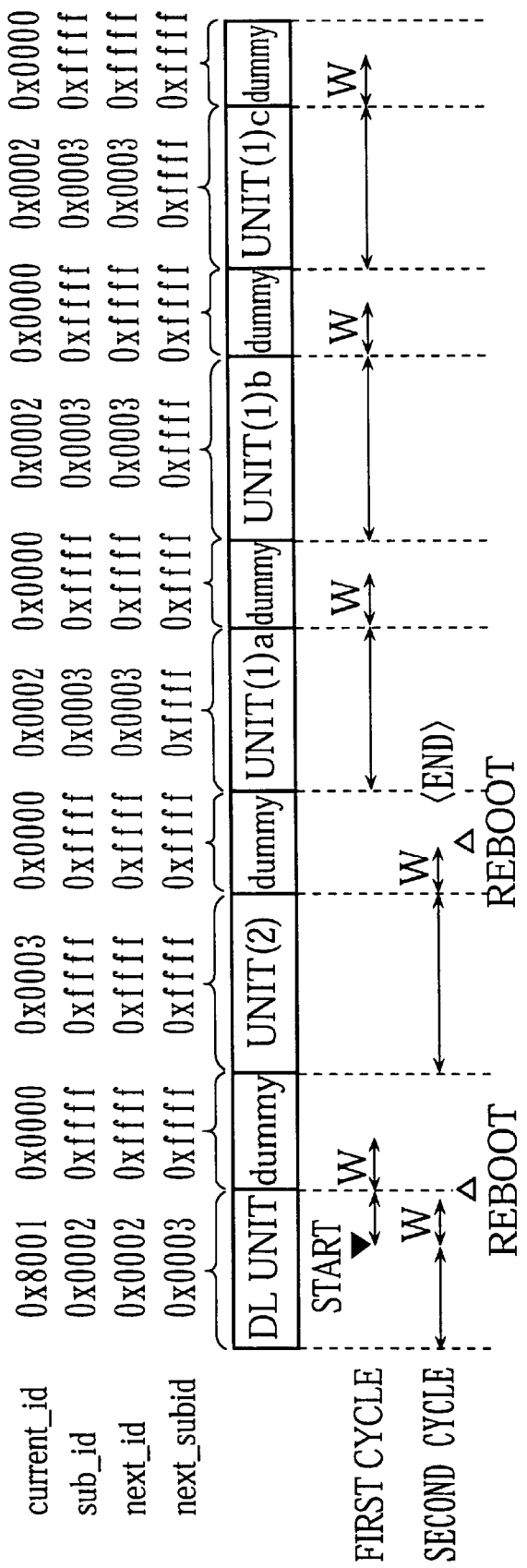
FIG. 29 is a timing chart for download processing.

FIG. 29 shows the timing of the download processing in this case.

Same as the above examples, storage of DLTs in the temporary Storing unit 151 and transfer of data of the new control program to the control program storing unit 152 cannot be executed at the same time.

The DL unit in FIG. 29 represents a plurality of DLTs which include the new download program corresponding to the DL area in FIG. 28, whereas units (1)*a*, (1)*b*, (1)*c*, and (2) each represent a plurality of DLTS which include a new non-download program corresponding to an area with the same number in FIG. 28. Also, "0dummy" represents dummy data which is sent for a period necessary for transferring data of the new control program stored so far in the temporary storing unit 151 to the control program storing unit 152. In particular, "dummy" immediately following the DL unit is sent in consideration of not only the transfer time but also the reboot time.

Current_id of "dummy" does not match any of current_ids of valid DLTS. Here, current_id of "dummy" is set at "0x0000".

Each ID shown in the figure is associated with a unit given directly below.

This new control program is made up of the DL unit, "dummy", unit (2), "dummy", unit (1)a, "dummy", unit (1)b, "dummy", unit (1)c, and "dummy" that are sequentially sent from the program transmitting apparatus 100 in cycles.

Other marks and descriptions in the figure correspond to FIG. 23.

The DL unit is transferred to area (2) in the beginning of the first and second cycles. Also, in the first cycle units (1)a, (1)b, and (1)c are respectively transferred to areas (1)a, (1)b, and (1)c. In the second cycle reboot is executed to copy the DL unit from area (2) to the DL area. Subsequently, unit (2) is transferred to area (2) and reboot is executed to complete the download processing.

When the download processing begins at a midpoint in the DL unit as in FIG. 29, the processing ends within about 1~1.4 cycles, although inserting "dummy" prolongs the actual processing time by one extra cycle.

When the DLT transmission rate is 36 Kbps, "dummy" which is inserted after every 1024 sections of the new control program is 38 sections immediately after the DL unit, 24 sections immediately after unit (2), 30 sections immediately after unit (1)a, "dummy" 30 sections immediately after unit (1)b, and 18 sections immediately after unit (1)c, so that 140 sections are inserted as "dummy" in total, with the length of one cycle being 9 minutes and 42 seconds. Accordingly, the download processing time in this case is around 9 minutes and 42 seconds to 13 minutes and 35 seconds.

In the first and second embodiments that use the concurrency ID, the download processing time is "(about two cycles)+(reboot time)" in FIG. 25A, "(two cycles)+(transfer time)+(reboot time)" in FIG. 25B, and "(about two cycles)+(reboot time)" in FIG. 27. In any case, the download processing takes more than two cycles, so that at least 19 minutes and 24 seconds are necessary. In comparison with the first and second embodiments, therefore, the download processing time is reduced in the third embodiment.

As described above, in this embodiment the program transmitting apparatus 100 sends the new control program where "dummy" is inserted so that the reception buffer in the program receiving apparatus 150 will not become full. While receiving "dummy", the program receiving apparatus 150 executes a command such as a command of transferring stored data to the flash memory, with it being possible to reduce the download processing time.

Fourth Embodiment

A program transmitting apparatus, program receiving apparatus, and program code downloading method of the fourth embodiment of the present invention are the same as the first embodiment, so that their explanation has been omitted.

In the fourth embodiment, when it is possible to Simultaneously store DLTs in the temporary storing unit 151 and transfer data of a new control program to the control program storing unit 152, the program receiving apparatus 150 uses the concurrency ID to speed up download processing.

<Timing of Download Processing>

Figure 30:
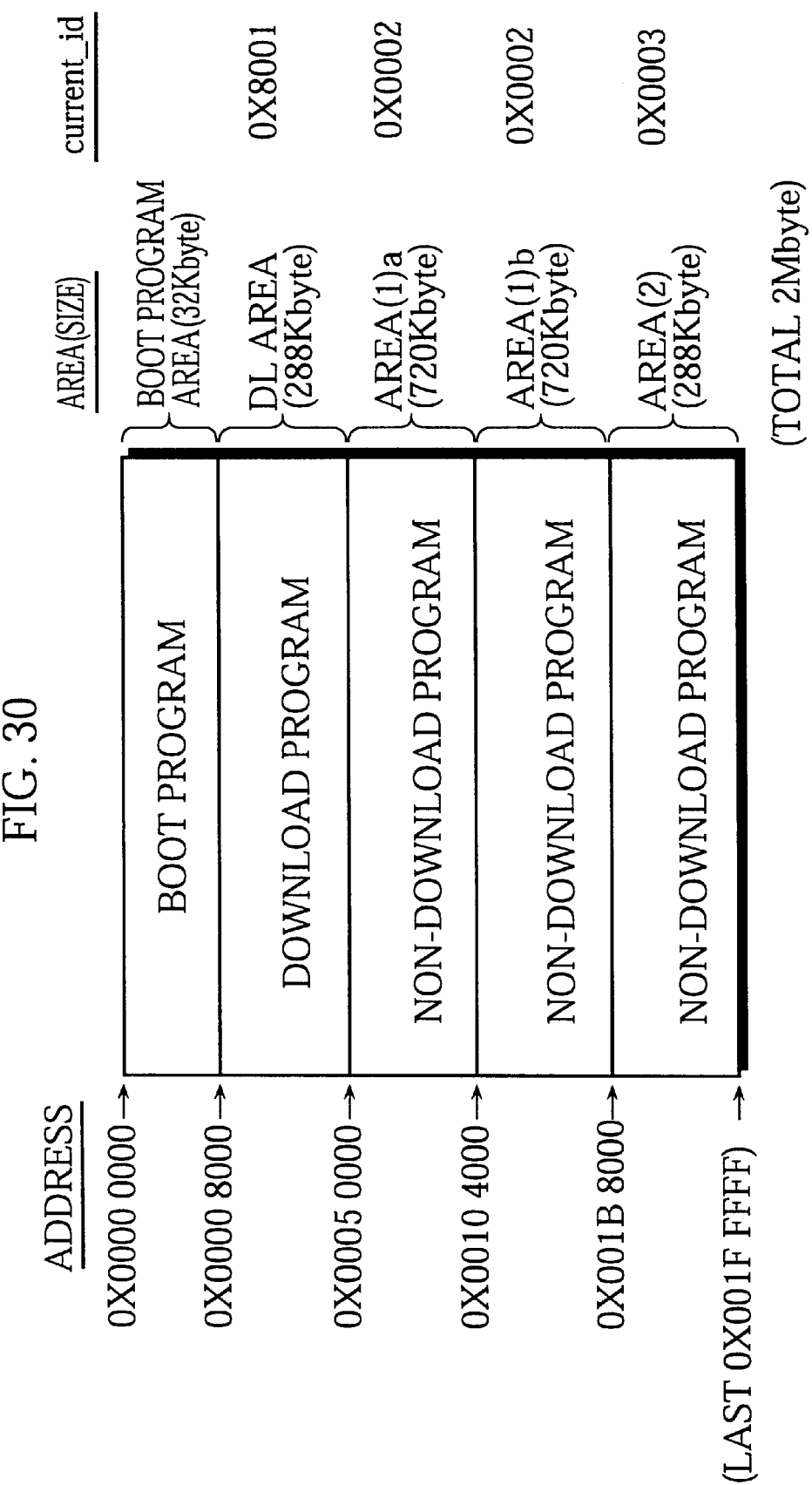
FIG. 30 shows a memory map of the control program storing unit 152.

FIG. 30 shows a memory map of the control program storing unit 152. Here, the boot program is not subjected to download.

As is evident from the figure, the control program storing unit 152 has one DL area that stores a current download program with current_id "0x8001".

Meanwhile, a non-DL area is divided into area (1)a, area (1)b, and area (2). Area (2) is used to temporarily transfer a new download program and stores a current non-download program with current_id "0x0003". The size of area (2) is the same as the DL area. Areas (1)a and (1)b are not used to temporarily transfer the new download program and store current non-download programs with current_id "0x0002". The size of each area is, for instance, 32 Kbytes for the boot program area, 288 Kbytes for the DL area, 720 Kbytes for area (1)a, 720 Kbytes for area (1)b, and 288 Kbytes for area (2), the total being 2 Mbytes.

Since the new download program is to be transferred to area (2), a new non-download program corresponding to area (2) cannot be transferred unless the update of the current download program is completed. On the other hand, since areas (1)a and (1)b are not used for the transfer of the new download program, new non-download programs corresponding to area (1)a and (1)b can be transferred anytime without waiting for the completion of the update of the current download program.

FIG. 31 shows the timing of the download processing in this example.

Unlike the preceding examples, storage of DLTs in the temporary storing unit 151 and transfer of data of the new control program to the control program storing unit 152 can be simultaneously conducted here.

Each ID shown in FIG. 31 is associated with the unit given directly below.

The DL unit in the figure represents a plurality of DLTs which include the new download program corresponding to the DL area in FIG. 30, whereas units (1)a, (1)b, and (2) each represent a plurality of DLTs which include a new non-download program corresponding to the area with the same number in FIG. 30.

This new control program is made up of the DL unit, unit (1)a, unit (2), and unit (1)b which are sequentially sent from the program transmitting apparatus 100 in cycles.

Other marks and descriptions in the figure correspond to FIG. 23.

In this example, after transferring the DL unit, unit (1)a, and unit (1)b respectively to areas (2), (1)a, and (1)b, data of the DL unit in area (2) is copied to the DL area. Then unit (2) is transferred to area (2) and reboot is executed to complete the download processing.

Figure 31A:
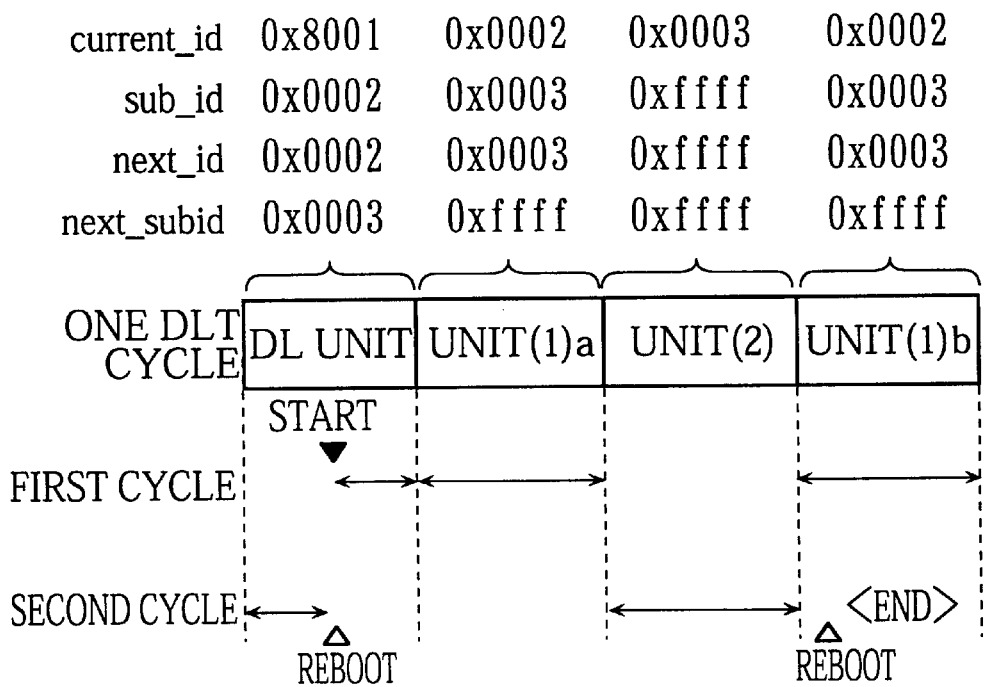
FIGS. 31A and 31B are timing charts for download processing.
Figure 31B:
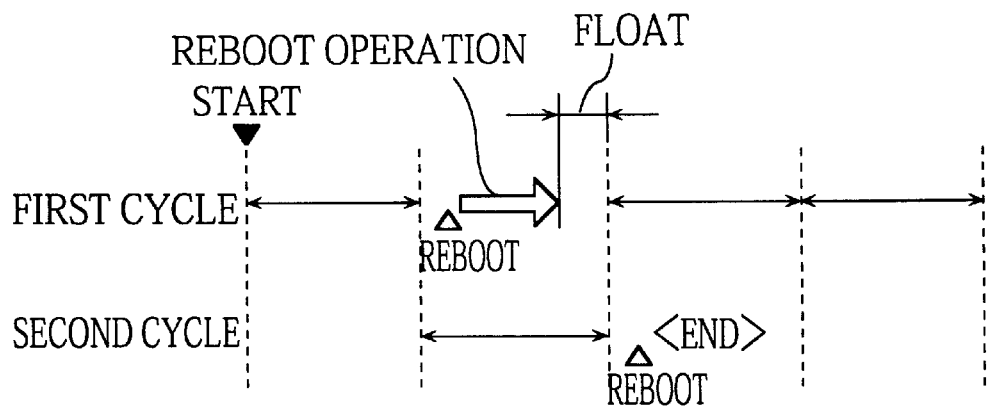

More specifically, FIG. 31A shows the timing of storage and transfer when the download processing begins at a midpoint in the DL unit, while FIG. 31B shows the timing of storage and transfer when the download processing begins at the beginning of the DL unit.

As for details on the timing of storage and transfer in FIGS. 31A and 31B, the storage is performed in the same way as FIG. 25A, whereas the transfer is achieved, for instance, by executing background processing using a separate task.

The download processing in FIG. 31A is completed within "(a little less than two cycles)+(reboot time)", while the download processing in FIG. 31B is completed within "(about 1.5 cycles)+(transfer time)+(reboot time)".

By sending unit (1)a for a period of "(reboot time)+(float time)", the processing time can be shortened. In particular, transmitting unit (1)a after the DL unit reduce the processing time considerably. Thus, by sending the new control program in the sequence which suits the characteristic of the program receiving apparatus 150, it is possible to accelerate the download processing.

As described above, in the fourth embodiment a part of the new non-download program can be transferred before the update of the current download program is completed, so that the time of waiting for the start of storage can be saved and the download processing time can be stabilized at a relatively short time.

Fifth Embodiment

The fifth embodiment of the present invention presents a patch downloading method that downloads patch information to rewrite only specific program modules.

Figure 32:
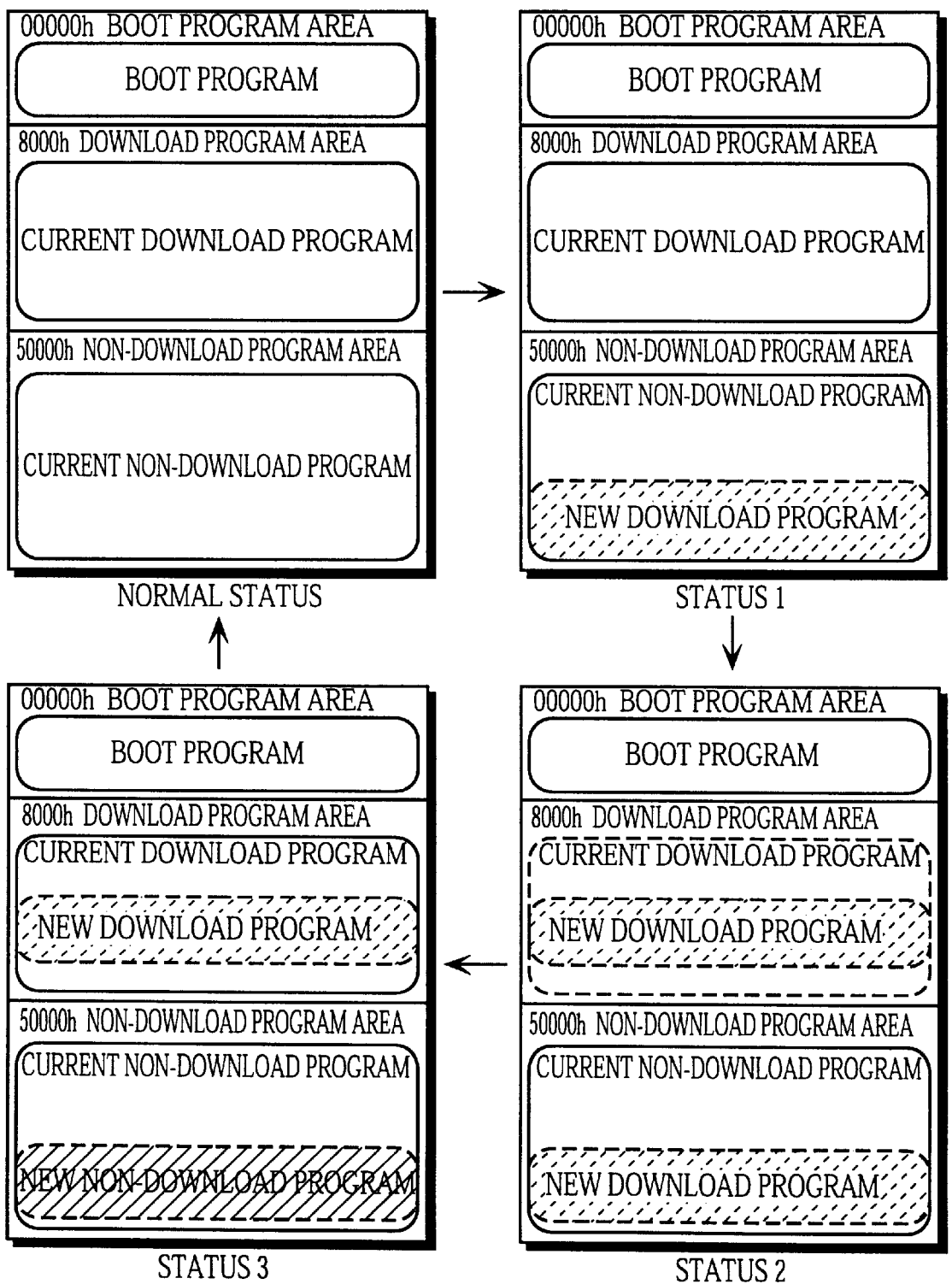
FIG. 32 shows changes of the storage contents of the control program storing unit 152 during patch download.

FIG. 32 shows changes of the storage contents of the control program storing unit 152 during patch download processing.

A program transmitting apparatus, program receiving apparatus, and program code downloading method of the fifth embodiment are the same as the first embodiment, the only difference being that the sizes of the new download program and the new non-download program become smaller. In this patch processing, a patch destination address is written in a download command that shows copy information for each DLT group.

Figure 33:
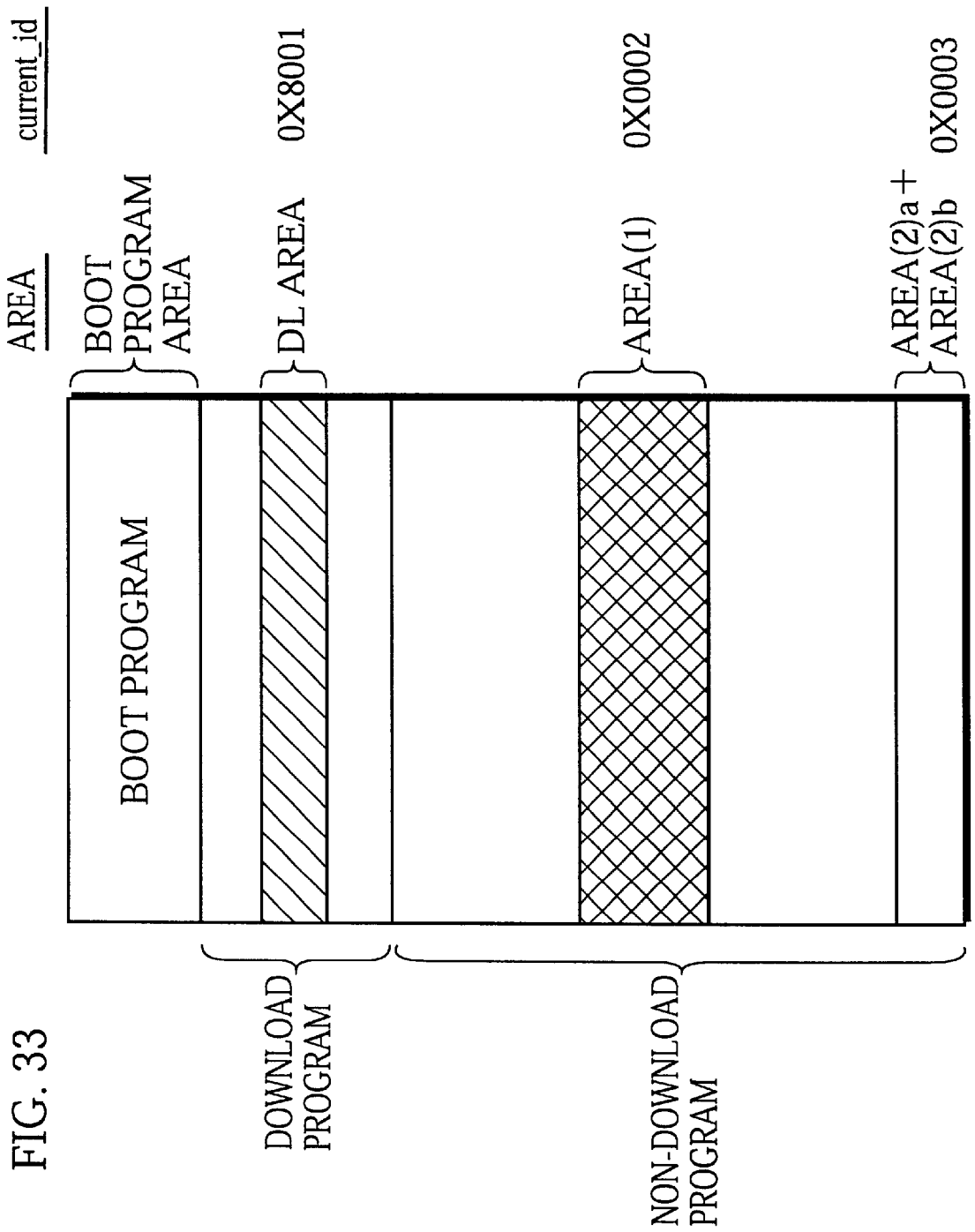
FIG. 33 shows a memory map of the control program storing unit 152 during patch download.

FIG. 33 shows a memory map of the control program storing unit 152 during patch download. Apart from that the new download program and the new non-download program have become smaller, download IDs are added in the same way as the first embodiment.

In FIG. 33, the diagonally shaded DL area corresponds to a patch program of the new download program, while the crosshatched non-DL area corresponds to a patch program of the new non-download program.

The timing of this download processing is the same as the first to fourth embodiments, apart from that fewer DLTs are transmitted in the fifth embodiment.

Sixth Embodiment

In the sixth embodiment of the present invention, the transmitter sends a compressed new control program and the receiver decompresses the compressed new control program to download the new control program. In doing so, the number of DLTs to be transmitted and received is lessened and time taken for downloading the new control program is reduced.
<Program Transmitting Apparatus>

A program transmitting apparatus of the six embodiment has almost the same construction with the program transmitting apparatus 100 of the first embodiment, so that the following explanation focuses on components whose functions differ from the first embodiment.

After dividing each program into groups, the dividing unit 104 compresses each group and then divides each compressed group into sequences (DLTs). Here, each compressed group may be accompanied by a precompressed data size of the compressed group and a start address at which the compressed group is to be downloaded in a control program storing unit of a program receiving apparatus. Compression referred to here is to reduce a space necessary for storing data without losing any of the data contents, where precompressed data can be recovered from compressed data by decompression. Though there are various methods for compression and decompression, the present specification does not explain which method is to be used, since it is not the main concern of the present invention and besides any of the methods is applicable in this example.

FIG. 34 shows an example of the contents of a download header.

The details on the download header is given below.

Note that the contents same as the first embodiment in FIG. 11 are not explained here.

Comp_type specifies a type of a compression method.

Hd_size shows a size of the download header in bytes.

Exp_area shows a size of an area to be secured for decompressing the compressed script in bytes.

One_block shows a size of one DLT reception block in units of DLTS.

Raw_scrpt shows a size of the precompressed script in bytes.

Cmp_scrpt shows a size of the compressed script in bytes.

Figure 35:
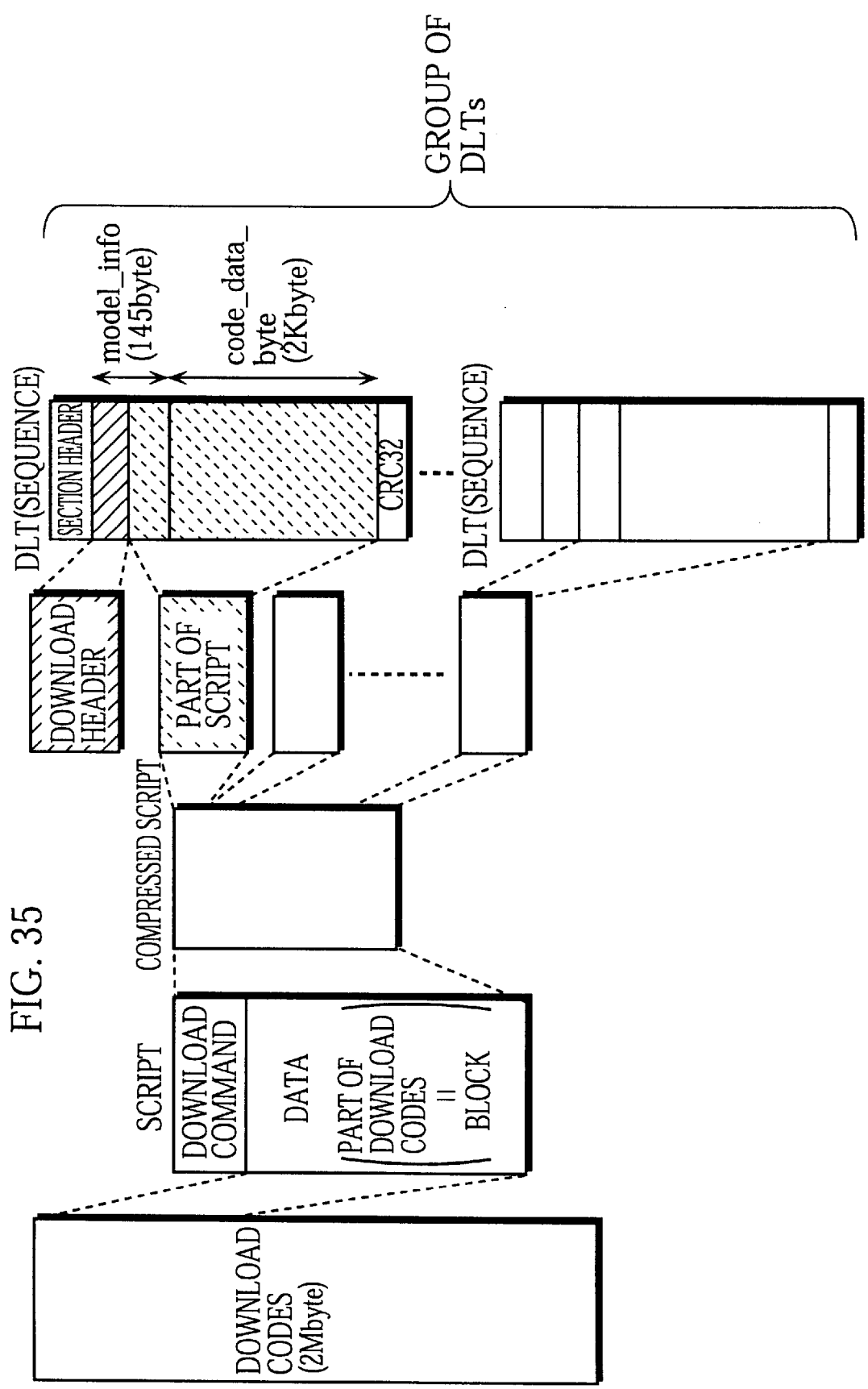
FIG. 35 is a diagrammatic sketch of generating DLTs from download codes.

FIG. 35 shows how DLTs are generated from download codes.

The figure is broadly similar to FIG. 10 in the first embodiment. The difference with the first embodiment is that each script is compressed and then divided into DLTs in the sixth Embodiment, while each script has been divided into DLTs without being compressed in the first embodiment.
<Program Receiving Apparatus>

The construction of a program receiving apparatus of the six embodiment is roughly similar to the program receiving apparatus 150 of the first embodiment, so that the following explanation focuses on the components whose functions differ from the first embodiment.

In this embodiment, the new control program sent from the program transmitting apparatus 100 has been compressed in units of groups which may each be accompanied by a precompressed data size of the compressed group and a start address at which the compressed group should be downloaded in the control program storing unit 152. In this example, the download header shown in FIG. 34 has been appended to each compressed group.

The first downloading unit 156 and the second downloading unit 157 each decompress compressed data of the new control program stored in the temporary storing unit 151 in units of groups and transfer each decompressed group to the control program storing unit 152.

Alternatively, the first downloading unit 156 and the second downloading unit 157 may each transfer each compressed group of the new control program stored in the temporary storing unit 151 to an area in the control program storing unit 152 specified by a start address and precompressed data size appended to the compressed group, wherein the program receiving apparatus 150 is equipped with a decompressing unit for decompressing each compressed group of the new control program stored in the control program storing unit 152.
<Program Code Downloading Method>

The downloading method in the present embodiment is the same as the first embodiment except that the decompress operation is added before the transfer operation from the temporary storing unit 151 to the control program storing unit 152.

Here, the downloading method may be modified such that compressed data of the new control program is transferred from the temporary storing unit 151 to the control program storing unit 152 without being decompressed and subsequently the decompressing unit executes decompression on the transferred compressed data at appropriate timing.

<Timing of Download Processing>

The timing of download processing is the same as the first to fifth embodiments.

As described above, in the sixth embodiment the transmitter sends the compressed new control program, so that the number of DLTs to be transmitted and received is reduced and the processing time is shortened.

Note that the compression is not necessarily performed in units of groups as in the sixth embodiment but may be performed in units of another predetermined size.

It has been assumed in the first to sixth embodiments that all DLTs are successfully received, though sporadically DLTs may not be able to be received properly due to the influence of noise and the like. Even when this happens, the download processing can be executed appropriately by referring to identifiers such as the execution ID, the concurrency ID, the current ID, and the sub ID. Even if the program receiving apparatus 150 fails to receive a certain DLT, it can still obtain the DLT in the next cycle.

Also, it is possible to store data of each DLT generated by the identifier adding unit 105 of the program transmitting apparatus 100 into a program storing medium such as a hard disk or an MO (magneto-optical disk) in a predetermined order, wherein the transmitting unit 106 repeatedly sends the data when required. This program storing medium which stores the data of each DLT may be portable and/or commercially available by itself.

When repeatedly sending the data of each DLT in the predetermined order, the transmitting unit 106 may transfer the data to a program carrier medium such as a carrier wave.

While one sub ID has been assigned to one current ID in the _above embodiments, several sub IDs may be assigned to one current ID.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A control program downloading method that is used by a program receiving apparatus equipped with a storing device which stores in advance a control program made up of an update program used for download of a new control program and a non-update program used for processing other than the download of the new control program, the new control program being made up of a new update program and a new non-update program, the control program downloading method comprising:

a first controlling step for executing the update program stored in the storing device to receive the new update program and write the received new update program over the non-update program stored in a first area in the storing device; and a second controlling step for executing, once the first controlling step has finished writing the new update program into the storing device, the new update program to receive the new non-update program and write the received new non-update program over data stored in a second area in the storing device aside from an area where the new update program that is currently being used is stored, wherein the new update program is divided into divisions which are each accompanied by a first identifier and a serial number, and is received in units of divisions, wherein the new non-update program is divided into divisions which are each accompanied by a second identifier and a serial number, and is received in units of divisions, wherein in the first controlling step, if the first identifier is appended to a received division of the new control program, the received division is judged as belonging to the new update program and a location where the received division is to be written is specified within the first area based on a serial number appended to the received division, and wherein in the second controlling step, if the second identifier is appended to a received division of the new control program, the received division is judged as belonging to the new non-update program and a location where the received division is to be written is specified within the second area based on a serial number appended to the received division.

2. A control program downloading method that is used by a digital broadcast receiving apparatus equipped with a storing device which stores in advance a control program made up of an update program used for download of a new control program and a non-update program used for processing other than the download of the new control program, the new control program being made up of a new update program and a new non-update program, the control program downloading method comprising:

a judging step for repeatedly judging whether writing of the new update program has been completed, having a first controlling step operate until completion of the writing of the new update program, and having a second controlling step operate after the completion of the writing of the new update program;

the first controlling step for executing the update program stored in the storing device to receive the new update program and write the received new update program over data stored in a first area in the storing device that is a part of an area where the non-update program has been stored, and, at the same time, receive a first non-update program which is a part of the new non-update program and write the received first non-update program over data stored in a second area, aside from the first area, that is a part of the area where the non-update program has been stored; and the second controlling step for executing the new update program written in the storing device to take over reception and writing of the first non-update program and, at the same time, receive a second non-update program which is a part of the new non-update program other than the first non-update program and write the received second non-update program over data stored in a third area in the storing device aside from the second area and an area where the new update program which is currently being used is stored.

3. The control program downloading method of claim 2, wherein when it is judged in the judging step that the writing of the new update program has been completed, the second controlling step copies the new update program written in the first area to an area in the storing device where the update program has been stored, and executes the copied new update program.

4. The control program downloading method of claim 3,
wherein the new update program is divided into divisions which are each accompanied by a first identifier and a serial number, and is received in units of divisions,
wherein the first non-update program is divided into divisions which are each accompanied by a second identifier and a serial number, and is received in units of divisions,
wherein the second non-update program is divided into divisions which are each accompanied by a third identifier and a serial number, and is received in units of divisions,
wherein in the first controlling step, if the first identifier is appended to a received division of the new control program, the received division is judged as belonging to the new update program and a location where the received division is to be written is specified within the first area based on a serial number appended to the received division, while if the second identifier is appended to the received division, the received division is judged as belonging to the first non-update program and a location where the received division is to be written is specified within the second area based on a serial number appended to the received division, and
wherein in the second controlling step, if the third identifier is appended to a received division of the new control program, the received division is judged as belonging to the second non-update program and a location where the received division is to be written is specified within the third area based on a serial number appended to the received division.

5. The control program downloading method of claim 4,
wherein the digital broadcast receiving apparatus is further equipped with a temporary storing device used in the first controlling step and the second controlling step to receive and write the new control program, and
wherein in each of the first controlling step and the second controlling step, data of the new control program is received and stored into the temporary storing device in units of divisions, and when a predetermined number of divisions are stored in the temporary storing device, the predetermined number of divisions are transferred from the temporary storing device to the storing device.

6. The control program downloading method of claim 5,
wherein the data of the new control program received in each of the first controlling step and the second controlling step has been compressed, and
wherein the first controlling step and the second controlling step each decompress the data in the temporary storing device before transferring the data to the storing device.

7. The control program downloading method of claim 5,
wherein the data of the new control program received in each of the first controlling step and the second controlling step has seen compressed in units of predetermined size, each of the units being accompanied by a start address at which the unit is to be written into the storing device and a precompressed data size of the unit,
wherein the first controlling step and the second controlling step each transfer each unit stored in the temporary storing device to an area in the storing device which is found using a start address and a precompressed data size appended to the unit, and
wherein the control program downloading method further comprises
a decompressing step for decompressing the unit in the storing device.

8. The control program downloading method of claim 5,
wherein each serial number is made up of a group number and a sequence number, the group number being one of numbers serially given to groups that compose each of the new update program, the first non-update program, and the second non-update program, while the sequence number being one of numbers serially given to sequences that compose a group specified by the group number,
wherein each division includes a sequence, and
wherein in each of the first controlling step and the second controlling step, the data of the new control program is stored into the temporary storing device in units of sequences, and when at least one group is stored in the temporary storing device, each of the groups is transferred from the temporary storing device to the storing device.

9. The control program downloading method of claim 8,
wherein the data of the new control program received in each of the first controlling step and the second controlling step has been compressed in units of groups, and
wherein the first controlling step and the second controlling step each decompress each of the groups stored in the temporary storing device before transferring each of the groups to the storing device.

10. The control program downloading method of claim 8,
wherein the data of the new controlling program received in each of the first controlling step and the second controlling step has been compressed in units of groups which are each accompanied by a start address at which the group is to be written into the storing device and a precompressed data size of the group, and
wherein the first controlling step and the second controlling step each transfer each of the groups stored in the temporary storing device to an area in the storing device which is found using a start address and a precompressed data size appended to the group, and
wherein the control program downloading method further comprises
a decompressing step for decompressing the group in the storing device.

11. The control program downloading method of claim 3,
wherein the storing device holds data even when power is off,
wherein the digital broadcast receiving apparatus is further equipped with a status holding device for holding, even when power is off, a status value showing one out of: a first status which begins when the download of the new control program is started and ends when it is judged in the judging step that the writing of the new update program has been completed; a second status which begins after it is judged in the judging step that the writing of the new update program has been completed and ends when the new update program is copied; a third status which begins after the new update program is copied and ends when the download of the new control program is completed; and a normal status other than the first status, the second status, and the third status, and
wherein the control program downloading method further comprises
a continuing step for continuing, if the download of the new control program is suspended halfway, the download based on the status value held in the status holding device.

12. A control program downloading method that is used by a digital broadcast receiving apparatus to download a transmitted control program of the digital broadcast receiving apparatus, the control program being made up of subprograms of different types which are each divided into divisions and are repeatedly transmitted in a predetermined sequence in units of divisions, each of the divisions being accompanied by a current identifier specifying a type of a subprogram that the division belongs to, the control program downloading method comprising:

a receiving step for receiving the subprograms in units of divisions;

a judging step for judging, with reference to a current identifier appended to a received division, whether the received division belongs to a priority subprogram which is given priority for being downloaded, a concurrency subprogram which can be downloaded concurrently with the priority subprogram, or a subprogram which is neither the priority subprogram nor the concurrency subprogram; and a downloading step for downloading the received division which is judged as belonging to any of the priority subprogram and the concurrency subprogram.

13. The control program downloading method of claim 12, wherein each of the divisions is further accompanied by a start identifier showing a current identifier of a subprogram which is to be downloaded first among the subprograms that make up the control program, a start sub identifier showing a current identifier of a subprogram which can be downloaded concurrently with the subprogram shown by the start identifier, a next identifier showing a current identifier of a subprogram which is given priority for being downloaded after a subprogram which the division belongs to, and a next sub identifier showing a current identifier of a subprogram which can be downloaded concurrently with the subprogram shown by the next identifier, wherein the judging step includes:

an identifier extracting substep for extracting a start identifier and a start sub identifier from a given division received in the receiving step;

an identifier storing substep for initially storing the extracted start identifier and start sub identifier into an identifier storing device equipped in the digital broadcast receiving apparatus, respectively as a priority subprogram identifier and a concurrency subprogram identifier; and an updating substep for replacing, when all divisions of the priority subprogram have been downloaded in the downloading step, the priority subprogram identifier and the concurrency subprogram identifier in the identifier storing device respectively with a next identifier and a next sub identifier appended to any of the divisions of the priority subprogram, and wherein in the judging step, when the current identifier appended to the received division matches the priority subprogram identifier in the identifier storing device, the received division is judged as belonging to the priority subprogram, while when the current identifier appended to the received division matches the concurrency subprogram identifier in the identifier storing device, the received division is judged as belonging to the concurrency subprogram.

14. A control program transmitting method for transmitting a control program of a program receiving apparatus, comprising:

an acquiring step for acquiring the control program made up of an update program to be used in the program receiving apparatus for download of the control program and a non-update program to be used in the program receiving apparatus for processing other than the download of the control program;

a dividing step for dividing each of the update program and the non-update program into divisions which are each accompanied by a serial number;

an identifier appending step for appending a first identifier and a second identifier respectively to each division of the update program and each division of the non-update program; and a transmitting step for repeatedly transmitting, in sequence, every division to which any of the first identifier and the second identifier is appended.

15. A control program transmitting method for transmitting a control program of a digital broadcast receiving apparatus, comprising:

an acquiring step for acquiring the control program made up of an update program to be used in the digital broadcast receiving apparatus for download of the control program and a non-update program to be used in the digital broadcast receiving apparatus for processing other than the download of the control program;

a separating step for separating the non-update program into a first non-update program whose data size is no smaller than the update program and a second non-update program other than the first non-update program;

a dividing step for dividing each of the update program, the first non-update program, and the second non-update program into divisions which are each accompanied by a serial number;

an identifier appending step for appending a first identifier to each division of the update program, a second identifier to each division of the first non-update program, and a third identifier to each division of the second non-update program; and a transmitting step for repeatedly transmitting, in sequence, every division to which any of the first identifier, the second identifier, and the third identifier is appended.

16. The control program transmitting method of claim 15, wherein the transmitting step repeatedly transmits, in sequence, all divisions of the update program, a part of all divisions of the first non-update program, all divisions of the second non-update program, and a remaining part of the divisions of the first non-update program, and wherein a period for transferring the part of the divisions of the first non-update program transmitted after the divisions of the update program is no less than a reboot period in the digital broadcast receiving apparatus.

17. The control program transmitting method of claim 15, wherein in sequential transmission of every division to which any of the first identifier, the second identifier, and the third identifier is appended, the transmitting step temporarily suspends the transmission before a data size of consecutively transmitted divisions exceeds a data capacity of a reception buffer equipped in the digital broadcast receiving apparatus, and resumes the transmission after a lapse of a period necessary for transferring the divisions consecutively stored in the reception buffer to a control program storing device equipped in the digital broadcast receiving apparatus.

18. The control program transmitting method of claim 17, wherein the transmitting step transmits dummy data during suspension of the transmission.

19. The control program transmitting method of claim 17, wherein the transmitting step repeatedly transmits, in sequence, all divisions of the update program, all divisions of the first non-update program, and all divisions of the second non-update program.

20. A control program transmitting method for transmitting a control program of a digital broadcast receiving apparatus, comprising:

a control program acquiring step for acquiring the control program which is made up of an update program to be used in the digital broadcast receiving apparatus for download of the control program and a non-update program to be used in the digital broadcast receiving apparatus for processing other than the download of the control program;

a data size acquiring step for acquiring a data size obtained by subtracting a size of an area prepared in the digital broadcast receiving apparatus for an increase of codes associated with download of the non-update program, from a data size of the update program;

a separating step for separating the non-update program into a first non-update program whose data size is no smaller than the data size acquired in the data size acquiring step and a second non-update program other than the first non-update program;

a dividing step for dividing each of the update program, the first non-update program, and the second non-update program into divisions which are each accompanied by a serial number;

an identifier appending step for appending a first identifier to each division of the update program, a second identifier to each division of the first non-update program, and a third identifier to each division of the second non-update program; and a transmitting step for repeatedly transmitting, in sequence, every division to which any of the first identifier, the second identifier, and the third identifier is appended.

21. The control program transmitting method of claim 20, wherein the dividing step compresses each of the update program, the first non-update program, and the second non-update program in units of predetermined size.

22. The control program transmitting method of claim 21, wherein the dividing step adds, to each of the units, a precompressed data size of the unit and a start address at which the unit is to be downloaded into a storing device equipped in the digital broadcast receiving apparatus for storing the control program.

23. The control program transmitting method of claim 20, wherein the dividing step first divides each of the update program, the first non-update program, and the second non-update program into groups and then divides each of the groups into sequences, wherein each serial number is made up of a group number serially appended to each of the groups and a sequence number serially appended to each of the sequences, and wherein each of the divisions includes a sequence.

24. The control program transmitting method of claim 23, wherein the dividing step compresses each of the groups before dividing each of the groups into the sequences.

25. The control program transmitting method of claim 24, wherein the dividing step adds, to each of the groups, a precompressed data size of the group and a start address at which the group is to be downloaded into a storing device equipped in the digital broadcast receiving apparatus for storing the control program.

26. A control program transmitting method for transmitting a control program of a digital broadcast receiving apparatus, comprising:

an acquiring step for acquiring the control program which is made up of an update program to be used in the digital broadcast receiving apparatus for download of the control program and a non-update program to be used in the digital broadcast receiving apparatus for processing other than the download of the control program;

a separating step for separating a first portion from the non-update program, combining the first portion with the update program to form a first control program whose data size is approximately 1/M of the control program, separating a second portion whose data size is equal to the first control program from the non-update program aside from the first portion, setting the second portion as a second control program, and dividing the non-update program aside from the first portion and the second portion by approximately (M−2) into third to Mth control programs, where M is an even number no less than 4;

a dividing step for dividing each of the first control program, the second control program, and the third to Mth control programs into divisions of similar size;

an identifier appending step for appending a first identifier and a second identifier respectively to each division of the first control program and each division of the second control program, evenly sorting the third to Mth control programs into a first program group and a second program group, and appending a third identifier and a fourth identifier respectively to each division of the first program group and each division of the second program group; and a transmitting step for repeatedly transmitting, when every division with any of the first identifier and the third identifier is grouped as a first set and every division with any of the second identifier and the fourth identifier is grouped as a second set, the first set and the second set alternately in units of divisions.

27. A control program transmitting method for transmitting a control program of a digital broadcast receiving apparatus, comprising:

an acquiring step for acquiring the control program made up of subprograms of different types;

a dividing step for dividing each of the subprograms into divisions;

an appending step for appending, to each of the divisions, a current identifier specifying a type of a subprogram which the division belongs to, priority information showing a priority subprogram which is given priority for being downloaded, and concurrency information showing a concurrency subprogram which can be downloaded concurrently with the priority subprogram; and a transmitting step for repeatedly transmitting, in sequence, every division to which the current identifier, the priority information, and the concurrency information is appended.

28. The control program transmitting method of claim 27,
wherein the priority information includes a start identifier showing a current identifier of a subprogram to be downloaded first among the subprograms and a next identifier showing a current identifier of a subprogram which is given priority for being downloaded after the subprogram which the division belongs to, and
wherein the concurrency information includes a start sub identifier showing a current identifier of a subprogram which can be downloaded concurrently with the subprogram shown by the start identifier and a next sub identifier showing a current identifier of a subprogram which can be downloaded concurrently with the subprogram shown by the next identifier.

29. A computer-readable storing medium storing any of an old control program and a new control program of a program receiving apparatus,
the program receiving apparatus being equipped with a storing device which stores the old control program in advance,
the old control program being made up of an old update program used for download of the new control program and an old non-update program used for processing other than the download of the new control program,
the new control program being made up of a new update program used for the download of the new control program and a new non-update program used for processing other than the download of the new control program,
the computer-readable storing medium, when implemented in a computer enables an installation of the new control program with an efficient allocation of the storage area of the storing device relative to writing over the old control program,
the old control program and the new control program comprising:
a first controlling step for executing the old update program stored in the storing device to receive the new update program and write the received new update program over the old non-update program stored in a first area in the storing device; and
a second controlling step for executing, once the first controlling step has finished writing the new update program into the storing device, the new update program to receive the new non-update program and write the received new non-update program over data stored in a second area in the storing device aside from an area where the new update program that is currently being used is stored,
wherein the new update program is divided into divisions which are each accompanied by a first identifier and a serial number, and is received in units of divisions,
wherein the new non-update program is divided into divisions which are each accompanied by a second identifier and a serial number, and is received in units of divisions,
wherein in the first controlling step, if the first identifier is appended to a received division of the new control program, the received division is judged as belonging to the new update program and a location where the received division is to be written is specified within the first area based on a serial number appended to the received division, and
wherein in the second controlling step, if the second identifier is appended to a received division of the new control program, the received division is judged as belonging to the new non-update program and a location where the received division is to be written is specified within the second area based on a serial number appended to the received division.

30. A computer-readable storing medium storing any of an old control program and a new control program of a digital broadcast receiving apparatus,
the digital broadcast receiving apparatus being equipped with a storing device which stores the old control program in advance,
the old control program being made up of an old update program used for download of the new control program and an old non-update program used for processing other than the download of the new control program,
the new control program being made up of a new update program used for the download of the new control program and a new non-update program used for processing other than the download of the new control program,
the computer-readable storing medium, when implemented in a computer enables an installation of the new control program with an efficient allocation of the storage area of the storing device relative to writing over the old control program,
the old control program and the new control program comprising:
a judging step for repeatedly judging whether writing of the new update program has been completed, having a first controlling step operate until completion of the writing of the new update program, and having a second controlling step operate after the completion of the writing of the new update program;
the first controlling step for executing the old update program stored in the storing device to receive the new update program and write the received new update program over data stored in a first area in the storing device that is a part of an area where the old non-update program has been stored, and, at the same time, receive a first non-update program which is a part of the new non-update program and write the received first non-update program over data stored in a second area, aside from the first area, that is a part of the area where the old non-update program has been stored; and
the second controlling step for executing the new update program written in the storing device to take over reception and writing of the first non-update program and, at the same time, receive a second non-update program which is a part of the new non-update program other than the first non-update program and write the received second non-update program over data stored in a third area in the storing device aside from the second area and an area where the new update program which is currently being used is stored.

31. A computer-readable storing medium storing a control program of a digital broadcast receiving apparatus that is to download the control program transmitted to the digital broadcast receiving apparatus,
the control program being made up of a subprograms of different types which are each divided into divisions and are repeatedly transmitted in a predetermined sequence in units of divisions, each of the divisions being accompanied by a current identifier specifying to a type of a subprogram which the division belongs to, the digital broadcast receiving apparatus will implement the execution of the control program to prioritize the downloading of divisions of the subprograms, the control program comprising:

a receiving step for receiving the subprograms in units of divisions;

a judging step for judging, with reference to a current identifier appended to a received division, whether the received division belongs to a priority subprogram which is given priority for being downloaded, a concurrency subprogram which can be downloaded concurrently with the priority subprogram, or a subprogram which is neither the priority subprogram nor the concurrency subprogram; and a downloading step for downloading the received division which is judged as belonging to any of the priority subprogram and the concurrency subprogram.

32. A computer-readable storing medium storing a control program transmission program for transmitting a control program of a program receiving apparatus, the program receiving apparatus will implement the execution and installation of the control program by the control program transmission program, the control program transmission program comprising:

an acquiring step for acquiring the control program made up of an update program to be used in the program receiving apparatus for download of the control program and a non-update program to be used in the program receiving apparatus for processing other than the download of the control program;

a dividing step for dividing each of the update program and the non-update program into divisions which are each accompanied by a serial number;

an identifier appending step for appending a first identifier and a second identifier respectively to each division of the update program and each division of the non-update program; and a transmitting step for repeatedly transmitting, in sequence, every division to which any of the first identifier and the second identifier is appended.

33. A computer-readable storing medium storing a control program transmission program for transmitting a control program of a digital broadcast receiving apparatus, the digital broadcast receiving apparatus will implement the execution and installation of the control program by the control program transmission program, the control program transmission program comprising:

an acquiring step for acquiring the control program made up of an update program to be used in the digital broadcast receiving apparatus for download of the control program and a non-update program to be used in the digital broadcast receiving apparatus for processing other than the download of the control program;

a separating step for separating the non-update program into a first non-update program whose data size is no smaller than the update program and a second non-update program other than the first non-update program;

a dividing step for dividing each of the update program, the first non-update program, and the second non-update program into divisions which are each accompanied by a serial number;

an identifier appending step for appending a first identifier to each division of the update program, a second identifier to each division of the first non-update program, and a third identifier to each division of the second non-update program; and a transmitting step for repeatedly transmitting, in sequence, every division to which any of the first identifier, the second identifier, and the third identifier is appended.

34. A computer-readable storing medium storing a control program transmission program for transmitting a control program of a digital broadcast receiving apparatus, the digital broadcast receiving apparatus will implement the execution and installation of the control program by the control program transmission program, the control program transmission program comprising:

a control program acquiring step for acquiring the control program which is made up of an update program to be used in the digital broadcast receiving apparatus for download of the control program and a non-update program to be used in the digital broadcast receiving apparatus for processing other than the download of the control program;

a data size acquiring step for acquiring a data size obtained by subtracting a size of an area prepared in the digital broadcast receiving apparatus for an increase of codes associated with download of the non-update program, from a data size of the update program;

a separating step for separating the non-update program into a first non-update program whose data size is no smaller than the data size acquired in the data size acquiring step and a second non-update program other than the first non-update program;

a dividing step for dividing each of the update program, the first non-update program, and the second non-update program into divisions which are each accompanied by a serial number;

an identifier appending step for appending a first identifier to each division of the update program, a second identifier to each division of the first non-update program, and a third identifier to each division of the second non-update program; and a transmitting step for repeatedly transmitting, in sequence, every division to which any of the first identifier, the second identifier, and the third identifier is appended.

35. A computer-readable storing medium storing a control program transmission program for transmitting a control program of a digital broadcast receiving apparatus, the digital broadcast receiving apparatus will implement the execution and installation of the control program by the control program transmission program, the control program transmission program comprising:

an acquiring step for acquiring the control program which is made up of an update program to be used in the digital broadcast receiving apparatus for download of the control program and a non-update program to be used in the digital broadcast receiving apparatus for processing other than the download of the control program;

a separating step for separating a first portion from the non-update program, combining the first portion with the update program to form a first control program whose data size is approximately 1/M of the control program, separating a second portion whose data size is equal to the first control program from the non-update program aside from the first portion, setting the second portion as a second control program, and dividing the non-update program aside from the first portion and the second portion by approximately (M−2) into third to Mth control programs, where M is an even number no less than 4;

a dividing step for dividing each of the first control program, the second control program, and the third to Mth control programs into divisions of similar size;

an identifier appending step for appending a first identifier and a second identifier respectively to each division of the first control program and each division of the second control program, evenly sorting the third to Mth control programs into a first program group and a second program group, and appending a third identifier and a fourth identifier respectively to each division of the first program group and each division of the second program group; and a transmitting step for repeatedly transmitting, when every division with any of the first identifier and the third identifier is grouped as a first set and every division with any of the second identifier and the fourth identifier is grouped as a second set, the first set and the second set alternately in units of divisions.

36. A computer-readable storing medium storing a control program transmission program for transmitting a control program of a digital broadcast receiving apparatus, the digital broadcast receiving apparatus will implement the execution and installation of the control program by the control program transmission program, the control program transmission program comprising:

an acquiring step for acquiring the control program made up of subprograms of different types;

a dividing step for dividing each of the subprograms into divisions;

an appending step for appending, to each of the divisions, a current identifier specifying a type of a subprogram which the division belongs to, priority information showing a priority subprogram which is given priority for being downloaded, and concurrency information showing a concurrency subprogram which can be downloaded concurrently with the priority subprogram; and a transmitting step for repeatedly transmitting, in sequence, every division to which the current identifier, the priority information, and the concurrency information is appended.

37. A computer-readable storing medium storing a control program of a digital broadcast receiving apparatus, the digital broadcast receiving apparatus will implement the execution of the control program to prioritize the downloading of divisions of the subprograms, the control program being characterized in that:

the control program is made up of subprograms of different types which are each divided into divisions; and each of the divisions is accompanied by a current identifier specifying a type of a subprogram which the division belongs to, priority information showing a priority subprogram that is given priority for being downloaded, and concurrency information showing a concurrency subprogram that can be downloaded concurrently with the priority subprogram.

38. A control program downloading apparatus, comprising:

storing means for storing in advance a control program made up of an update program used for download of a new control program and a non-update program used for processing other than the download of the new control program, the new control program being made up of a new update program and a new non-update program:

first controlling means for executing the update program stored in the storing means to receive the new update program and write the received new update program over the non-update program stored in a first area in the storing means; and second controlling means for executing, once the first controlling means has finished writing the new update program into the storing means, the new update program to receive the new non-update program and write the received new non-update program over data stored in a second area in the storing means aside from an area where the new update program that is currently being used is stored, wherein the new update program is divided into divisions which are each accompanied by a first identifier and a serial number, and is received in units of divisions, wherein the new non-update program is divided into divisions which are each accompanied by a second identifier and a serial number, and is received in units of divisions, wherein if the first identifier is appended to a received division of the new control program, the first controlling means judges the received division as belonging to the new update program, and specifies a location where the received division is to be written within the first area based on a serial number appended to the received division, and wherein if the second identifier is appended to a received division of the new control program, the second controlling means judges the received division as belonging to the new non-update program, and specifies a location where the received division is to be written within the second area based on a serial number appended to the received division.

39. A computer program downloading apparatus, comprising:

storing means for storing in advance a control program made up of an update program used for download of a new control program and a non-update program used for processing other than the download of the new control program, the new control program being made up of a new update program and a new non-update program;

judging means for repeatedly judging whether writing of the new update program has been completed, having first controlling means operate until completion of the writing of the new update program, and having second controlling means operate after the completion of the writing of the new update program;

the first controlling means for executing the update program stored in the storing means to receive the new update program and write the received new update program over data stored in a first area in the storing means that is a part of an area where the on-update program has been stored, and, at the same time, receive a first non-update program which is a part of the new non-update program and write the received first non-update program over data stored in a second area, aside from the first area, that is a part of the area where the non-update program has been stored; and the second controlling means for executing the new update program written in the storing means to take over reception and writing of the first non-update program and, at the same time, receive a second non-update program which is a part of the new non-update program other than the first non-update program and write the received second non-update program over data stored in a third area in the storing means aside from the second area and an area where the new update program which is currently being used is stored.

40. A control program downloading apparatus for downloading a transmitted control program of the control program downloading apparatus, the control program being made up of subprograms of different types which are each divided into divisions and are repeatedly transmitted in a predetermined sequence in units of divisions, each of the divisions being accompanied by a current identifier that specifies a type of a subprogram which the division belongs to, the control program downloading apparatus comprising:
  receiving means for receiving the subprograms in units of divisions;
  judging means for judging, with reference to a current identifier appended to a received division, whether the received division belongs to a priority subprogram which is given priority for being downloaded, a concurrency subprogram which can be downloaded concurrently with the priority subprogram, or a subprogram which is neither the priority subprogram nor the concurrency subprogram; and
  downloading means for downloading the received division which is judged as belonging to any of the priority subprogram and the concurrency subprogram.

41. A control program transmitting apparatus for transmitting a control program of a program receiving apparatus, comprising:
  acquiring means for acquiring the control program made up of an update program to be used in the program receiving apparatus for download of the control program and a non-update program to be used in the program receiving apparatus for processing other than the download of the control program;
  dividing means for dividing each of the update program and the non-update program into divisions which are each accompanied by a serial number;
  identifier appending means for appending a first identifier and a second identifier respectively to each division of the update program and each division of the non-update program; and
  transmitting means for repeatedly transmitting, in sequence, every division to which any of the first identifier and the second identifier is appended.

42. A control program transmitting apparatus for transmitting a control program of a digital broadcast receiving apparatus, comprising:
  acquiring means for acquiring the control program made up of an update program to be used in the digital broadcast receiving apparatus for download of the control program and a non-update program to be used in the digital broadcast receiving apparatus for processing other than the download of the control program;
  separating means for separating the non-update program into a first non-update program whose data size is no smaller than the update program and a second non-update program other than the first non-update program;
  dividing means for dividing each of the update program, the first non-update program, and the second non-update program into divisions which are each accompanied by a serial number;
  identifier appending means for appending a first identifier to each division of the update program, a second identifier to each division of the first non-update program, and a third identifier to each division of the second non-update program; and
  transmitting means for repeatedly transmitting, in sequence, every division to which any of the first identifier, the second identifier, and the third identifier is appended.

43. A control program transmitting apparatus for transmitting a control program of a digital broadcast receiving apparatus, comprising:
  control program acquiring means for acquiring the control program which is made up of an update program to be used in the digital broadcast receiving apparatus for download of the control program and a non-update program to be used in the digital broadcast receiving apparatus for processing other than the download of the control program;
  data size acquiring means for acquiring a data size obtained by subtracting a size of an area prepared in the digital Broadcast receiving apparatus for an increase of codes associated with download of the non-update program, from a data size of the update program;
  separating means for separating the non-update program into a first non-update program whose data size is no smaller than the data size acquired by the data size acquiring means and a second non-update program other than the first non-update program;
  dividing means for dividing each of the update program, the first non-update program, and the second non-update program into divisions which are each accompanied by a serial number;
  identifier appending means for appending a first identifier to each division of the update program, a second identifier to each division of the first non-update program, and a third identifier to each division of the second non-update program; and
  transmitting means for repeatedly transmitting, in sequence, every division to which any of the first identifier, the second identifier, and the third identifier is appended.

44. A control program transmitting apparatus for transmitting a control program of a digital broadcast receiving apparatus, comprising:
  acquiring means for acquiring the control program which is made up of an update program to be used in the digital broadcast receiving apparatus for download of the control program and a non-update program to be used in the digital broadcast receiving apparatus for processing other than the download of the control program;
  separating means for separating a first portion from the non-update program, combining the first portion with the update program to form a first control program whose data size is approximately 1/M of the control program, separating a second portion whose data size is equal to the first control program from the non-update program aside from the first portion, setting the second portion as a second control program, and dividing the non-update program aside from the first portion and the second portion by approximately (M−2) into third to Mth control programs, where M is an even number no less than 4;

dividing means for dividing each of the first control program, the second control program, and the third to Mth control programs into divisions of similar size;

identifier appending means for appending a first identifier and a second identifier respectively to each division of the first control program and each division of the second control program, evenly sorting the third to Mth control programs into a first program group and a second program group, and appending a third identifier and a fourth identifier respectively to each division of the first program group and each division of the second program group; and transmitting means for repeatedly transmitting, when every division with any of the first identifier and the third identifier is grouped as a first set and every division with any of the second identifier and the fourth identifier is grouped as second set, the first set and the second set alternately in units of divisions.

45. A control program transmitting apparatus for transmitting a control program of a digital broadcast receiving apparatus, comprising:

acquiring means for acquiring the control program made up of subprograms of different types;

dividing means for dividing each of the subprograms into divisions; appending means for appending, to each of the divisions, a current identifier specifying a type of a subprogram which the division belongs to, priority information showing a priority subprogram which is given priority for being downloaded, and concurrency information showing a concurrency subprogram which can be downloaded concurrently with the priority subprogram; and transmitting means for repeatedly transmitting, in sequence, every division to which the current identifier, the priority information, and the concurrency information is appended.

* * * * *

UNITED STATES PATENT AND TRADEMARK OFFICE
CERTIFICATE OF CORRECTION

PATENT NO. : 6,470,496 B1
DATED : October 22, 2002
INVENTOR(S) : Naoe Kato and Keishi Sugimoto It is certified that error appears in the above-identified patent and that said Letters Patent is hereby corrected as shown below:

<u>Column 48,</u>
Line 59, delete "on-update" and insert -- non-update --; and

<u>Column 50,</u>
Line 24, delete "Broadcast" and insert -- broadcast --.

Signed and Sealed this

Eighth Day of July, 2003

JAMES E. ROGAN
*Director of the United States Patent and Trademark Office*